(12) United States Patent
Drummond et al.

(10) Patent No.: US 6,885,946 B1
(45) Date of Patent: Apr. 26, 2005

(54) METHOD AND APPARATUS FOR PERFORMING IMAGE PROCESS OF SEISMIC DATA

(75) Inventors: Brian Leslie Drummond, Eaglesham (GB); Turhan Fazlur Rahman, Saint Paul, MN (US)

(73) Assignee: Complex Data Technologies, St. Paul, MN (US)

( * ) Notice: Subject to any disclaimer, the term of this patent is extended or adjusted under 35 U.S.C. 154(b) by 0 days.

(21) Appl. No.: 09/404,102

(22) Filed: Sep. 23, 1999

Related U.S. Application Data

(63) Continuation-in-part of application No. 09/161,168, filed on Sep. 25, 1998, now Pat. No. 6,237,021.
(60) Provisional application No. 60/101,779, filed on Sep. 25, 1998.

(51) Int. Cl.[7] .............................................. G06F 13/00
(52) U.S. Cl. .......................................................... 702/16
(58) Field of Search ............................. 367/14, 37, 68, 367/73, 45, 49; 702/1, 2, 14, 15, 16, 17, 18; 709/200, 201, 100, 107, 102; 712/1, 10, 14, 16, 20, 21, 22, 28, 36

(56) References Cited

U.S. PATENT DOCUMENTS

| | | |
|---|---|---|
| 5,198,979 A | 3/1993 | Moorhead et al. |
| 5,313,567 A | 5/1994 | Civanlar et al. |
| 5,349,527 A | 9/1994 | Pieprzak et al. |
| 5,544,067 A | 8/1996 | Rostoker et al. |
| 5,657,223 A | 8/1997 | Juszczak et al. |
| 5,774,386 A | 6/1998 | Pawle |
| 5,991,695 A * | 11/1999 | Wang et al. .................. 702/14 |

FOREIGN PATENT DOCUMENTS

| | | |
|---|---|---|
| GB | 1 594 633 | 8/1981 |
| WO | WO 97/05558 | 2/1997 |

* cited by examiner

Primary Examiner—Robert B. Harrell
(74) Attorney, Agent, or Firm—Brown & Michaels, PC

(57) ABSTRACT

One aspect of the present invention is directed to an apparatus for generating an image using an algorithm. The algorithm has a plurality of tasks for determining the level of energy emanating from a source located within a mass. The apparatus comprises memory configured to store information defining a trace. The trace defines energy levels recorded at a sensor. The amplitude of the trace at one or more given instants of time is the sum of energy received from two or more sources. A data processor is in electrical communication with the memory and the data processor is configured to simultaneously execute two or more tasks of the algorithm and determine the level of energy emanating from each source.

13 Claims, 34 Drawing Sheets

```
      SUBROUTINE AVERAGE (INDATA, COUNT, MAX, MIN, AVG, RMS)
          INTEGER COUNT
          REAL INDATA (COUNT), MAX, MIN, AVG, RMS                    ── 1000
C
C   These are the inputs and outputs to the function
C     name      type      mode      length      description
C     ====      ====      ====      =====       ========
C
C     INDATA     R         In        COUNT      Array of input values
C     COUNT      I         In                   Number of values to average
C     MAX        R         InOut                Maximum value found
C     MIN        R         InOut                Minimum value found
C     AVG        R         Out                  Average of all values
C     RMS        R         Out                  Root-Mean-Square of all values
C
          REAL SUM, RMSSUM                  ⎤
          INTEGER I                         ⎦─ 1002
C   These are internal variables C   Initialization of internal variables
          SUM = 0.0                         ⎤
          RMSSUM = 0.0                      ⎦─ 1004

C   Main Loop proper
          DO 100 = 1, COUNT
              IF (INDATA (I) .LT. MIN) THEN  ⎤
                  MIN = INDATA (I)           ⎬─ 1008
              ENDIF                          ⎦
              IF (INDATA (I) .GT. MAX) THEN  ⎤                 ⎤
                  MAX = INDATA (I)           ⎬─ 1010           │
              ENDIF                          ⎦                 ⎬─ 1006
              SUM = SUM + INDATA (I)  ── 1012                  │
              RMSSUM = RMSSUM + INDATA (I) * INDATA (I)        │
      100 CONTINUE                                        1014 ⎦
C   End of main loop C   Calculate average, RMS       1016
          AVG = SUM / COUNT
          RMSSUM = SQRT (RMSSUM / COUNT)
          END                                  1018
```

Fig. 10

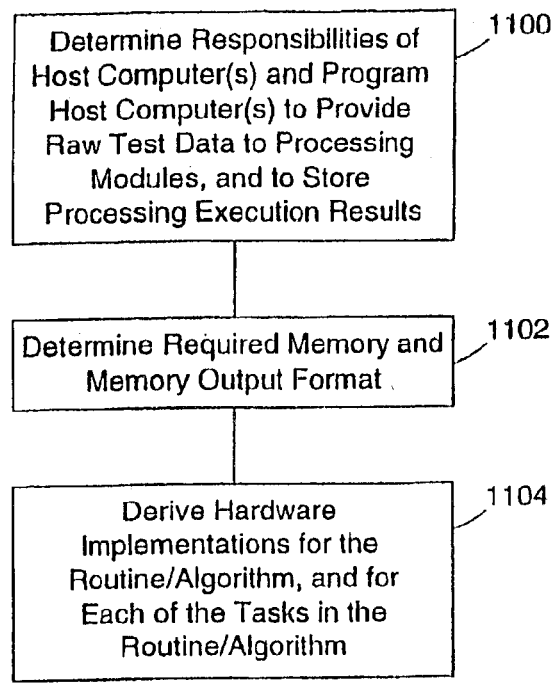
Fig. 11
Fig. 12
```
IF (INDATA (I) .LT. MIN) THEN
    MIN = INDATA (I)
ENDIF
```
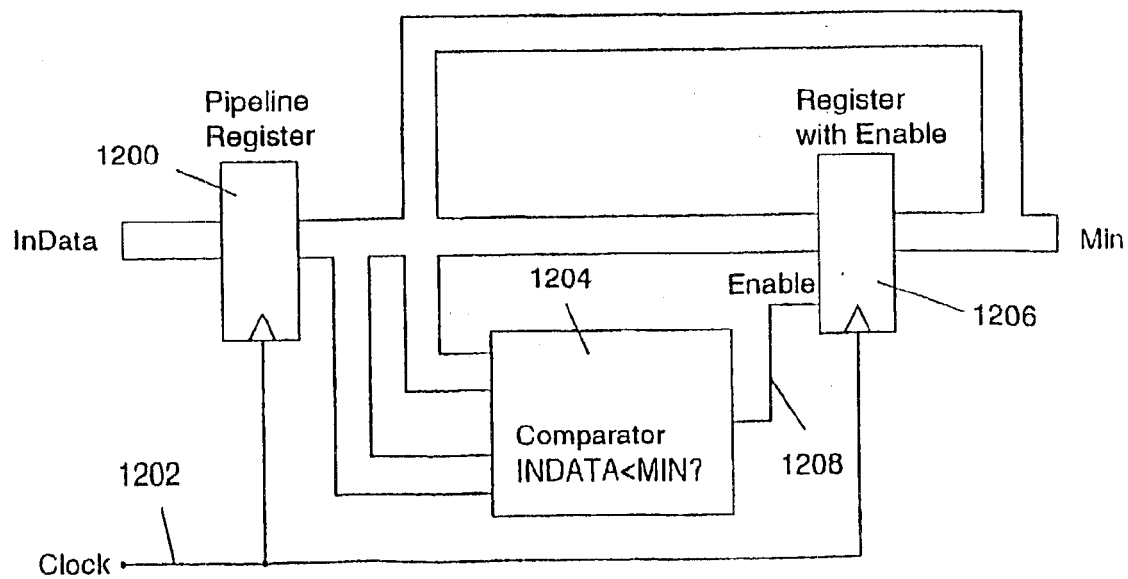

SUM = SUM + INDATA (I)

RMSSUM = RMSSUM + INDATA (I) * INDATA (I)

abs(a) NAIVE HARDWARE IMPLEMENTATION - 2 CYCLES

Note:- A width = N bits abs(a) FASTER IMPLEMENTATION - 1 CYCLE

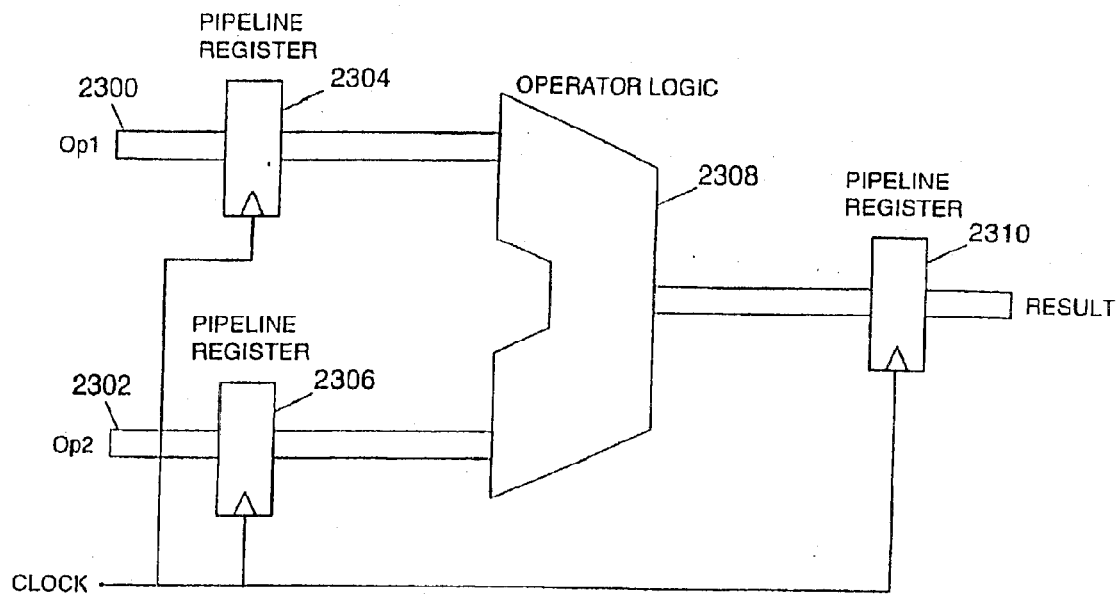
*Fig. 23* BINARY OPERATOR
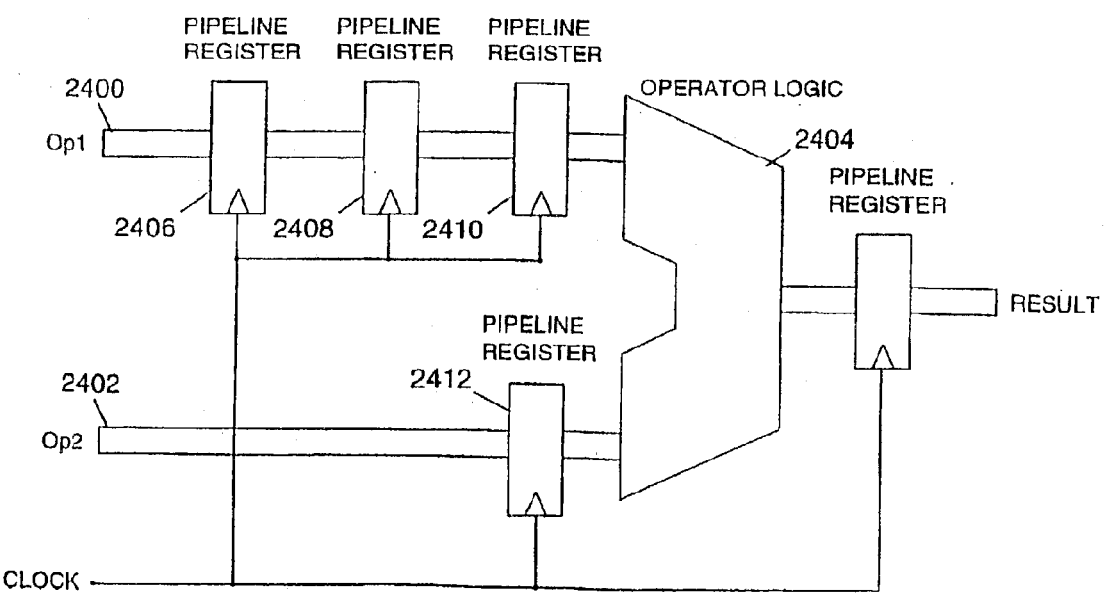
*Fig. 24* BINARY OPERATOR WITH ONE EARLY OPERAND

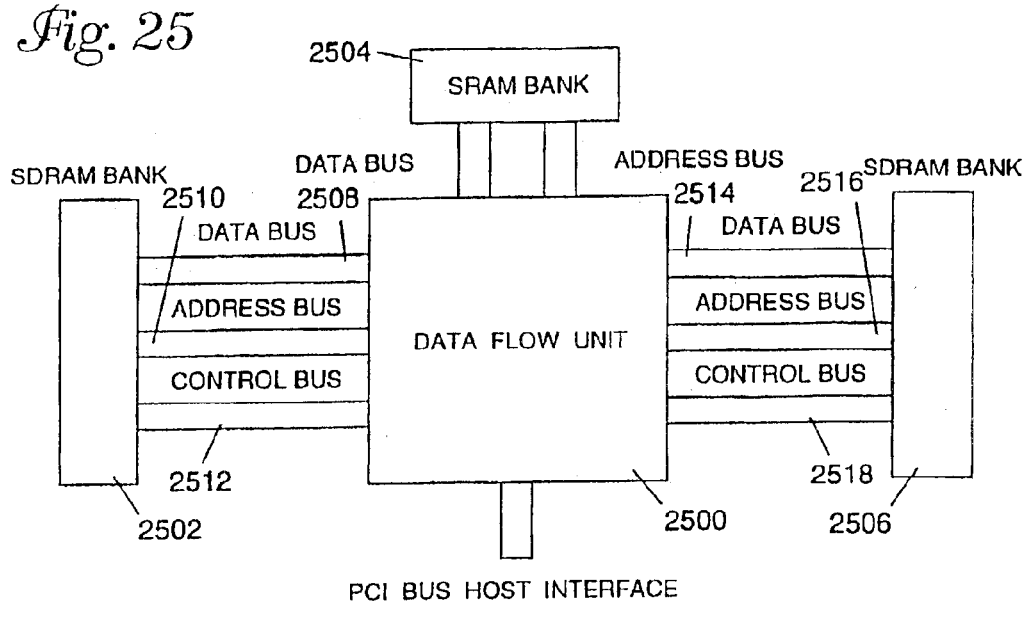
TYPICAL SYSTEM BLOCK DIAGRAM
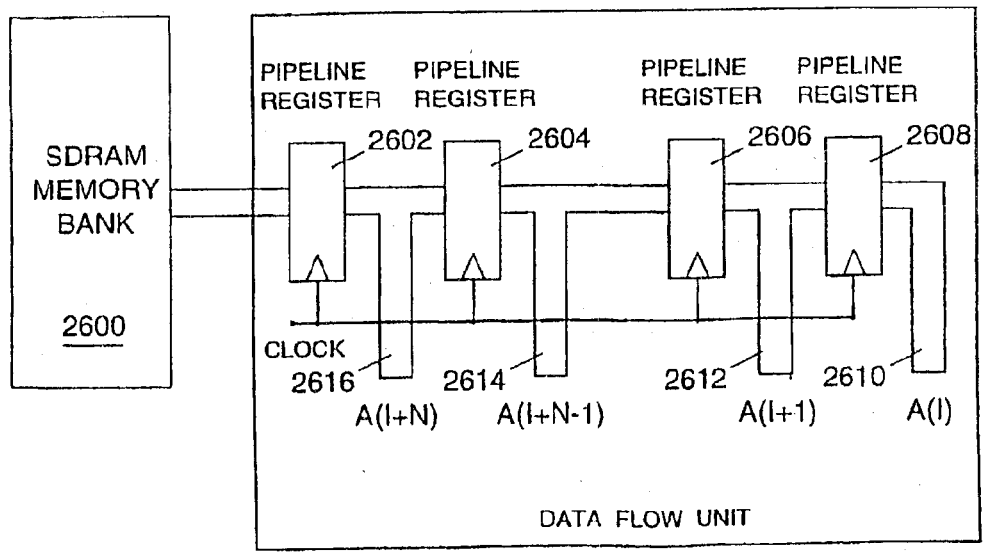
PIPELINING TO REDUCE MEMORY ACCESSES.

IMPLEMENTATION OF REGISTER WITH ENABLE

HARDWARE IMPLEMENTATION OF CONDITIONAL STATEMENT.

EXAMPLE HOST INTERFACE/PROGRAMMING MODEL

US 6,885,946 B1

METHOD AND APPARATUS FOR PERFORMING IMAGE PROCESS OF SEISMIC DATA

REFERENCES TO CO-PENDING APPLICATIONS

The present application is a continuation-in-part of United States Patent Application entitled Method and Apparatus for the Efficient Processing of Data-Intensive Applications, filed on Sep. 25, 1998, and having Ser. No. 09/161,168, now U.S. Pat. No. 6,237,021, and a continuation-in-part of United States Provisional Patent Application entitled A Method and Apparatus for Efficiently Performing 3-D Prestack Depth Migration, filed on Sep. 25, 1998, and having a Ser. No. 60/101,779; both disclosures of which are hereby incorporated by reference.

TECHNICAL FIELD

The present innovation relates generally to computer architectures, and more particularly to a computer architecture useful for performing imaging.

BACKGROUND

Imaging refers to the process of acquiring data about some mass and inferring from the data a representation of the mass. Imaging is useful for a variety of applications. One example includes displaying subsurface structures of the earth by gathering seismic data. Another example is displaying structures within human bodies through the use of ultrasound. Imaging is also useful for creating images of a mass that has been analyzed by radar, sonar, and other types of remote sensing technologies.

All of the possible uses for imaging require data intensive calculations. When an image of a mass is created, the quality of the image is dependent upon the amount of data that is acquired. The acquired data must be processed by some type of algorithm, depending upon the nature of the data and the type of image to be generated. With potentially millions or billions of data values, performing even a simple algorithm on a conventional computer system can take a long period of time. In certain instances, the amount of time to process the image can be so great that the mass analyzed may change before the image can be created. Typically, processing time is slightly reduced by lowering the resolution of the data, which then decreases the accuracy of the resulting image.

These problems are particularly apparent when imaging geological subsurface structures. When imaging a subsurface structure, the mass to be analyzed is broken down into millions of individual points. Seismic energy reflections from the points are recorded on the surface, and the imaging system must determine each individual point's energy contribution. Using state of the art computers, this process can take several months. This length of time is troublesome because the substructure may change before the imaging can be completed. Lowering the resolution decreases the reliability of the image. This lack of reliability is also troublesome because these images may be used by the oil industry to determine the location and size of natural oil reservoirs. The proper drilling location is critical to the successful depletion of the reservoir, and an accurate image is necessary. Thus, the oil industry would benefit from a computer architecture capable of producing an accurate image in a shorter amount of time.

SUMMARY

One aspect of the present invention is directed to an apparatus for generating an image using an algorithm. The algorithm has a plurality of tasks for determining the level of energy emanating from a source located within a mass. The apparatus comprises memory configured to store information defining a trace. The trace defines energy levels recorded at a sensor. The amplitude of the trace at one or more given instants of time is the sum of energy received from two or more sources. A data processor is in electrical communication with the memory and the data processor is configured to simultaneously execute two or more tasks of the algorithm and determine the level of energy emanating from each source.

Another aspect of the invention comprises memory configured to store information defining a trace. The trace defines energy levels recorded at a sensor. The amplitude of the trace at one or more given instants of time is the sum of energy received from two or more sources. A data processor is in electrical communication with the memory. The data processor has a plurality of execution units. Each execution unit is configured to execute a task of the algorithm and determine the level of energy emanating from each source.

Another aspect of the present invention comprises memory configured to store information defining a trace. The trace defines energy levels recorded at a sensor. The amplitude of the trace at one or more given instants of time is the sum of energy received from two or more sources. A data processor in electrical communication with the memory, the data processor configured to execute all tasks of the algorithm and determine the energy level emanating from each source.

Another aspect of the present invention is directed to an apparatus for generating an image of a mass. A plurality of sources being located in the mass. The apparatus comprises memory configured to store information defining energy levels recorded at a sensor, the energy levels emanating from one or more of the sources. A data processor has circuitry. An algorithm has a plurality of tasks for determining the level of energy emanating from each source and recorded at the sensor. The algorithm is implemented in the circuitry of a data processor.

Another aspect of the preset invention is a method of manufacturing a circuit for generating an image of a mass. A plurality of sources are located in the mass wherein energy is emanating from the sources. The image is generated from the energy levels recorded at a sensor. The method comprises creating a gate-level netlist, the netlist corresponding to an algorithm having a plurality of tasks for determining the energy level emanating from each source and recorded at the sensor; and placing and routing the netlist in circuitry.

Another aspect of the present invention is an apparatus for interpolating travel times for energy between a source in a mass and a sensor. The apparatus comprises cache and memory configured to store a plurality of travel times forming a coarse grid of travel times. The plurality of travel times includes first, second, third, and fourth travel times corresponding to first, second, third, and fourth sources, respectively. An interpolator is formed from a plurality of execution units arranged to receive the first and second predetermined travel times from memory, interpolate a first intermediate travel time for a first intermediate source positioned between the first and second sources, and cache the first intermediate travel time; receive the third and fourth predetermined travel times from memory, interpolate a second intermediate travel time for a second intermediate source positioned between the third and fourth sources, and cache the second intermediate travel time; and receive the first and second intermediate travel times from cache, interpolate a third intermediate travel time for a third intermediate source positioned between the first and second intermediate sources.

Another aspect of the present invention is directed to an apparatus for interpolating travel times for energy between a source in a mass and a sensor. The apparatus comprises an interpolator formed from a plurality of execution units arranged to process first and second travel times corresponding to first and second sources, respectively, and interpolate an intermediate travel time from a third source positioned intermediate to the first and second sources.

BRIEF DESCRIPTION OF THE DRAWINGS

FIG. 10 represents a software routine programmed to calculate the maximum, minimum, root-mean-square (RMS) and average values in a sequence of numbers that is capable of transformation in accordance with the invention;

FIG. 11 is a flow diagram illustrating an exemplary process for carrying out transformations of an algorithm or software routine;

FIGS. 12, 13 and 14 illustrate various approaches to transforming a software conditional statement into hardware;

FIG. 23 is a block diagram of one embodiment of a binary operator transformation in accordance with the invention;

FIG. 24 is a block diagram of a binary operator transformation requiring input synchronization using pipeline registers;

FIG. 25 illustrates the use of external, or auxiliary, memory components to increase the parallelism of the memory accesses;

FIG. 26 provides an example embodiment of a register pipeline used to replace a succession of array reads;

FIG. 31$b$ shows an example of a coarse, i.e. low resolution, travel time volume.

FIG. 31$c$ shows an example of a high resolution image volume.

DETAILED DESCRIPTION OF THE VARIOUS EMBODIMENTS

In the following description of the various embodiments, reference is made to the accompanying drawings which form a part hereof, and in which is shown by way of illustration various embodiments in which the invention may be practiced. It is to be understood that other embodiments may be utilized, and structural and functional modifications may be made, without departing from the scope of the invention. It is also to be understood that any reference to a functional algorithm includes imaging algorithms, and that the imaging algorithm may be constructed in hardware using the architectural principles and transfer rules described herein.

This architecture includes multiple parallel processing units designed in connection with a data flow module or unit that together allow a functional algorithm to be executed within a single clock cycle. In other words, at least multiple algorithm tasks are performed for a single cycle, and every task of the algorithm may be performed within the cycle. The data flow unit allows control loop constructs and expression evaluations, which are conventionally performed by a series of software programming instructions, to be embodied into an architecture for moving data as defined by the functional algorithm. Proper pipelining of the control loop constructs and expression evaluations provides for manifestation of the algorithm's control functions in hardware. The data flow unit also controls memory operation by direct means such that raw input data is provided to the processing architecture on each clock cycle.

The multiple execution units, together with the data flow unit's control structures, potentially deep pipelining, direct variable-length memory control, and dedicated data distribution paths together facilitate complete exploitation of each and every execution unit and control structure each clock cycle, thereby outputting a complete pass of the functional algorithm each clock cycle. This integrated computing architecture results in a fully-exploited, sustained-execution processing architecture capable of performing voluminous data computations at remarkable speeds.

Figure 1:
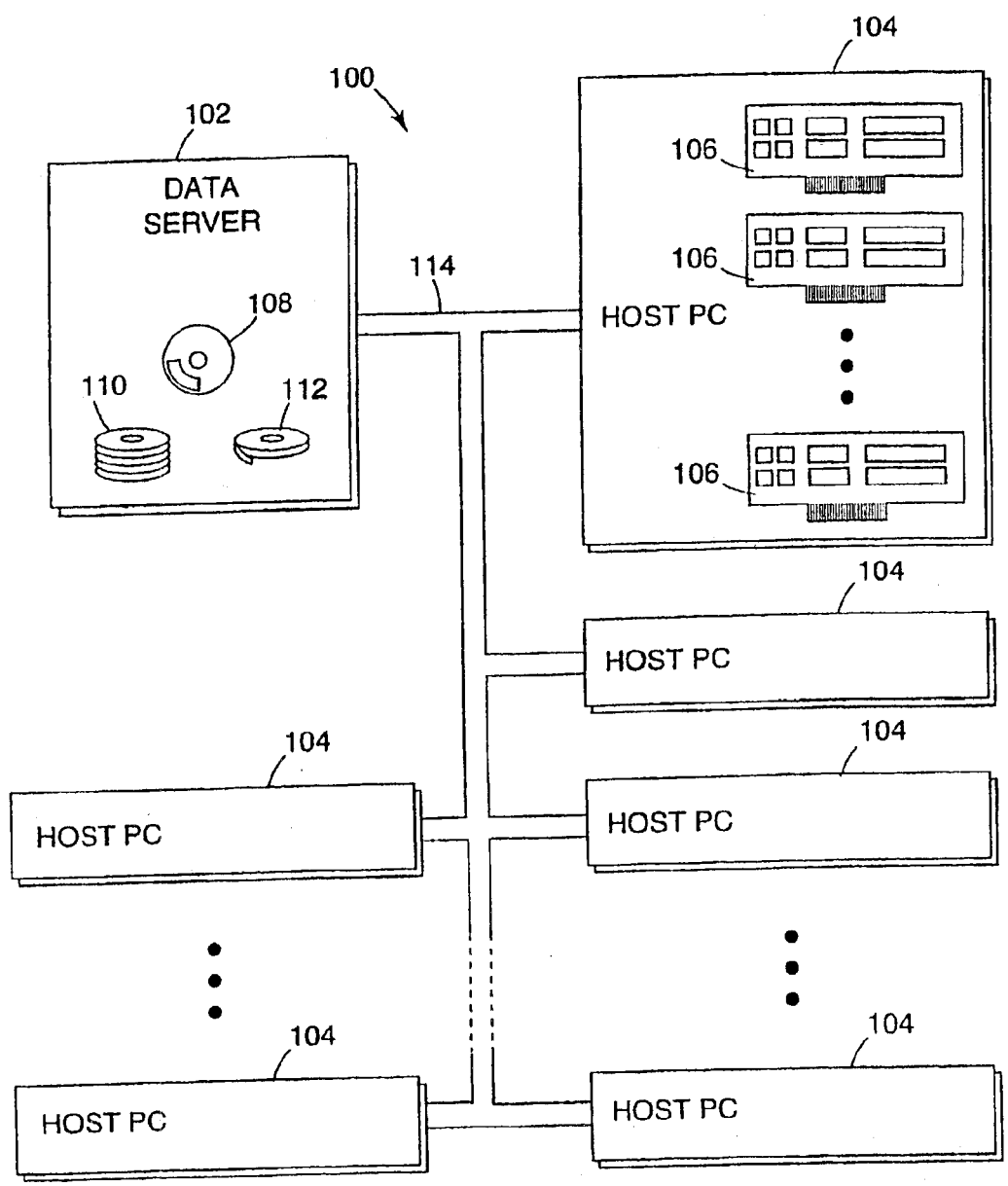
FIG. 1 is a block diagram illustrating one embodiment of a computing system environment in accordance with the present invention.

Referring now to FIG. 1, a diagram is provided illustrating one embodiment of a system environment in accordance with the present invention. The computing system 100 includes at least one data server 102 that is networked to one or more host PCs 104. As will become more apparent, this type of arrangement is used to supply stored or real-time data to the unique execution modules which are described below. The execution modules can be housed on printed circuit boards 106, and plugged into expansion slots in its respective host PC 104. Each of the host PCs 104 illustrated in FIG. 1 can contain any number of the printed circuit boards 106 that house multiple execution units. The number of execution units and printed circuit boards is dependent on the processing needs of the particular application. The host PCs 104 are depicted as personal computers, however it should be recognized that any computing unit can be used, such as a workstation or other computing device.

The system illustrated in FIG. 1 provides a means for supplying large amounts of data to the execution modules, where the data is processed. The one or more data servers 102 can store the data in any known fashion, including CD-ROMS 108, hard disks 110, tapes 112, or any other storage mechanism. Before further describing the system 100 and corresponding operation, it is beneficial to obtain an understanding of the type of data that will be provided by the data server 102.

The present invention is designed to process extremely large volumes of data. For example, many scientific simulations may involve millions, billions, or perhaps hundreds of billions of simulation test points. Such scientific simulations can be envisioned in a variety of fields of technology, including geological, medical, and any other field requiring a very large number of test points to obtain a satisfactory simulation. In such cases, these test points can come in the form of alphanumeric characters, integer or fractional numbers, patterns, or any other information that can ultimately be stored in a digital format.

The storage media of the data server, such as the CD-ROMS 108, hard disks 110, or tape 112, provide the storage capability for these massive quantities of data. However, collecting the data is only the first step in the simulation. Once gathered, all of the information must be processed—and must be processed efficiently.

In many scientific simulation experiments, gathering the data may or may not take a great deal of time. However, it is often the case that the capacity available for gathering the data is comparatively large with respect to the number of analysts available to evaluate the results of the processed simulation. This can result in a very large backlog of stored simulation test points that require processing. The lack of computer performance in today's more general purpose computer architectures exacerbates the problem, as the analysts have to wait an unacceptably long time before all of the test points for just one simulation have been processed. Therefore, for such data-intensive applications, the processing bottleneck must be broken.

The present invention transfers these large volumes of data from the data server 102 to the one or more host PCs 104 by way of a network 114. Any network configuration capable of providing the data in the data server to each of the host PCs can be employed, such as an ethernet connection. The host PC 104 is used primarily to receive the data, and to route the data to the execution units depicted by way of example on each printed circuit board 106. The execution units provide the efficient processing deserving of such data-intensive applications.

Figure 2:
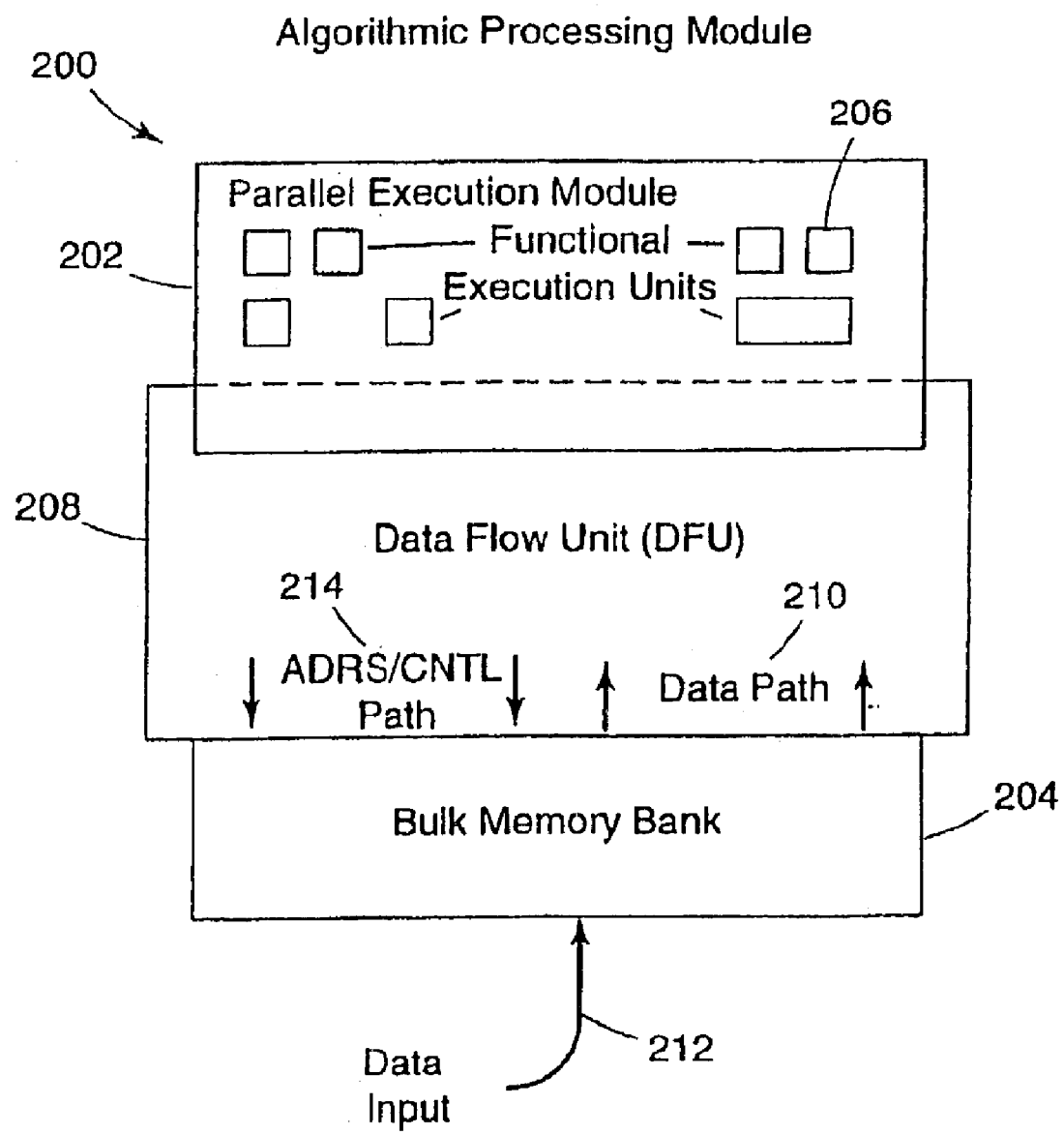
FIG. 2 is a block diagram illustrating one embodiment of a sustained-execution processing module in accordance with the present invention.

FIG. 2 is a block diagram illustrating one embodiment of a sustained-execution processing module 200 in accordance with the present invention. In one embodiment, each circuit board 106 includes one or more such processing modules 200. Data provided by the server 102 is provided to a particular host PC 104, and then to their respective processing modules 200. The host PC 104 is used only to move the data between the server 102 and the processing modules 200, and does not perform the computational processing associated with the functional algorithm. In such cases, the circuit boards 106 may include input/output (I/O) circuitry to receive the raw data, and to return data results. In this configuration, the host PCs 104 can be rack-mounted as no user input or display is necessary. It will be recognized by those skilled in the art from the following description that implementations of the processing modules are available without the use of a host PC 104 to provide the information. For example, the processing modules 200 can be directly coupled to a data server 102 under appropriate circumstances, or alternatively can directly receive the raw data from local storage media or a real-time connection.

The processing module 200 of FIG. 2 includes a parallel execution module 202 and a bulk memory bank 204. The parallel execution module 202 includes multiple functional execution units 206 that implement executable portions of the desired functional algorithm in hardware. The configuration of the parallel execution module 202 is therefore dictated by the algorithm to be executed. When the algorithm changes, the parallel execution module 202 is modified accordingly. This can be effected in a variety of ways, but in preferred embodiments the multiple execution units are implemented in application-specific integrated circuits (ASICs), gate arrays, or field-programmable gate arrays (FPGAs), which can be modified when necessary. ASIC design minimizes, and perhaps eliminates, hardware redundancies and provides higher speed/performance, but the design must be complete before the ASIC is constructed. FPGAs provide freedom to modify an algorithmic design, but pay for this freedom in the way of reduced processing speed.

As will be described in greater detail below, all of the multiple execution units 206 are concurrently utilized to sustain peak execution rates. In other words, in every clock cycle, the processing capability of every execution unit 206 of the parallel execution module 202 is being exploited. This sustained processing activity maximizes processing efficiency, thereby circumventing the overhead inefficiencies of general processing computers. This is made possible in part due to the full hardware implementation of the functional algorithm, but requires many additional considerations related to bussing and data distribution, memory functions, memory control and proper data pipelining, all of which are discussed more fully below. The result is a unique, cost-effective computing architecture capable of sustaining peak performance for data-intensive applications.

Cooperating with the parallel execution module 202 is a data flow unit (DFU) 208. The DFU 208 serves a variety of purposes, including memory control and address/control signal distribution, algorithm control loop facilitation, expression evaluation, and data path distribution, all of which play a part in the realization of the functional algorithm.

The DFU 208 and the parallel execution module 202 are depicted as overlapping to illustrate their relationship. As will be described more fully below, selected functional execution units 206 are used in connection with the DFU 208 to create control structures corresponding to the control flow of the algorithm. The resulting control structures are therefore dictated by the particular algorithm to which the architecture is directed.

Raw data to which the functional algorithm is to be applied is stored in a data memory, illustrated in FIG. 2 as a bulk memory bank 204. In one embodiment of the invention, the bulk memory 204 includes a Synchronous Dynamic Random Access Memory (SDRAM) capable of supplying data to the DFU 208 in selected lengths of burst data. In more conventional computing environments, bursts of data from DRAM are often copied into cache memory which is then used for fast random access. In the present invention, no cache memory is required for this particular purpose. The memory is controlled by the memory control module (not shown) which is integrally designed into the DFU 208.

The memory 204 is controlled such that cache-level performance is obtained without the use of memory caches. As is described in greater detail below, the integrated memory controller within the DFU 208 is designed to allow for variable-length data bursts from the memory 204 to the DFU 208 as often as each clock cycle. The data path 210 takes on the maximum width of the memory data output (e.g., 16, 32, 64 bits), and supplies the DFU 208 and the functional execution units 206 with data via a predetermined data distribution arrangement.

Multiple memory units can be arranged in parallel to provide any data width desired within the bulk memory bank 204. The data path 210 is an aggregation of the one or more memory unit outputs. For example, where 16-bit SDRAMs are utilized, four SDRAMs may be used in parallel to provide a 64-bit data path 210.

The host PC 104 supplies the raw data to the bulk memory bank 204 via a data input path 212. The memory bank 204 is configured to operate in a burst mode. In one particular embodiment, a commercially-available Micron Technology, Inc. MT48LC4M16A1/A2 SDRAM is used as the memory 204. This SDRAM allows for full-page data bursts with a burst terminate option. The present invention uses such a data burst to provide continuous blocks of data to the DFU 208, optimally on every clock cycle.

The data path 210 distributes the data in a manner that ensures that all individual execution units 206 in the parallel execution module 202 and the DFU 208 receive data efficiently, such as on each clock cycle. In this manner, all buses in the distributed data path 210 are transmitting data in each clock cycle. The data distribution structure is dictated by the algorithm that is being implemented, and allows the algorithm to be executed in a single clock cycle. In one embodiment of the invention, this is accomplished through the use of non-multiplexed, discrete buses. The data path 210 is therefore replenished with new data from the memory bank 204 on each clock cycle, and supplies the data to the appropriate execution units 206 and the DFU control structures in each clock cycle. It should be recognized that a multiplexing bus can be used without departing from the scope and spirit of the invention, but a penalty is paid as additional clock cycles are necessary to carry out each pass or loop of the algorithm.

The integrated memory control within the DFU 208 controls the data flow from the bulk memory bank 204 to the DFU 208. This invention allows for the elimination of cache memory by distributing processors, and obtaining cache-like performance using the bulk memory 204 as controlled by the integrated memory control. An address/control path 214 couples the integrated memory controller to the bulk memory bank 204, and transmits the appropriate address and control signals required to obtain the desired memory output. The memory control is further described in connection with FIG. 3.

Figure 3:
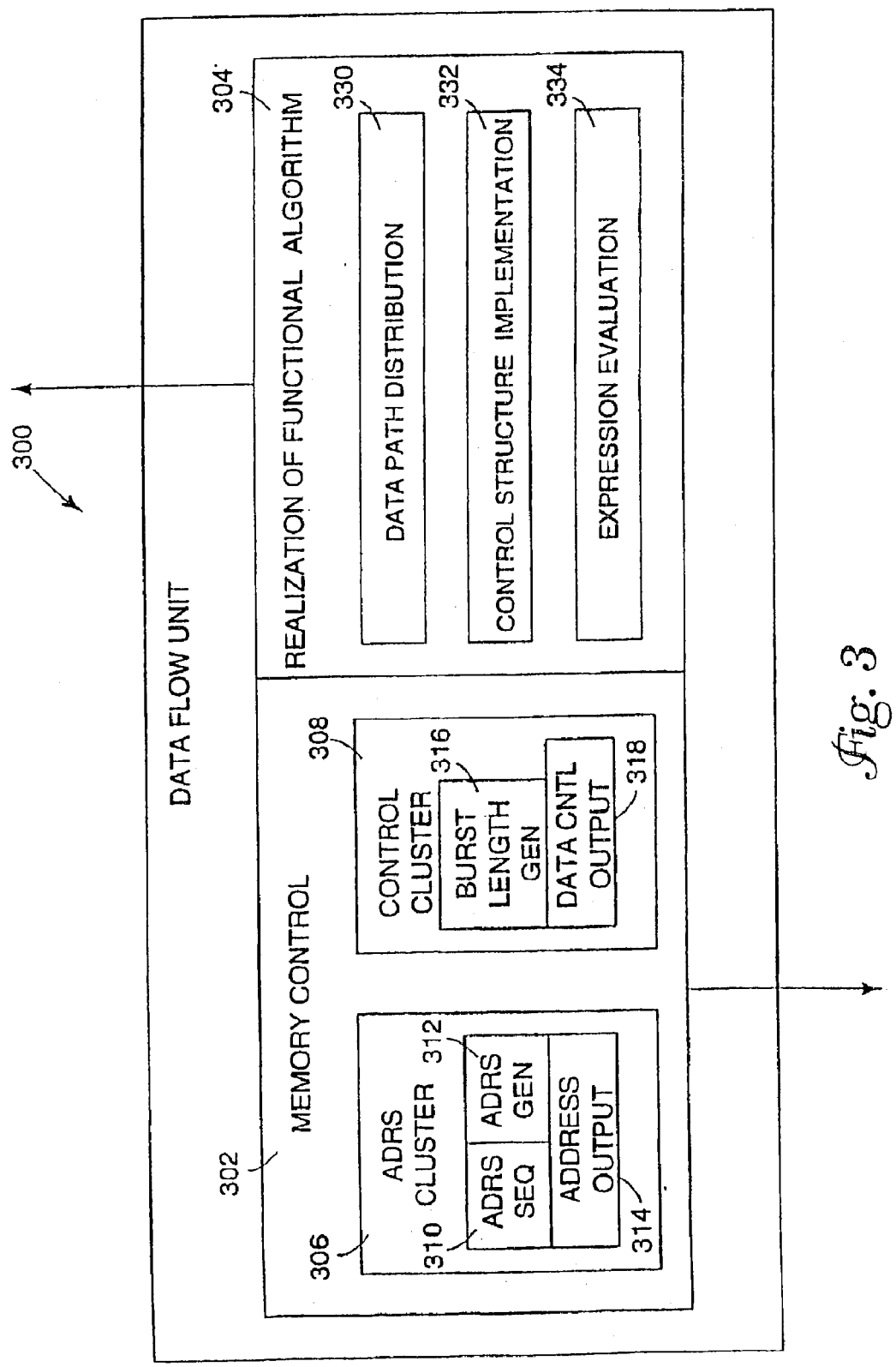
FIG. 3 is a block diagram illustrating one embodiment of a data flow unit (DFU) in accordance with the present invention.

FIG. 3 is a block diagram illustrating one embodiment of a data flow unit (DFU) 300 in accordance with the present invention. For purposes of illustration, the DFU 300 is functionally described as a separate and distinct module, however, the DFU 300 cooperates with the parallel execution module 202 and the bulk memory bank 204 such that the functions merge. The DFU 200 of FIG. 3 is described as a stand-alone unit in order to provide a clear description of its functionality.

The example DFU 300 includes a memory control module 302 and a module 304 for realization of the functional algorithm. The memory control module 302 is designed in hardware such that all address and data control signals are derived and transmitted in a single clock cycle. The memory control module 302 includes an address cluster 306, shown in FIG. 3 and a data control cluster 308. The particular implementation of the address cluster 306 is dependent on the functional algorithm being implemented, and therefore on the particular manner in which data must be read from the bulk memory bank 204. The address cluster 306 includes address sequencing functionality 310, address generation functionality 312, and an address output 314. The address generator 312 generates a starting address for a memory fetch. Because a preferred embodiment of the present invention involves the use of memory block transfers by way of memory "bursts", only one starting address needs be provided for any giving block of data that is desired. The starting address is outputted to the bulk memory bank 204 via the address output 314, which comprises a dedicated, non-multiplexing data distribution path coupled directly to the address input of the memory 204. The address sequencer 310 recognizes the length of a desired burst of data, and notifies the address generator 312 when the next block of data requiring a new starting address is going to be transmitted. In one embodiment, the address sequencer 310 is set to automatically increment to the next burst starting address when the desired burst count is reached, so that only a clock pulse is required as input to the memory controller. It should be recognized that the address cluster 306 is constructed in hardware such that an address can be outputted from the address output 314, needing only the receipt of a single clock pulse. Pipelining within the address cluster 306 can be implemented where necessary to insure that a starting address is provided at the address output 314 on the next available clock pulse following transmission of a complete data block.

The data control cluster 308 is similarly constructed in-hardware. The control cluster 308 includes a burst length generator 316 which provides control signals to the bulk memory bank 204 via the data control output 318. For memory devices which allow burst transfers of particular lengths, the burst length generator can provide the number of bytes desired. In one embodiment of the invention, burst length generation is not required. In that particular embodiment, an SDRAM capable of performing full-page bursts with a burst terminate option is utilized. In this case, a starting address plus a full-page burst command can be presented to the SDRAM, and the address sequencer 310 thereafter provides a burst terminate command when appropriate. For example, the address generator 312 can output a starting address to the memory 204 along with a command to initiate a burst transfer. A predetermined number of bytes later, the address sequencer 310 can provide a burst terminate command via the address output 314 to the memory 204 to stop the burst transfer after a predetermined number of bytes have been transferred from the memory 204. This memory control configuration eliminates control signal protocols which require additional clock cycles. The memory control 302 is therefore a variable-length memory controller providing variable-length data bursts as required by the algorithm, which may or may not require the use of a potentially deep pipeline. For example, where a 100-byte data burst is provided to the data flow unit to perform the functional algorithm, a 100-register pipeline can be used in the memory control module 302 to ensure timely presentation of a subsequent data burst starting address immediately upon transmission of the final byte of a preceding memory burst. It should also be recognized that; depending on the format of the raw data in the bulk memory bank 204, the memory control module 302 can be configured to provide variable-length data bursts (i.e., 30 bits in a first burst, 31 in a second burst, etc.). The variable-length burst control can also be varied to accommodate different algorithms. Furthermore, in one embodiment of the invention, "tiling" is implemented to provide data bursts from within a single row of memory to avoid address wrap-around conditions. This allows the "structure" of the memory to be exploited, as opposed to viewing it as a homogeneous bank of storage cells.

As can be seen from the foregoing description, the memory control and memory control pipeline eliminates the possibility of even one clock cycle occurring where no data is presented. Therefore, the present invention is "fully pipelined", meaning it is pipelined to the extent that every clock cycle produces a valid algorithm output.

The memory control module 302 therefore becomes a physical replica of the memory control portion of the functional algorithm. The memory access patterns generated by the memory control 302 provide for sustained execution of the DFU 208 and the parallel execution module 202 shown in FIG. 2. This allows all functional execution units within the processing module to be concurrently and continually active and direct, non-multiplexed distribution paths between the memory control 302 and the memory facilitate single cycle memory control. This configuration results in "cache-like" performance using standard memory.

The data flow unit 300 also includes the algorithm realization module 304. This section of the data flow unit 300 is a physical manifestation of the processing algorithm to be executed. In order to physically embody the algorithm into hardware, the algorithm realization module 304 includes various functions including data path distribution 330, control structure implementation 332, and expression evaluation 334.

The algorithm realization module 304 also works in connection with functional execution unit 206 described in connection with FIG. 2. The data path distribution 330 essentially includes the bussing and data pipelining required to effect single cycle execution. The bussing architecture within the algorithm realization module 304 includes discrete, dedicated buses to provide the data from the memory bank 204 to the desired one or more functional execution units 206. These buses are non-interleaved, non-multiplexed buses that are dictated by the particular functional algorithm being implemented. Multiplex data buses would require additional clock cycles. Pipelining may also play an important role in the distribution of data depending on the particular algorithm to be implemented. Pipelining is described in greater detail in connection with the description of FIGS. 6A, 6B, and 6C.

The control structure implementation 322 of the DFU 300 represents a transformation of the control flow of the algorithm being implemented. The control flow of the algorithm is essentially mapped into a corresponding control structure in the DFU 300. The DFU 300 also includes expression evaluation 334. An "expression" is a combination of variables, function calls, and operators that result in a single value. For example, A+(B×C) is a combination of addition and multiplication operators resulting in an expression. The expression evaluation 334 element of the DFU 300 accounts for such expressions.

Figure 4:
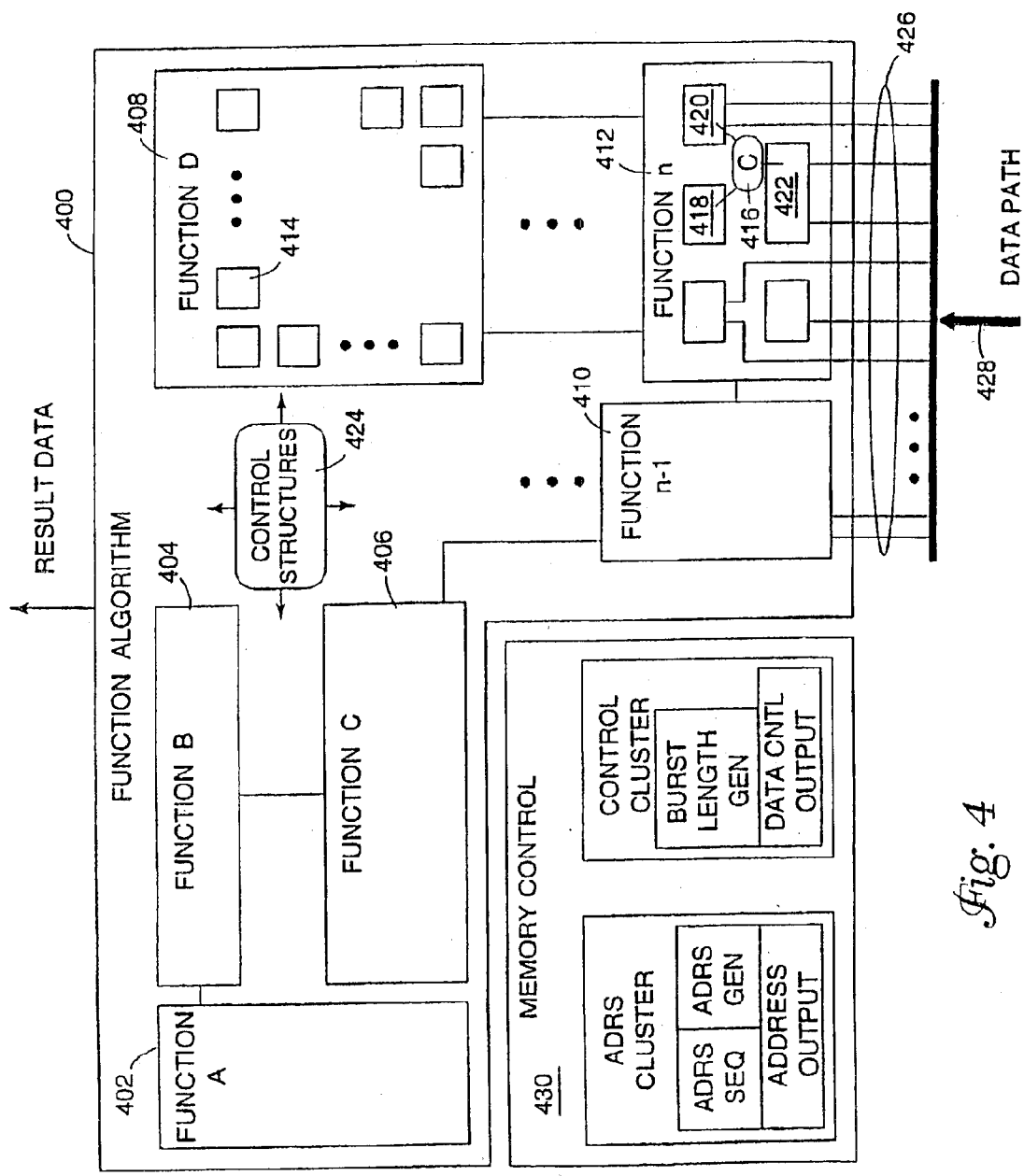
FIG. 4 is a block diagram conceptually depicting a transformation of a functional algorithm into hardware in accordance with the present invention.

FIG. 4 is a block diagram conceptually illustrating a hardware manifestation of a functional algorithm in accordance with the present invention. For purposes of illustration and not of limitation, the functional algorithm 400 of FIG. 4 is depicted as having multiple functions, including function A 402, function B 404, function C 406, function D 408, through function n−1 410 and function n 412. The number of processing functions to be performed is dependent upon the particular algorithm to be applied in hardware. To perform any particular function, multiple sub-functions may be necessary. For example, looking now to function D 408, one particular sub-function is illustrated as sub-function 414. As an example, function D 408 may represent an absolute value function, and the sub-function 414 may represent one of a plurality of inverters used in the particular implementation of an absolute value function.

The control structure implementation 332 in the DFU 300 integrally cooperates with the sub-functions of a particular function, as illustrated by the control structure designator 416 of function n 412. The control structure 416 provides the interconnection between the sub-functions 418, 420 and 422 as dictated by the algorithm. Similarly, the control structures of the DFU 300 allow the functions of the algorithm to be processed in accordance with the control flow of the algorithm as depicted by the control structure block 424. The functions and sub-functions illustrated in the functional algorithm 400 are typically accomplished using the functional execution units 206 previously described in connection with FIG. 2.

The data path distribution 330 described in connection with FIG. 3 is partially illustrated as the input bus 426 which is the data path 428 as received from the bulk memory bank. The individual connections on the bus 426 are provided to their corresponding functional units of the algorithm as illustrated by the individual connections directed to the sub-functions of function n 412. The data is acted upon at function n 412, and the results are then forwarded to subsequent stages of the algorithm performed by other functions such as D 408 and function n−1 410. Timing considerations are accounted for using pipeline registers, which will be described in greater detail below.

The memory control module 430, analogous to the memory control module 302 of FIG. 3, performs the functions previously described in connection with FIG. 3. As was previously described, the memory control module 430 ensures a continual stream of data to the data path 428 to be distributed throughout the functional algorithm 400 by way of the bus 426. The functional execution units, sub-functions, functions, control structures, discrete bussing, and pipeline structures of the functional algorithm 400 allow the functional algorithm to be executed in a single clock cycle when the pipeline, if any, is full. Therefore, software execution of an algorithm that includes sequential processes involving one or more multiple clock cycles during certain steps of the algorithm, may be effected in a single clock cycle with the present invention, including the entire functional algorithm. When the functional algorithm is continually repeated, for example, to perform similar computations on large volumes of test data input, new data can be processed on each clock cycle. This substantially increases the rate at which the raw test data can be processed.

Figure 5:
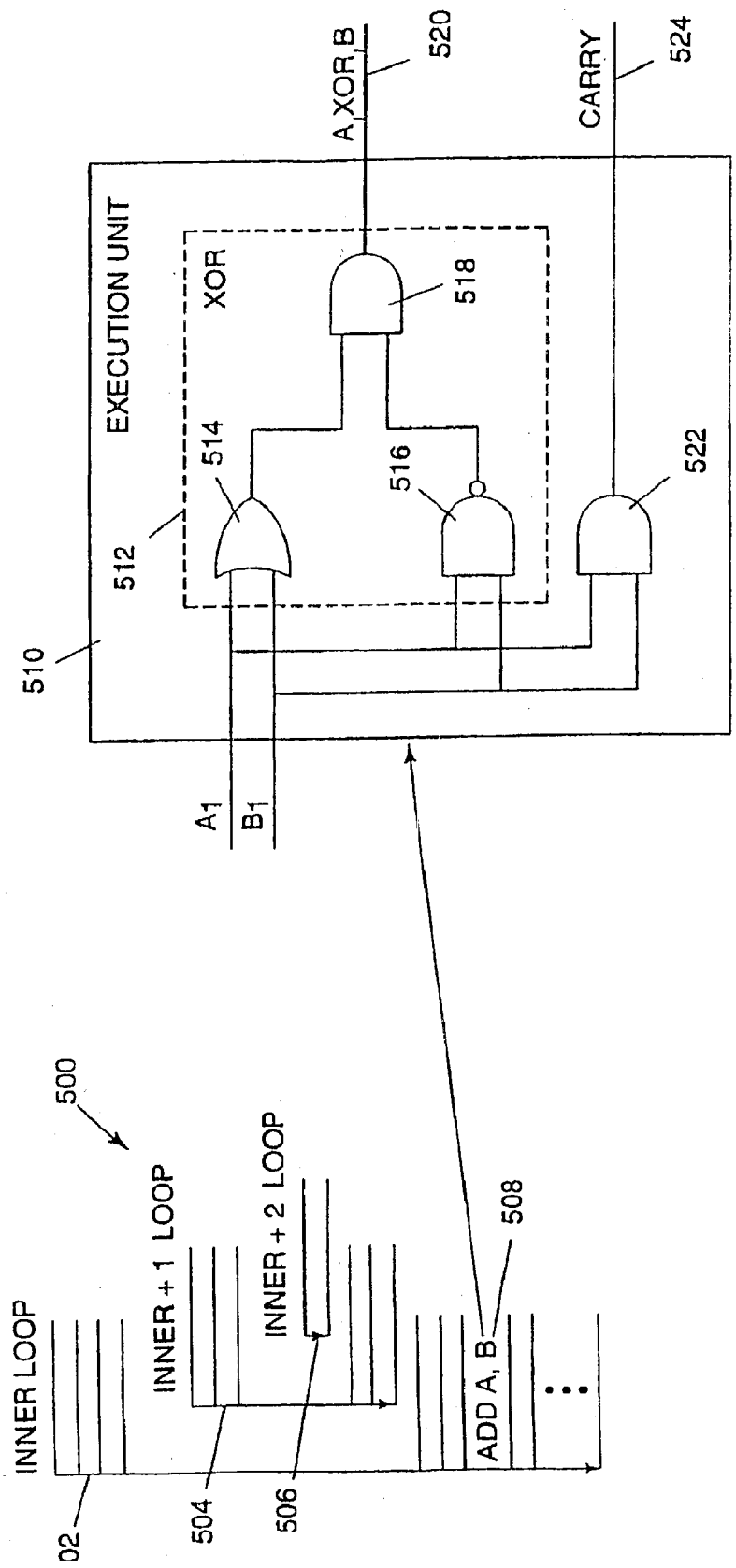
FIG. 5 illustrates one embodiment of the transformation of a selected segment of a core software routine loop into a corresponding portion of the parallel execution module.

FIG. 5 illustrates one embodiment of a transformation of a selected portion of a core software routine inner loop into a corresponding portion of the parallel execution module. Most conventional general purpose computing systems are descendants of what is typically referred to as the von Neumann, or sequential execution, machine. On such a machine, a sequential program includes a sequential list of program instructions that are executed in the order of program presentation. The fundamental or "inner" loop in a program is sequentially executed in a continual loop. In conventional general purpose computers, the inner loop is formed from a predetermined, general instruction set. However, with general instruction sets, there is a limited ability to reduce the total number of instructions. Increasing the clock rate is one common manner in which execution speed is currently increased in general purpose computers. Memory caching functions are also commonly used to increase data throughput, but this introduces cache coherency complexities in parallel processing systems.

The present invention is capable of executing an entire core routine, such as the fundamental inner loop, in a single clock cycle. While various aspects of the present invention facilitate this objective in combination, FIG. 5 illustrates one of the constituent elements. This involves the translation of each software instruction into a corresponding hardware equivalent.

Referring to FIG. 5, the core routine 500 is illustrated having an inner loop 502, and possibly one or more additional nested routines or loops. For example, first and second nested core routine levels are illustrated in FIG. 5 as the inner+1 loop 504 and the inner+2 loop 506. One representative software instruction is an addition instruction, labeled ADD A,B 508. This instruction is transformed into a hardware execution unit 510 that performs the desired mathematical function. The inputs $A_1$ and $B_1$ in this example represent two corresponding bits of the n-bit variables A and B to be added together. Analogous parallel execution units would add the remaining bits of the A and B variables.

$A_1$ and $B_1$ are inputted into an exclusive-OR (XOR) module 512 which includes an OR-gate 514, a NAND-gate 516 and an AND-gate 518 to produce the sum on output line 520. Where both $A_1$ and $B_1$ have binary 1 values, AND-gate 522 produces a carry signal on line 524 to the next level execution unit (not shown). As will be described in further detail below, the bussing architecture in one embodiment of the present invention utilizes non-multiplexed, non-interleaved, dedicated signal paths to facilitate single-cycle execution. Where each of the instructions of the inner loop are similarly converted to parallel execution units, it can be seen that the entire functional algorithm embodied by the inner loop can be realized in hardware.

The multiple execution units aggregately reflect the functional algorithm, and in fact are dictated by the algorithm to execute in a single clock cycle. Inner loops and other core software routines associated with data-intensive applications are typically quite short, thereby making hardware implementation of the algorithm practicable. The particular algorithm of the present invention dictates the content of the multiple execution units, as well as their interconnection. In some instances, the interconnection is effected through the use of a potentially deep data pipeline to account for timing considerations, as described in connection with FIGS. 6A, 6B 10 and 6C below.

Figure 6C:
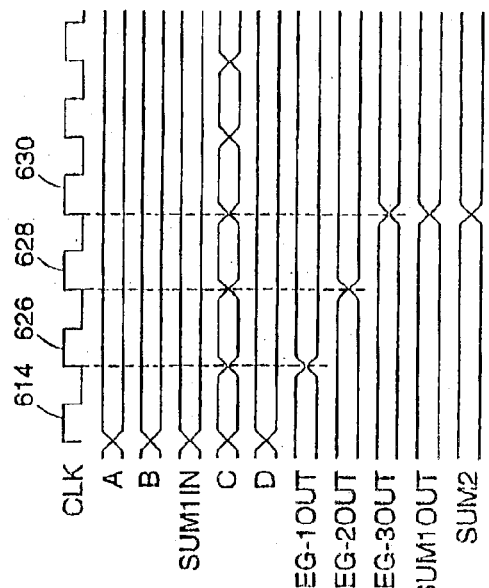
FIG. 6C is a timing diagram of the transformed core routine loop segment of FIG. 6B.
Figure 6B:
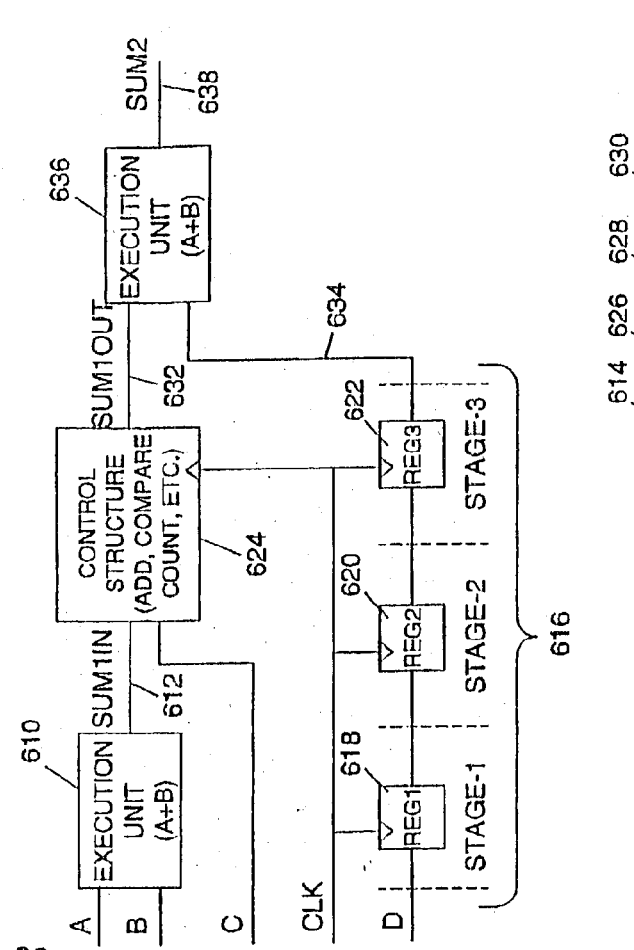
FIG. 6B is a block diagram of an example implementation of a core routine loop segment provided in FIG. 6A.
Figure 6A:
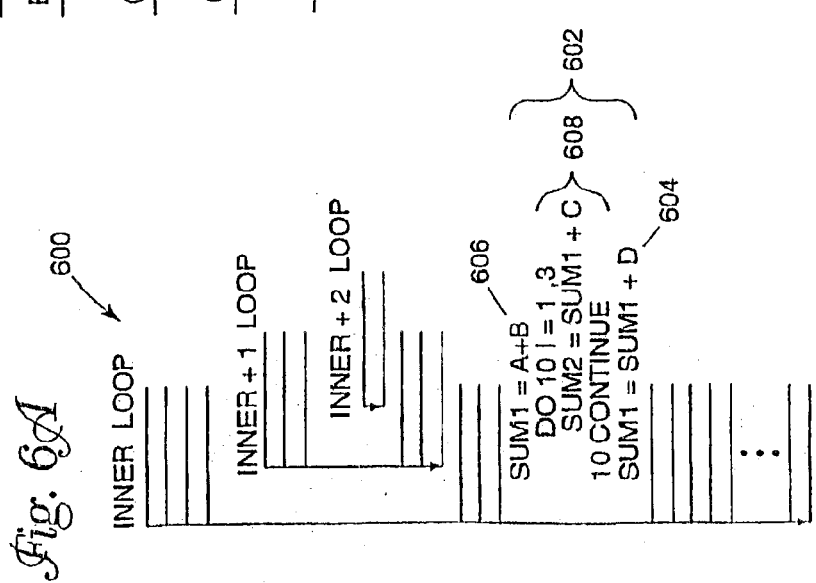
FIG. 6A illustrates a sample core routine that can be transformed in accordance with the present invention.

FIG. 6A illustrates an example core software routine that can be transformed in accordance with the present invention. The direct transformation of a functional algorithm can present intra-algorithm timing considerations which are managed in the present invention by way of a deep data pipeline.

By way of example, a functional algorithm 600 is illustrated as it would be implemented in software. Within this algorithm is a function 602 to determine a sum, referred to as SUM2 at line 604. This example function 602 includes two sub-functions, illustrated by line 606 and loop 608. The loop 608 is a control function that is effected through the use of functional execution units and corresponding control structure.

A software implementation of such an algorithm on a general-purpose computer would require that the instructions in the program be executed sequentially. This, coupled with the fact that execution of each instruction may require multiple clock cycles (e.g., address generation, fetch, execute, etc.), reveals that such an implementation may require tens, hundreds, or even thousands of clock cycles to execute a single pass of the algorithm even for a relatively small inner loop. For data-intensive applications where perhaps millions or billions of simulations (i.e., algorithm loops) must be performed, the execution time is unacceptable.

FIG. 6B is a block diagram of an example implementation of the function 602 in accordance with the present invention. Because the variable SUM2 of line 604 is dependent on the state of the variable SUM1, SUM2 cannot be calculated until the "do-loop" 608 has completed. In order to account for this dependency, a pipeline constructed of registers is utilized. Depending on the algorithm, this pipeline can be very deep. This does not substantially effect the performance of the processing system however, since the only time delay that occurs is during filling and draining of the pipeline. Once the pipeline is full, the processing system outputs simulation output on each clock pulse.

Algorithm sub-function 606 is performed by one of the functional execution units 610 in the system. Execution unit 610 receives as input variables A and B, and produces the first SUM1 iteration labeled $SUM1_{IN}$ on path 612. Input variables C and D are also concurrently inputted. FIG. 6C illustrates this timing, as variables A, B, C and D are provided at the triggering edge of clock pulse 614, and SUM1 on path 612 occurs during the same clock pulse, slightly delayed due to propagation delays (propagation delay not illustrated).

Because variable D is to be added to SUM1 to produce SUM2, variable D must be delayed until the final SUM1 value is available. This is accomplished through a pipeline 616 of registers 618, 620, 622, the number of which depends on the control flow of the algorithm. In this particular example, the do-loop 608 includes three iterations (i.e., DO . . . I=1,3), which may be used in instances where the variable C changes on each clock cycle. Therefore, three registers are used to coordinate the timing of the generation of SUM2.

The $SUM1_{IN}$ signal on path 612 is provided to a hardware control structure 624 which performs the do-loop 608. Various sub-functions are performed as part of the do-loop 608, including an addition sub-function (SUM1=SUM1+C), and a comparison sub-function to determine whether the loop has been executed the requisite number of times. Because the variable C changes on each of the three clock cycles (i.e., three consecutive memory cycles provide three different values of C), this sub-function requires three clock cycles to completely execute. This is illustrated in FIG. 6C, where the variable C changes on each of the triggering clock pulses 626, 628 and 630. Also, on the occurrence of each of the clock pulses 626, 628 and 630, the variable D propagates through the pipeline 616. At clock pulse 614, the variable D is passed through register-1 618 (stage-1), which in turn is passed through register-2 620 on clock pulse 628 (stage-2), and finally passes through register-3 622 on clock pulse 630 (stage-3). The $SUM1_{OUT}$ signal on path 632 is not provided to the execution unit 636 until the triggering edge of clock pulse 630 occurs, due to the three-stage do-loop 608. Similarly, the variable D is not provided on path 634 to the execution unit 636 until the triggering edge of clock pulse 630 occurs, due to the three-stage pipeline 616. Therefore, the $SUM1_{OUT}$ signal on path 632 and the staged variable D on path 634 reach the execution unit 636 during the same clock period, and SUM2 is executed and produced at the output of execution unit 636 on path 638. Once the pipeline 616 is full, a new SUM2 will be produced on each occurrence of a clock signal. Similar executions are carried out for each portion of the algorithm, ultimately resulting in an output of an entire algorithm loop on each clock cycle. Once full, the pipeline remains full, and is as deep as required to produce an algorithm output on each clock cycle.

It should be understood that each stage of the pipeline can include numerous execution units operating in parallel in any given stage of its respective pipeline. From the foregoing description it can be seen that the use of multiple execution units, in connection with a pipeline structure having a depth corresponding to the number of dependency "wait states", results in an architecture capable of providing a computed output from one loop of the functional algorithm on each clock cycle. Therefore, various pipeline fragments associated with different execution units are themselves arranged in series, and in parallel, with other pipeline fragments to provide a complete pipeline structure that is full-width (i.e., allows all execution units to function in parallel), and that is full-depth (i.e., pipelined from front to back to facilitate single-cycle execution when the pipeline is full). It should also be understood that the particular functions and sub-functions are dictated by the functional algorithm, and therefore the chosen function and sub-functions of FIGS. 6A, 6B and 6C are presented for purpose of example only, and the invention is not to be limited thereto.

Figure 7:
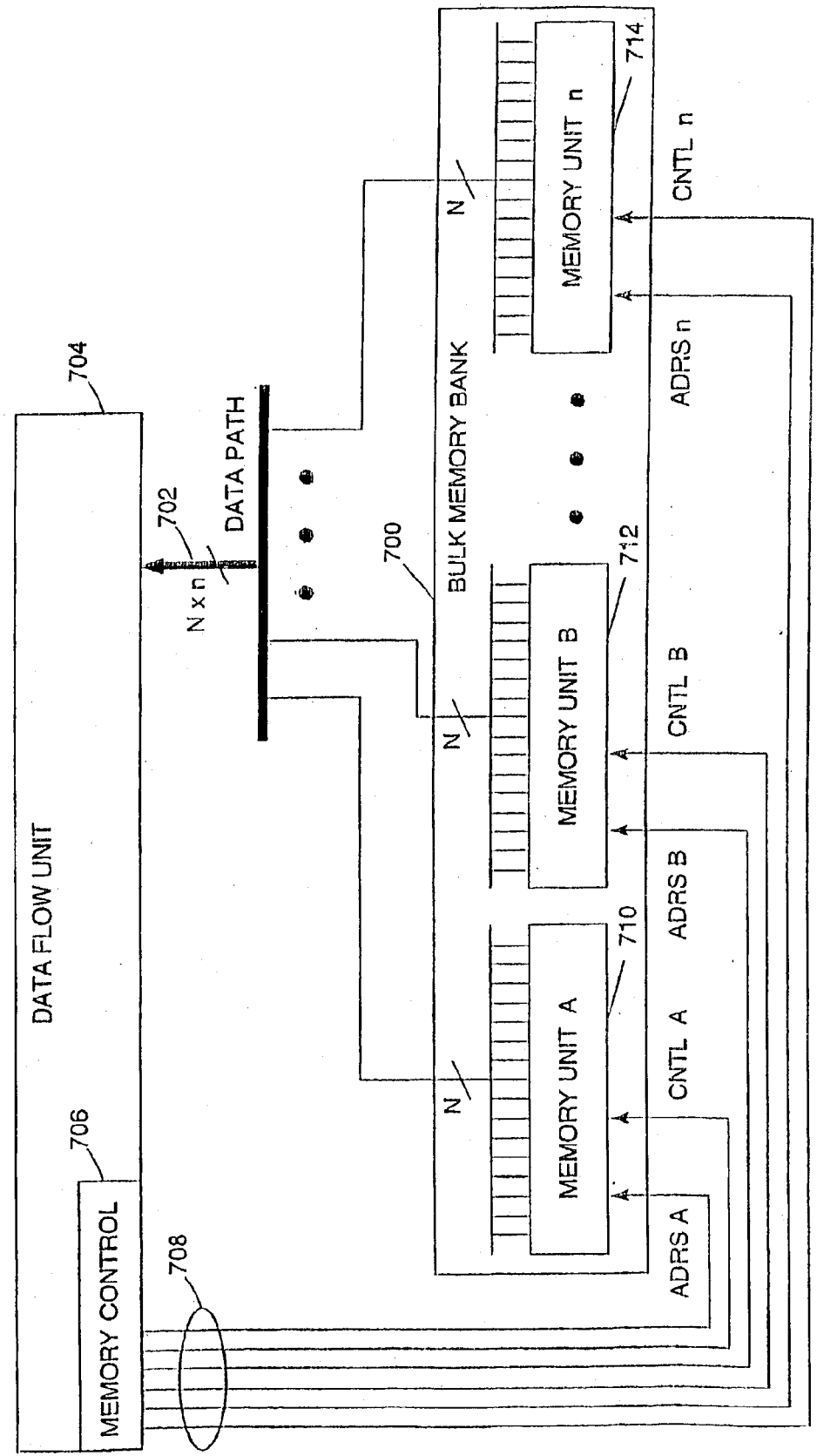
FIG. 7 is a block diagram of one embodiment of a memory bank and corresponding data path associated with the processing architecture.

Referring now to FIG. 7, a block diagram of an example memory bank 700 and corresponding data path 702 is provided. As previously described, the data flow unit (DFU) 704 includes memory control 706 to provide control signals to the memory bank 700. The control paths 708 carry the control signals to the memory bank 700, which may include multiple discrete memory units, such as memory unit A 710, memory unit B 712 through memory unit n 714. Depending on the algorithm, a certain data width will be necessary to carry out a complete pass of the algorithm in one clock cycle, which dictates the width of the data path 702. Depending on the data output width of the selected memory units, one, two or more memories can be arranged in a parallel fashion to accommodate the required data width. In the example of FIG. 7, each memory unit 710, 712 . . . 714 has a 16-bit data output. If the algorithm requires 30 data signals, then four 16-bit memory units are coupled in parallel to create the data path.

The control paths 708 are illustrated as individual paths each directly coupled to a particular memory unit. Address and control information is provided by the memory control 706 to the memory units via the control paths 708. It should be recognized that a common data burst starting address, and/or common control signals can be provided to all (or selected ones) of the memory units if the memory units are operating entirely symmetrically. For example, if each memory unit is to burst the same number of bytes from the same address, one address and one burst control signal can supply each of the memory units.

Figure 8:
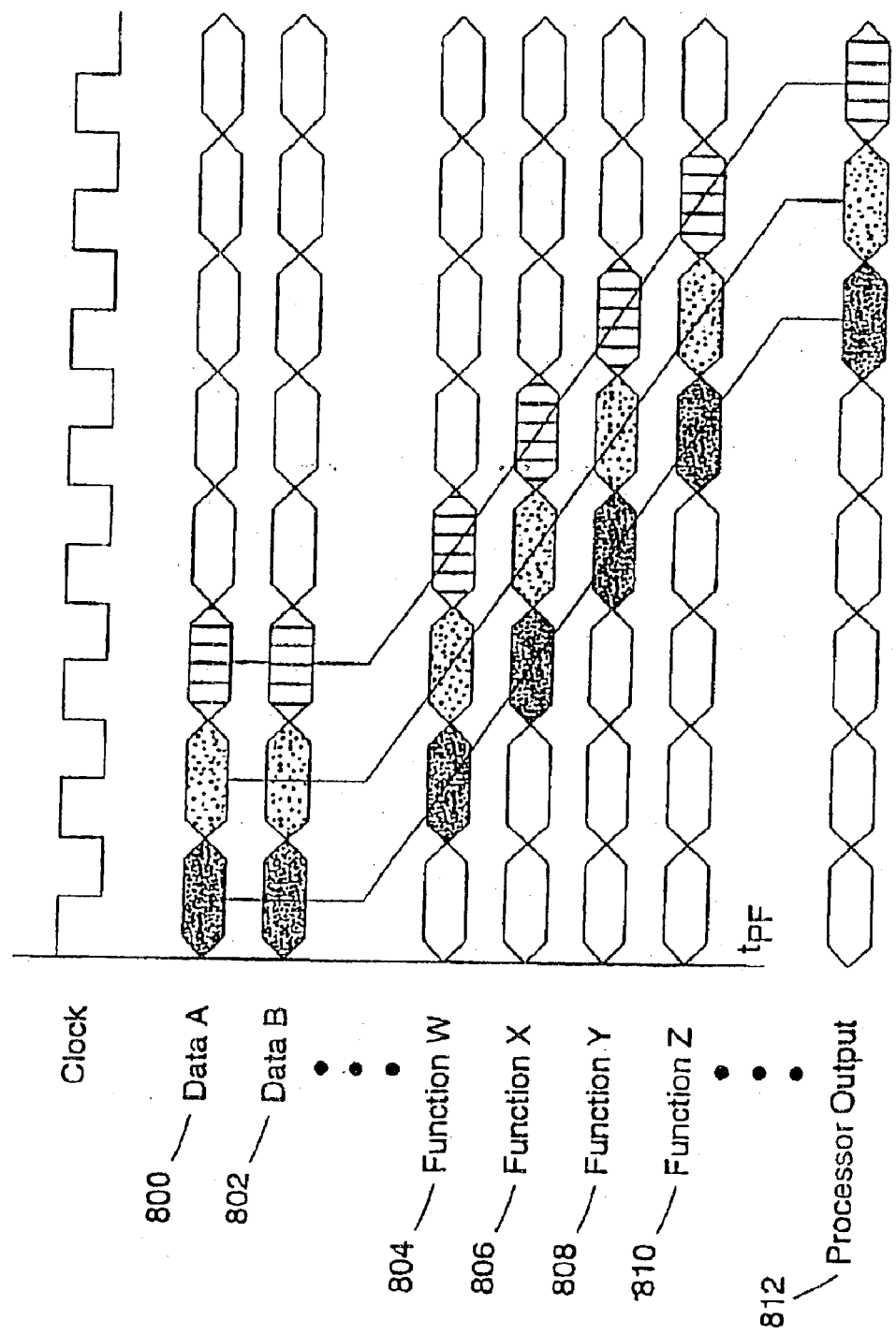
FIG. 8 is a mock timing diagram representative of the sustained, fully-pipelined execution attainable with the present invention.

FIG. 8 is a mock timing diagram representative of the sustained, fully-pipelined execution attainable with the present invention. The diagram is provided to illustrate that once the deep pipeline is filled at time $t_{PF}$ (time=pipeline full), every data input, every function and sub-function, and every control structure is executing on every clock cycle. There are no latencies or other delays involved. For example, on each triggering clock pulse, the data path presents a new burst of data, as illustrated by two of the data signals, Data A 800 and Data B 802. The data may be processed through a series of functions, labeled Function W 804, Function X 806, Function Y 808, and Function Z 810. For purposes of illustration, it is assumed that each of these functions are dependent on pipelined inputs each having a one-clock-cycle dependency. This results in Data A 800 and Data B 802 being processed at the next clock pulse for each of the stage-dependent functions. The processor output 812 is provided a number of clock cycles later, depending on the depth of the pipeline dictated by the algorithm. For each group of data provided on the data path, the processor output therefore represents a completed algorithm output on each clock cycle, thereby providing sustained peak performance.

Figure 9:
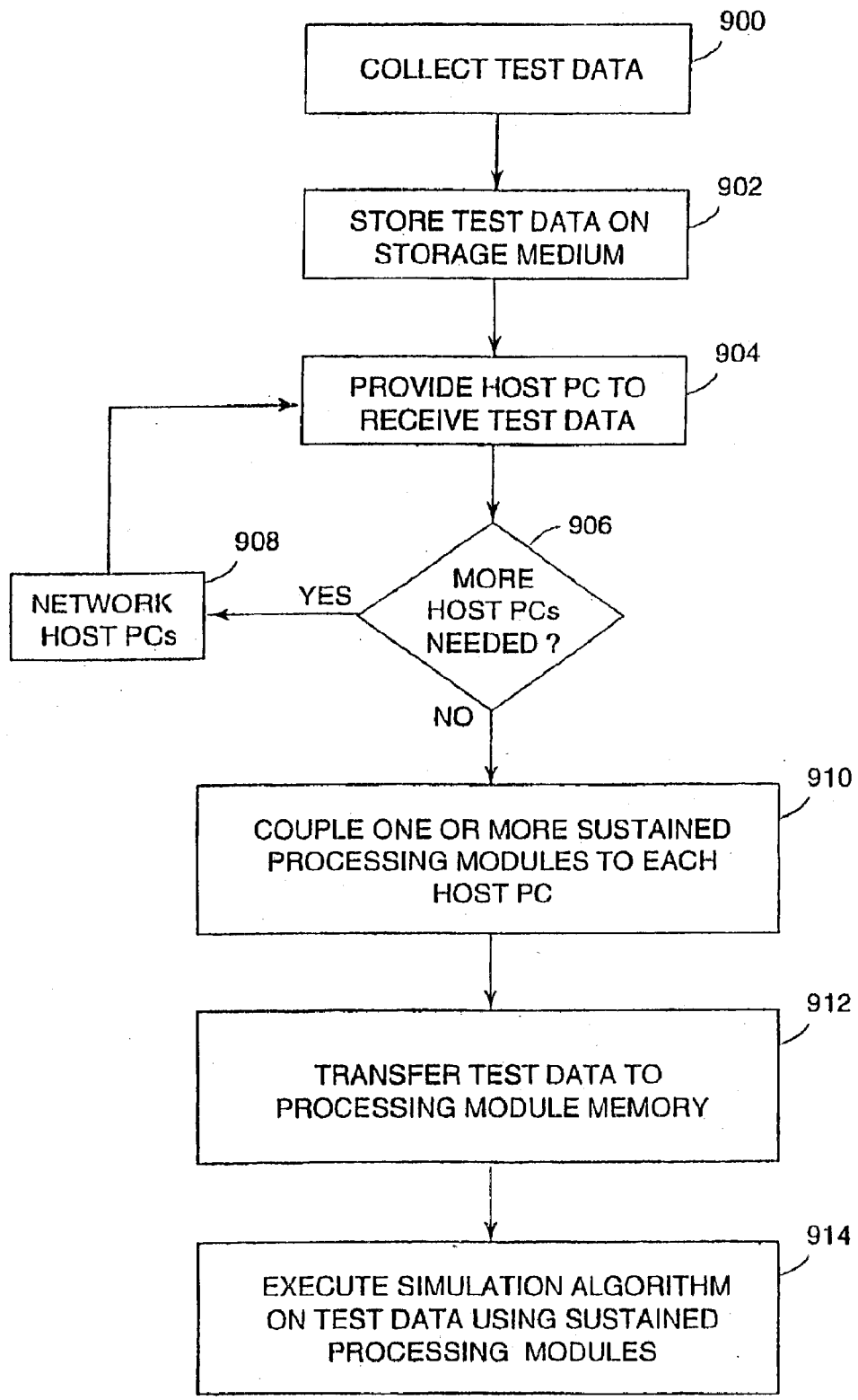
FIG. 9 is a flow diagram illustrating one exemplary manner in which the present invention may be employed.
Figure 13:
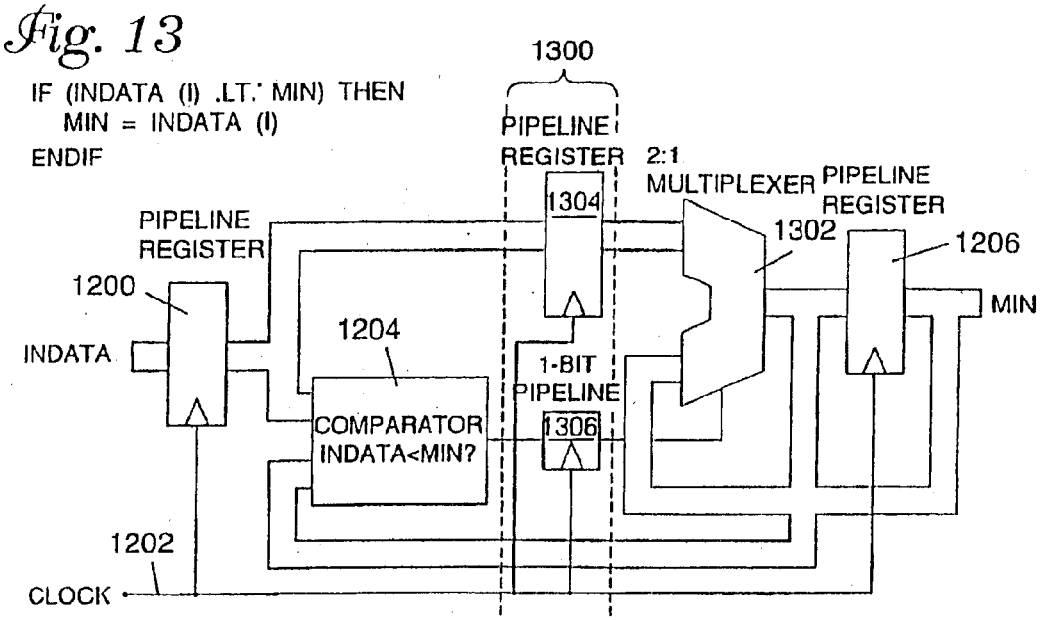

FIG. 9 is a flow diagram illustrating one exemplary manner in which the present invention may be employed.

This process is particularly advantageous in situations where data-intensive computer applications are required. For example, scientific testing and simulation often requires the collection of extremely large volumes of test data, which thereafter must be processed by an algorithm to arrive at a conclusion to which the voluminous data suggests.

In this exemplary embodiment, test data is collected 900. The test data is stored 902 on storage media. Alternatively, the test data can be directly transmitted rather than first stored on the storage media. A host PC is provided 904 to receive the test data that has been collected. If the test data is a particularly large volume of data, it is determined 906 whether more host PCs are needed. If so, more host PCs may be added, and can be arranged in a networked configuration as seen by block 908. When all host PCs have been provided, one or more sustained-execution processing modules in accordance with the present invention are provided in each of the host PCs, as seen at block 910. The test data is transferred 912 from the host PCs to the memory in the processing modules. When the memory within the processing modules have received the test data, the algorithm is executed 914 by the sustained-execution processing modules.

The transformation process itself is best illustrated by examples. FIG. 10 represents a software routine 1000 programmed to calculate the maximum, minimum, root-mean-square (RMS) and average values in a sequence of numbers. Assignment of data types and initialization of variables can be seen at program segments 1002 and 1004 respectively. The main or "inner" loop of the routine is represented by program segment 1006, and includes two sub-loops 1008 and 1010. Mathematical calculations are carried out at program segments 1012, 1014, 1016 and 1018. FIG. 10 is to be referenced in connection with the following flow diagram of FIG. 11.

FIG. 11 is a flow diagram illustrating an exemplary process for carrying out transformations of an algorithm or software routine as described in connection with FIG. 10. First, the responsibilities of the one or more host computers is determined 1100, and the host computers are programmed to provide raw test data to the processing modules, and to store processing execution results. The host computer may be programmed to perform additional tasks if it is not economical to include dedicated hardware in the processing module to accomplish these additional tasks. For example, the host PC can write to particular registers in the processing module, such as to initialize the COUNT, MIN, MAX values, and can initialize hardware by clearing SUM and RMSSUM, setting I=1, etc. In the example given, the host processor could also perform the final generation of AVG and RMS, as they are relatively simple calculations and only performed once. In such cases, although possible, it is not economical to provide this functionality in the processing module of the present invention.

Figure 29:
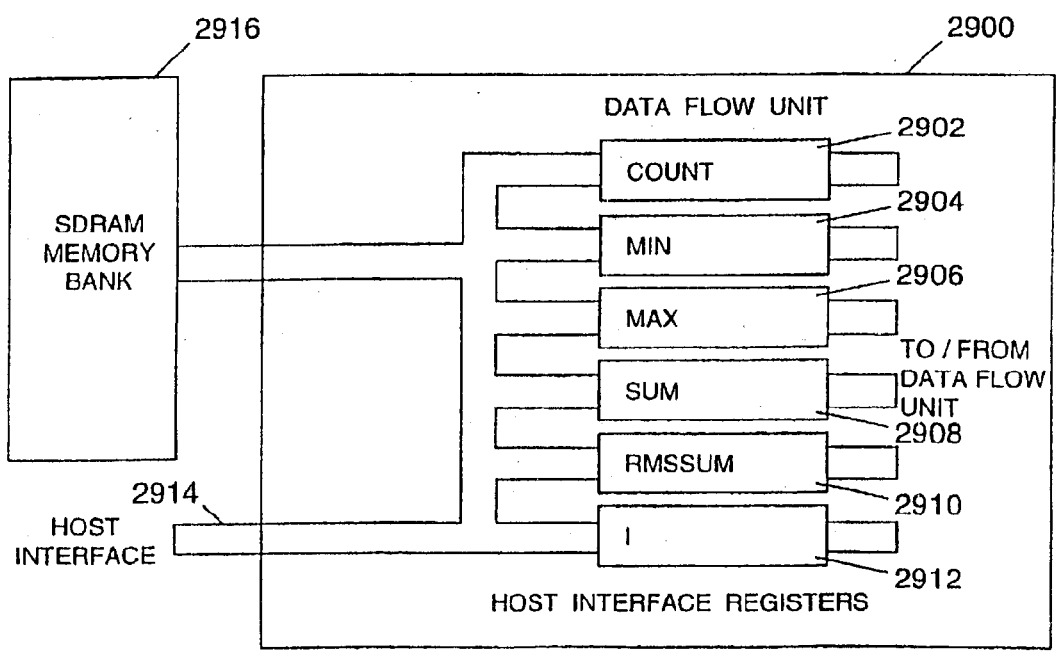
FIG. 29 illustrates an example of a data flow unit including host interface registers capable of being loaded by the host computer.

FIG. 29 illustrates an example of a data flow unit 2900 including host interface registers 2902, 2904, 2906, 2908, 2910, and 2912. These registers can receive the constants/variables COUNT, MIN, MAX, SUM, RMSSUM and I using the host interface 2914 and the memory bank 2916. These constants/variables can then be accessed as part of the normal operation of the data flow unit 2900. This provides a great deal of flexibility to reset variables, and modify constants if desired, without requiring hardware implementation. The use of a host interface for this purpose does not adversely affect the desired speed of the inventive system, since these constants/variables need only be loaded once prior to execution of the algorithmic loop.

Returning again to FIG. 11, the requisite amount of memory and the memory output format is then determined 1102. In the example of FIG. 10, there is only one array read per iteration of the inner loop, although it is referred to seven times. Therefore, only one memory bank is required in this example.

At this point, hardware implementations for the algorithm and each of the individual tasks within the algorithm (i.e., sub-functions) are derived 1104. To illustrate, the nested loop 1008 is analyzed in connection with FIGS. 12–17.

FIG. 12 illustrates one approach to transforming a software conditional statement into hardware. In this embodiment, the data is registered at register 1200, and on the next occurrence of the clock signal (path 1202), the data is provided to the comparator 1204 and to register 1206. Register 1206 stores the last MIN value entered at the last clock pulse. The current MIN value at the output of register 1206 is also fed back to an input of the comparator 1204, so that the current MIN value is compared to the new data from the register 1200.

A hardware comparison of INDATA(I) and MIN results in a "true" or "false" enable signal on path 1208. If the enable signal reflects a "true" condition, the variable MIN is updated in the register 1206. This transformation illustrates an example of the pipelining implemented in accordance with the present invention. In a first clock cycle, INDATA(I) is provided to the comparator 1204 where it is compared with MIN, and the result of the comparison is latched in register 1206 on a second clock cycle. As can be seen in FIG. 12, the nested loop itself is transformed into hardware. To update the register 1206 in the same clock cycle in which the comparison is performed (thereby not requiring pipeline stages) requires that the comparison be performed quickly enough to meet the required enable signal setup time of the register 1206.

Figure 14:
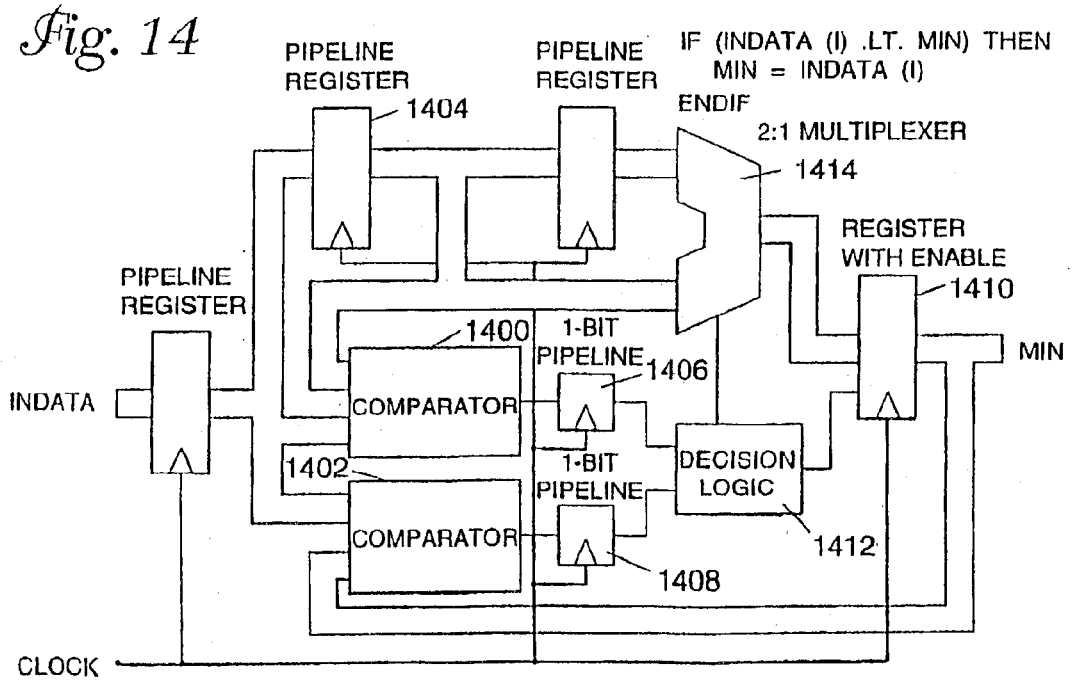

In the pipelined case, a comparison of INDATA(I+1) and the minimum value "so far" is performed in the second clock cycle. The minimum value "so far" might be in MIN, or might be in the pipeline register, depending on the value of the condition. The configuration illustrated in FIG. 13 can be used in this situation. An additional pipeline stage 1300 and a multiplexer 1302 is utilized. The inputs INDATA are provided to the comparator 1204 from register 1200. The multiplexer 1302 selects either MIN at the output of register 1206, or the pipeline register 1304 output, depending on the condition value supplied by the comparator 1204 via the bit pipeline 1306. The multiplexer 1302 also provides the means to selectively update register 1206, and thus there is no additional complexity.

Where higher speed is required, two comparisons can be performed in parallel. This embodiment is illustrated in FIG. 14, where two comparators 1400, 1402 perform comparisons in the first clock cycle: (INDATA(I).LT.MIN) and (INDATA(I).LT. INDATA(I−1)), where INDATA(I−1) is the pipelined copy of INDATA (I) from pipeline register 1404. Both condition codes are latched as well, as INDATA(I) and INDATA(I−1) in bit latches 1406 and 1408.

In the second clock cycle, the MIN value at the output of register 1410 is updated taking both condition codes into account at the decision logic 1412. The decision logic 1412 provides both the selection signal to the multiplexer 1414, and the enable signal to register 1410. Analogous circuitry can be implemented to calculate the MAX value.

Figure 15:
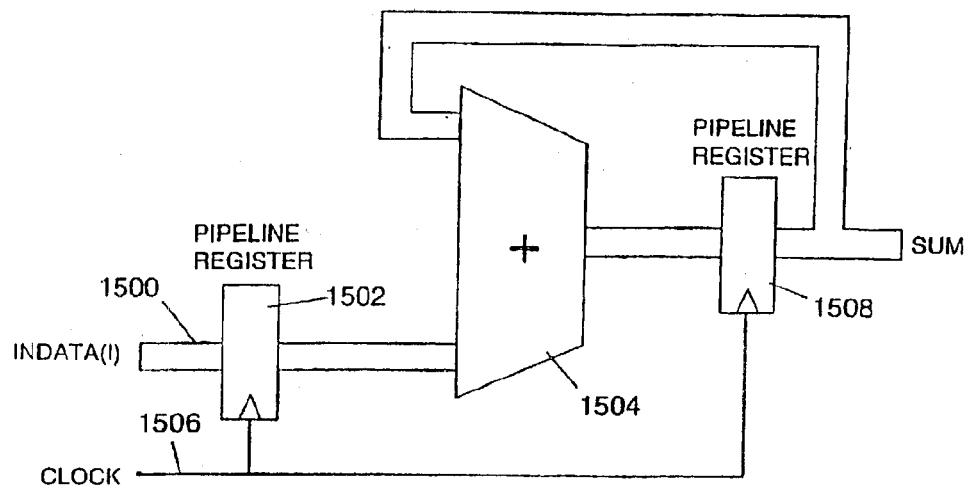
FIGS. 15 and 16 illustrates different approaches to transforming a software mathematical function into hardware.

FIG. 15 illustrates one approach to transforming a software mathematical function into hardware. The statement SUM=SUM+INDATA(I) can be transformed to hardware as illustrated. The INDATA(I) on input path 1500 is provided to register 1502, and inputted to the adder 1504 when the clock signal on path 1506 activates the register 1502. The adder output is staged at register 1508, the output of which is the SUM. The current value of SUM is fed back into the adder to accomplish the desired addition function. This addition takes only one pipeline stage.

Figure 16:
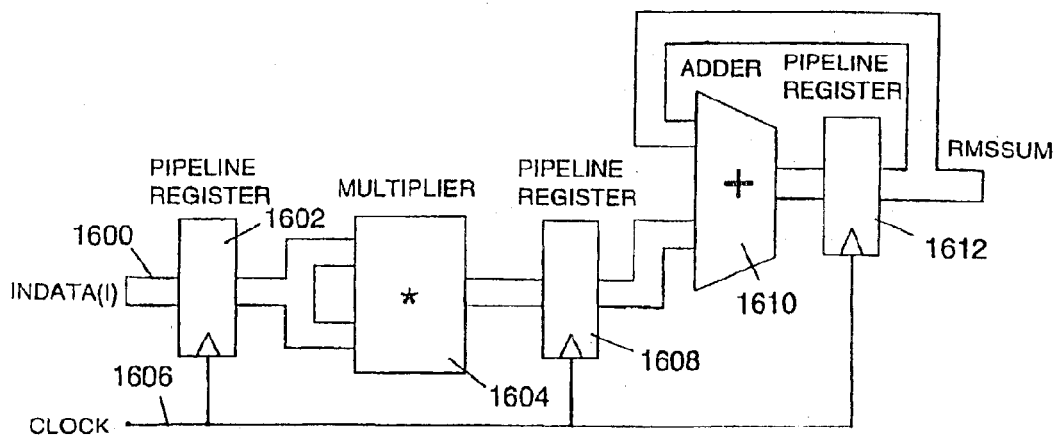

FIG. 16 illustrates one approach to transforming a software mathematical function, including an addition and a multiplication, into hardware. The statement RMSSUM=RMSSUM+INDATA(I)*INDATA(I) can be transformed to hardware as shown. The INDATA(I) on input path 1600 is provided to register 1602, and input to the multiplier 1604 when the clock signal on path 1606 activates the register 1602. In each cycle, the new INDATA value is therefore multiplied by itself, and the product is saved in the register 1608. The multiplier 1604 output is staged at register 1608. The register 1608, adder 1610, and register 1612 correspond to the previous description of register 1502, adder 1504 and register 1508 of FIG. 15. As can be seen, this function requires two pipeline stages.

Figure 17:
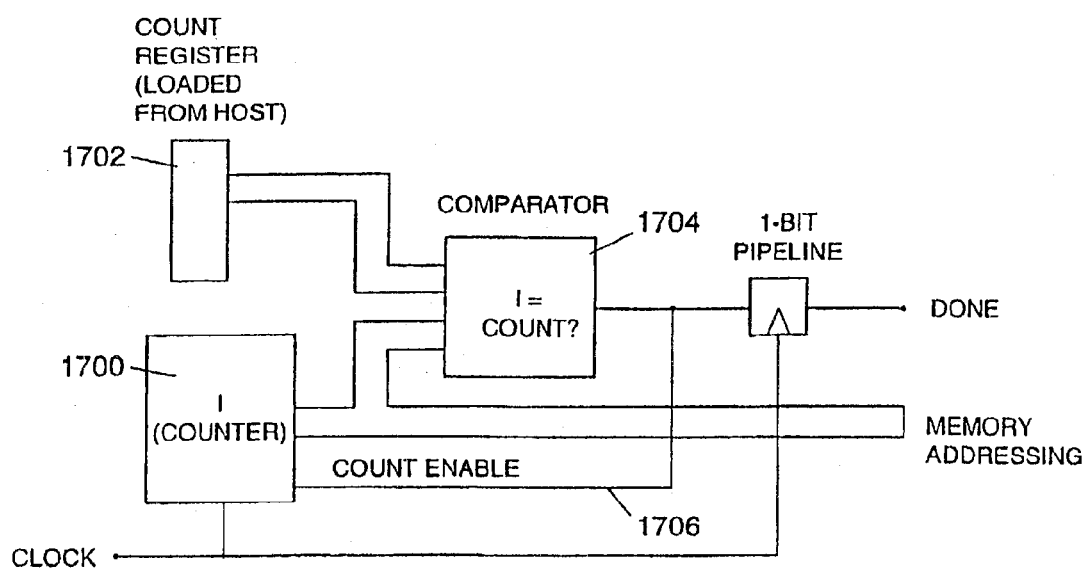
FIG. 17 illustrates one approach to transforming a software loop construct, such as the main inner loop construct, into a hardware control structure.

Finally, the entire loop 1006 of FIG. 10 must be transformed. FIG. 17 illustrates one approach to transforming a software loop construct into a hardware control structure. The software loop construct is identified as DO 100 I=1, COUNT. The variable I is stored in a counter 1700, which is incremented in each clock cycle and compared with the value COUNT. The value COUNT is stored in a register 1702, that can be programmably updated by the host computer. Alternatively, the COUNT can be hardwired to always provide a predetermined count. The comparator 1704 compares the variable I with the COUNT, and when unequal, the comparator 1704 provides a count enable signal to the counter 1700 via path 1706. When I is found to be equal to COUNT, the count enable signal is disabled, and the DONE signal indicates completion of the do-loop 1006. In one embodiment, the DONE signal is provided to the processing module's associated host PC (see FIG. 1), using a signaling technique, interrupt signal, or the like. This terminates processing of the algorithm when the desired number of simulations has been accomplished.

The sample transformation of FIGS. 10–17 provides an example of how a particular computer program loop or algorithm can be implemented in hardware in accordance with the present invention. The following description provides more general transformation rules that are useful in practicing the invention, and provides some additional tools to make and use a sustained-execution processing architecture given a particular algorithm. For purposes of illustration, the following examples will primarily be described in terms of an algorithm that is typically realized using a sequential computer program, similar to the program described in connection with FIG. 10. For purposes of further example, it will be described how an "inner loop" of a sequential computer program can be transformed into a sustained execution processor in accordance with the invention. The description, including FIGS. 18–29, is therefore illustrative of a transformation of a computer program or inner loop into a sustained, peak performance processing architecture; however the present invention is not to be limited thereto.

Figure 18:
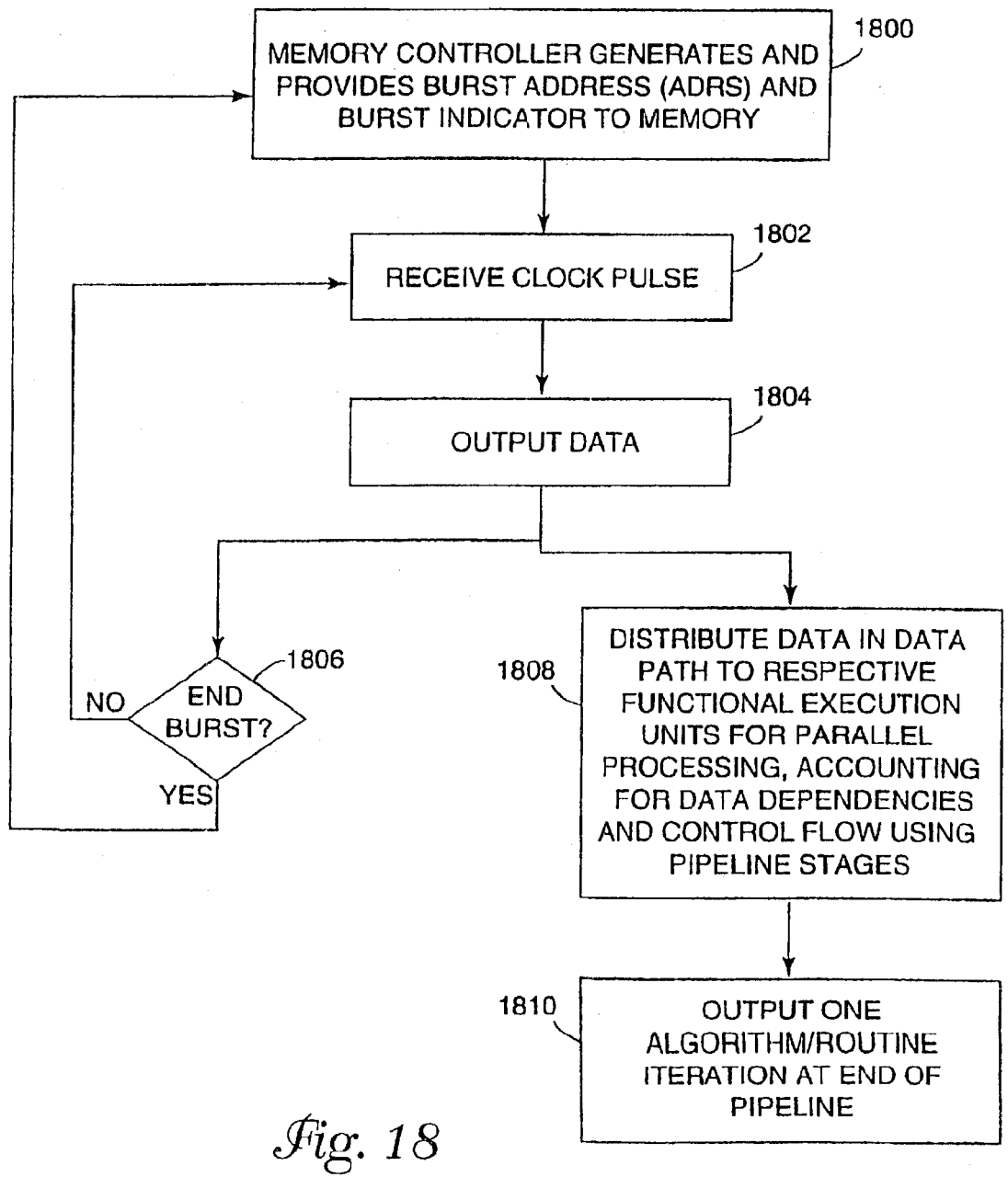
FIG. 18 is a flow diagram of a method for providing single-cycle execution of an algorithm in accordance with the present invention.

Referring now to FIG. 18, a flow diagram of a method for providing single-cycle execution of an algorithm is provided. In this embodiment, a memory controller generates 1800 a burst address (ADRS) and a burst indicator (CNTL). The ADRS and CNTL signals are provided to a bulk memory that can operate in a data burst mode. Upon receipt of a clock pulse 1802, the memory transmits 1804X bits of data in parallel, beginning at an initial burst address. The number of bits transmitted is dictated by the number of bits required by one loop of the algorithm. The memory controller tracks the number of X-bit words that have been transmitted during a particular data burst, and determines whether the end of the burst has been reached as seen at decision block 1806. If the data burst has not reached its end, processing returns to block 1802 where the memory controller awaits another clock pulse to output another X-bit data word. If the burst has completed, processing returns to block 1800 where the memory controller generates a new burst address and burst indicator, and provides the new ADRS and CNTL to the memory device.

Concurrent with the memory controller operation, the data is distributed via discrete transmission paths to the data flow unit and parallel execution units, as seen at block 1808. The data is preferably distributed in a non-multiplexed, non-interleaved fashion to facilitate single-cycle execution. Data dependencies dictated by the expression evaluation and control flow of the algorithm are accounted for using a fully-pipelined distribution path. Again, this facilitates single-cycle execution of the algorithm. Once the pipeline is full, one algorithm iteration is outputted from the processing module on each clock cycle, as indicated at block 1810. Where the algorithm does not require pipelining, it can be seen that an algorithm output would also be provided in each clock cycle, the difference being that the data output from the memory would immediately be acted upon and outputted (i.e., data would not be "staged" throughout the data flow unit and parallel execution module). Subsequent algorithm outputs are provided upon the occurrence of subsequent ones of the clock pulses 1802.

Figure 19:
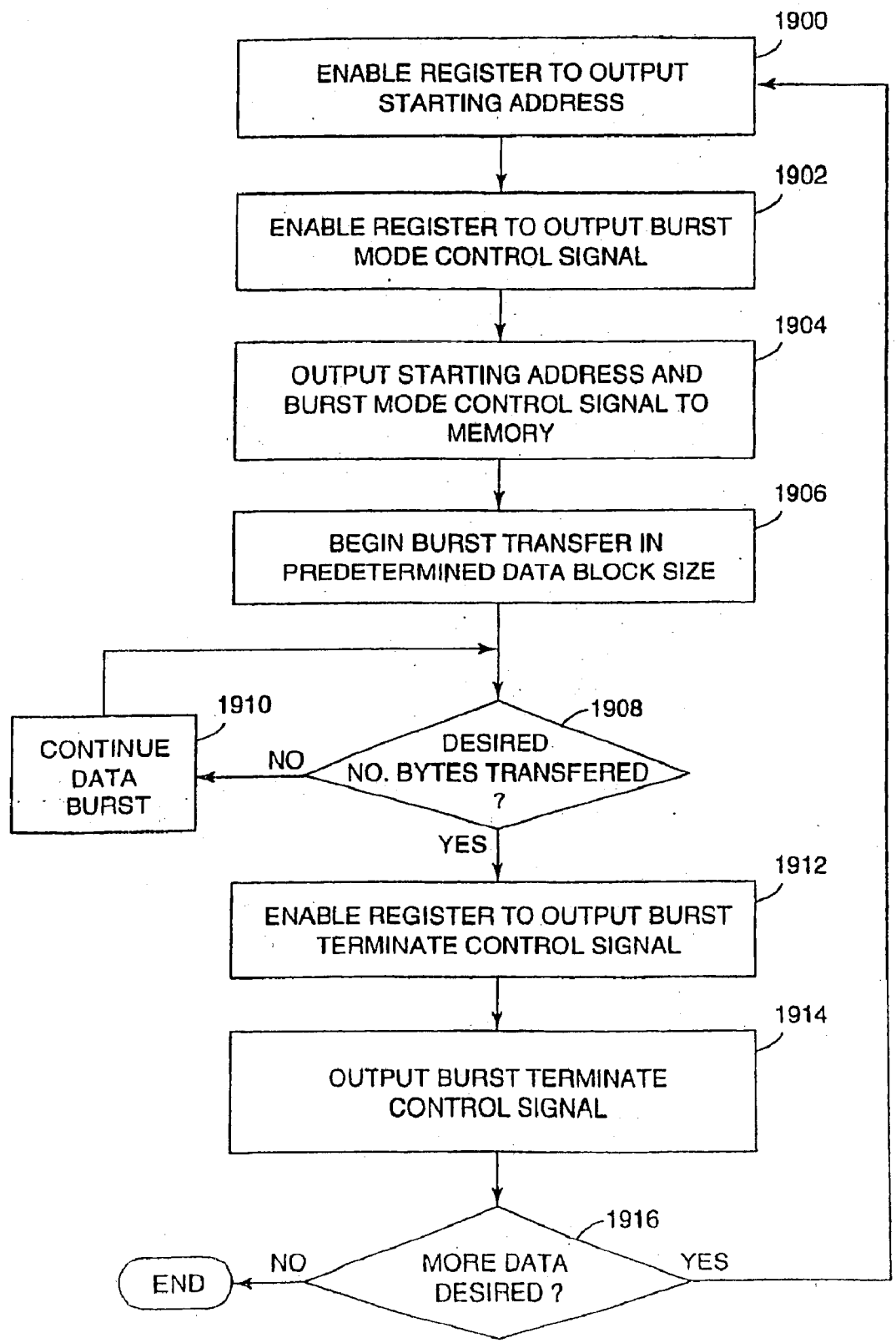
FIG. 19 is a flow diagram illustrating one embodiment of a method for controlling memory bursts in accordance with the invention.

FIG. 19 is a flow diagram illustrating one embodiment of a method for controlling memory bursts. A first register (or alternatively an external memory/cache) is enabled 1900 to output a starting address of the data burst. A second register (or alternatively an external memory/cache) is enabled 1902 to output burst mode control signals, such as a control signal indicating to the memory that a burst transfer is desired. Alternatively, the memory control inputs may be hardwired to initialize in a burst mode. The starting address and burst mode control signals (if any) are output 1904 to the memory, preferably via dedicated, non-multiplexed transmission paths to facilitate single-cycle execution. The burst transfer is thereafter initiated 1906, triggered by a clock pulse. In one embodiment of the invention, the burst mode is effected by signaling to the memory that a full-page burst is desired, wherein a burst terminate signal is provided to terminate the burst after the desired number of bytes have been transmitted. In this embodiment, the burst transfer of a predetermined size is initiated, although it may be terminated prior to reaching the predetermined data block size. Alternatively, memory devices which accept desired burst length inputs can be controlled by the memory controller CNTL signals, where the desired burst length is directly provided to the memory.

In any case, it is determined 1908 whether the desired number of bytes have been transferred. If not, the data burst continues 1910. Where a "burst terminate" is used, and the desired number of bytes have been transferred, a register is enabled 1912 to output the burst terminate control signal upon reaching the end of the data burst, and the burst terminate control signal is thereafter output 1914 upon the occurrence of the next clock pulse. Where no more data transfers are necessary as determined at decision block 1916 (e.g., the algorithmic simulation has completed), the process ends. Otherwise, memory control processing returns to block 1900 to initiate a new data burst.

Figure 20:
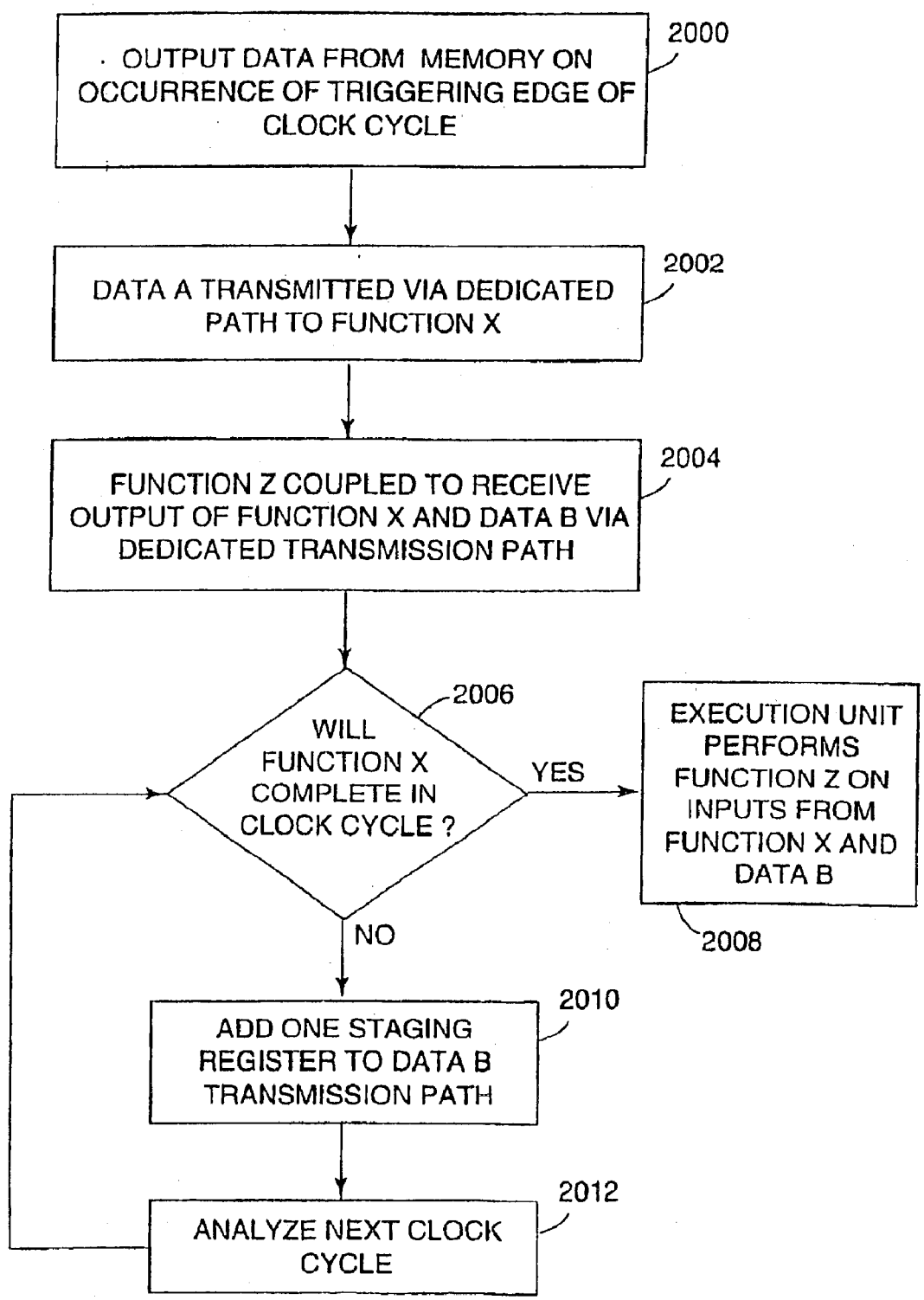
FIG. 20 is a flow diagram illustrating a exemplary design process for managing data flow synchronization issues.

Referring now to FIG. 20, a flow diagram illustrating a design process for managing data flow synchronization issues is provided. The analysis includes the output of data from memory on the occurrence of the triggering edge of a clock cycle 2000. For a given data flow, Data A may be transmitted 2002 via a dedicated path to a function X, as shown at block 2002. A function Z may be coupled to receive the output of function X and Data B via dedicated transmission paths, as seen at block 2004.

Given this information, it is determined 2006 whether the function X will complete during the current clock cycle. If function X does not include clocked components; or registers, and the propagation delays and setup times are accounted for, the execution unit will perform function Z, as shown at block 2008. Otherwise, where function X cannot be completed during the current clock cycle, a staging register is added 2010 to the Data B transmission path. Similarly, the next clock cycle is analyzed 2012 to again determine whether the function X will be completed during that clock cycle. This process continues until the proper number of staging registers are added to the Data B transmission path. It should be recognized that this type of analysis can be performed on each function of the transformed algorithm to provide a fully-pipelined system.

The process of converting an algorithm from a sequential instruction format (expressed in a computer programming language) to an architecture in accordance with the present invention includes transformations from programming language constructs into hardware constructs and pipeline stages. These sub-units are hard-wired together to result in a hardware manifestation of the original algorithm which can output one iteration of the inner loop of the algorithm each clock cycle, or alternatively in a small number of cycles. The transformed algorithm can be represented by a data flow diagram.

Because the hardware design is a direct result of the original algorithm, there is no notion of "instructions" or "control flow" or "execution" in the conventional sense. Typical programming language constructs include unary and binary operators (arithmetic and Boolean) in expressions, constants, local and global variables, arrays, indexed location reads from arrays, variable assignments, indexed location assignments to arrays, conditional statements such as if-then-else and case statements, loop constructs such as for-loops and while-loops, and the like.

These typical programming constructs can be mapped onto hardware elements such as adders, subtractors, square root functions, comparators and other mathematical and binary units equivalent to unary and binary operators in a programming language. They can also be mapped onto hardware registers to account for constants and variables. Other hardware elements include external memory banks, ASICs, FPGAs, custom ICs, or a combination thereof, which can perform the functions of arrays in the programming language. Patterns of program array read functions can be mapped onto hardware reads from memory banks, external and internal caches (if applicable), and pipeline registers, as is similarly applicable for writes to hardware caches, pipelines, registers and external memory banks. Software conditional expressions can be mapped onto multiplexers which can select one of several possible values or actions according to the computed values of conditional expressions. Counters and control circuitry can be used to simulate the effect of loop constructs. Examples of such hardware mappings are described in greater detail in connection with the following diagrams.

If desired, certain additional software transformations may be performed on the original program to render it more suitable for conversion into hardware. Some of these are optimizations, such as loop-invariant code movement and strength reduction. Others include modifications to simplify or eliminate special-case calculations such as boundary conditions. As previously described, pipelines may also be required to ensure proper synchronization of intermediate results, as well as hardware to ensure the correct execution of boundary conditions that could cause the pipeline to be incorrectly filled.

The following sections provide general transformation rules as applied in the present invention, and further provides examples for various conventional programming language constructs.

Unary operators accept a single input and produce a single output within a clock cycle (i.e., propagation delays) or may require additional clock cycles. Examples of unary operators include providing a negative value (unary minus), an absolute value, or the square root function. The absolute value function abs(a) is taken as an example. This function can be described as: If (a<0) then return (−a), else return (a). Various implementations are described below to illustrate the principles involved.

Figure 21:
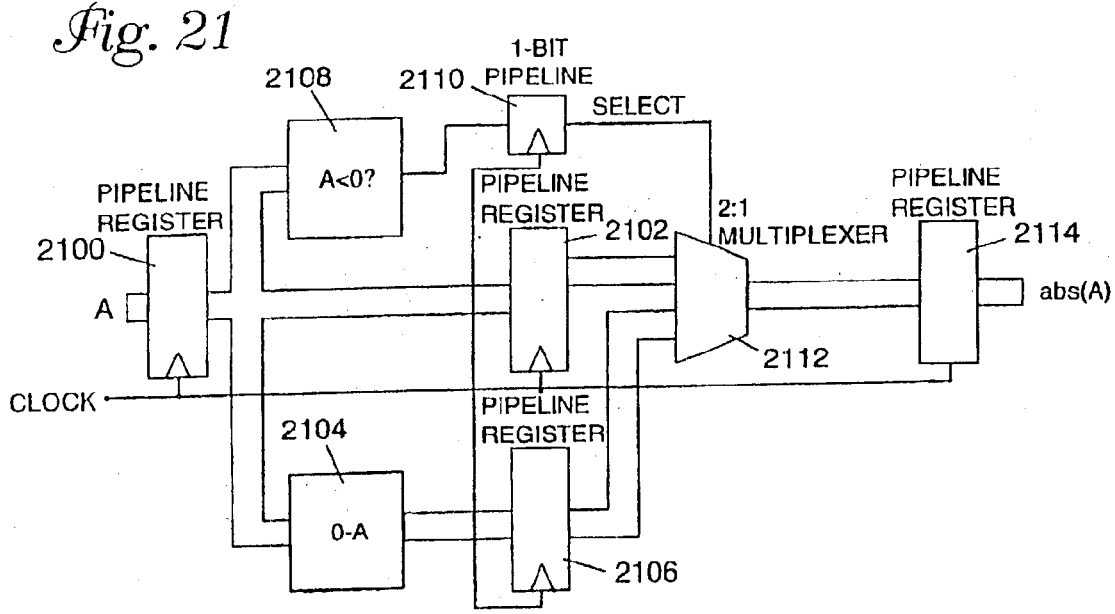
FIGS. 21 and 22 represent alternative embodiments of a unary operator transformation, particularly, an absolute value function.
Figure 22:
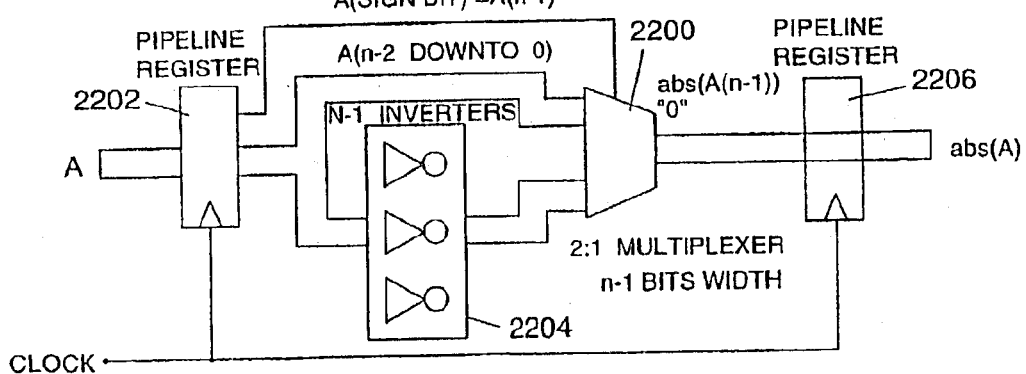

FIGS. 21 and 22 represent alternative embodiments of a unary operator transformation, particularly, an absolute value function. FIG. 21 illustrates a two-clock-cycle implementation. During a first clock cycle, Data A is transmitted from a register 2100 to register 2102 for use in a second clock cycle. A signed inversion of Data A is performed at block 2104, and stored in register 2106. The Boolean expression (A<0) is computed at block 2108, and stored in the 1-bit pipeline register 2110.

During the second clock cycle, the multiplexer 2112 selects the stored value A or −(A) depending on the result provided by block 2108 (stored in register 2110). Therefore, where Data A was originally negative, −(A) produces a positive A. The selected value is stored in register 2114. It should be recognized that during the second clock cycle, only the stored values from the first clock cycle in registers 2102, 2106 and 2110 are operated upon. Therefore, another absolute value operation can be concurrently operated on at blocks 2104 and 2108.

FIG. 22 illustrates a one clock cycle implementation of an absolute value function. This embodiment takes advantage of special information about the particular data formats employed. For example, in 2's complement format, the expression (A<0) reduces to the value of the most significant bit (MSB) or "sign bit". Where the MSB is binary "0", A is positive, and the input value of A is selected by the multiplexer 2200 as designated by the sign bit from the register 2202. Where the MSB is binary "1", it indicates that A is a negative number, requiring inversion 2204 of the remaining bits of A to produce the absolute value. Therefore the sign bit of "A" can be used to control the multiplexer 2200 to select between "A" or "not A" for every bit except the sign bit, which is hardwired to binary "0". The selected value is stored in register 2206. Provided that the delays through the inverters 2204 and the multiplexer 2200 are less than one clock cycle, a single cycle implementation of abs(a) is realized.

It should be recognized that the particular implementation (i.e., the two clock cycle or the one clock cycle implementation) is essentially irrelevant due to the unique, fully-pipelined architecture of the present invention. This is because once the A pipeline has been filled, an entire algorithm output is provided, regardless of how deep the pipeline is within the architecture. An insignificant and virtually undetectable time difference is present, however, during pipeline filling and emptying, due to extraneous staging registers.

Other unary operators are handled similarly, and some may require additional clock cycles. The square root function sqrt( ); for example, may require several clock cycles.

Binary operators accept a pair of inputs, and produce a single output within a clock cycle (i.e., propagation delays) or may require additional clock cycles. Examples of binary operators include addition, subtraction, multiplication, division, and other mathematical operations. Binary operators also include Boolean operators, such as AND, OR, XOR, NAND, etc. functions. Comparison operators also fall into the binary operator category, as a pair of data inputs may be received and compared, and a Boolean result is provided (e.g., equal to; less than or equal to, greater than, etc.). Because two inputs are required to produce one output, binary operators typically produce a narrowing of the pipeline. For example, FIG. 23 illustrates a binary operation having operator 1 input (OP1) at input 2300 and operator 2 (OP2) at input 2302. OP1 and OP2 are output from their respective registers 2304, 2306 to the binary operator logic 2308 where the binary operation occurs. The result can be stored in a single register 2310, thereby illustrating the narrowing of the pipeline.

However, because binary operations require two inputs, the binary operation cannot be performed until both of its inputs are available. If one is available prior to the other, the earlier input must be stored in a pipeline including n registers, where n is the number of clock cycles that will occur before the second input is available. This pipelining is illustrated in FIG. 24, where the OP1 input 2400 and OP2 input 2402 represent the inputs to the binary operator logic 2404. In this case, it is assumed that the OP1 input signal is available prior to the OP2 input signal, thereby requiring registers 2406, 2408 and 2410 to account for the OP2 delay and its pipeline register 2412.

Most binary operators require one clock cycle. However, some may require more, such as multiplication which may take two clock cycles (latency) with an internal pipeline stage to ensure single cycle throughput. Division, exponentiation, etc. may require even more clock cycles. Multiplication or division by fixed powers of two are special cases and may be immediately executed (i.e., no additional clock cycles), where implemented by hard-wiring.

Registers may be used to hold constants. In one embodiment of the invention, the constant values are written to their corresponding registers via the host computer. However, not all constants will be held in registers—some may be hard-wired into the design. For example, multiplication by a constant is far more efficient implemented as a hard-wired circuit than as a general purpose multiplier fed with a constant as one input. Registers may also be used to hold variables. In this case, the registers will both be readable and writable by both the hardware, and the host computer.

As previously described, memory banks may be used in connection with the processing architecture. Because data-intensive computer applications involve a great deal of test or simulation data, the present invention provides one or more memory banks to store the test data prior to its execution by the processing architecture.

Other memory components may also be advantageously used in certain circumstances. These memory components can be used as equivalents to "arrays" in a programming language representation of the algorithm. In other words, to transform an algorithmic software routine that includes an array, an external memory component or memory bank may be used. As will be described more fully below, these additional memory components are independent of the bulk memory bank that provides the raw test data, and are instead used to increase the parallelism of memory accesses.

Each such external memory component is controlled by the memory controller to supply a word of data (or accept a word of data for writing) in every clock cycle. Thus, the processing clock is held to be the same as the memory bus data rate. To prevent data bus conflicts and facilitate single-cycle execution, each memory bank has its own data, address and control bus. This can be seen in FIG. 25, which illustrates a data flow unit (DFU) 2500 coupled to receive information from multiple SDRAM banks 2502, 2504 and 2506. Each of the SDRAM banks includes a dedicated data, address, and control bus. For example, SDRAM bank 2502 includes data bus 2508, address bus 2510 and control bus 2512, which are distinct and separate from data bus 2514, address bus 2516 and control bus 2518 associated with SDRAM 2506.

These external memory devices are particularly advantageous in multidimensional computing as they increase the parallel nature of memory accesses. These memory components are separate from the bulk memory, which supplies the raw data stream. Instead, these external memory components are auxiliary memories that can be loaded by the host PCs. For example, in multi-dimension computing, an X array of data may be continually referenced while the processing architecture performs computations using the X array to generate a Y array. In such cases, it is not practical to continually supply the same X array via the bulk memory. Instead, the X array is loaded into an auxiliary memory component that can be accessed by the processing architecture. This in effect increases the parallelism of the memory accesses, which is described in greater detail below.

The algorithm program code may be transformed to reduce the number of reads and writes from external memory to some minimum of memory reads/writes per iteration of the inner loop. That minimum number of memory banks is provided to enable execution of one inner loop iteration per clock cycle. For example, consider a program having an inner loop that reads n adjacent elements from a one-dimensional array A (or a one-dimensional slice from a larger array), where the n array indices are functions of the loop index I, e.g., A[I], A[I+1], . . . , A[I+n], and where one iteration of the inner loop is output in each clock cycle. Since the loop index I is incremented each iteration of the inner loop, i.e. in every clock cycle, the value read as A[I+n] in a given clock cycle will be re-read as A[I+n−1] in the following clock cycle, and as A[I] n cycles later. Therefore we can replace this succession of reads by a single read of A[I+n] whose result is stored in the first register of a pipeline consisting of n registers. The other data elements required are then taken from the n registers in the pipeline, wired directly to the appropriate processing units.

Such a configuration is illustrated in FIG. 26, where an external memory bank 2600 provides the array elements to a series of pipeline registers 2602, 2604, 2606 and 2608. The depth of the pipeline is dependent on the array being transformed, so a smaller or larger number of registers may be used. Each of the elements of the array is available at the output of its respective register, thereby providing the array indices A(I) at path 2610, and A(I+1) at path 2612. Depending on the number of registers in the pipeline, the last two array indices are A(I+N−1) on path 2614, and A(I+N) on path 2616.

Before actual processing begins, n clock cycles are required to fill the pipeline. Actual processing during this filling time may experience a dormant period until the pipeline is filled. The "filling" clock cycles may result in additional overall output delays for very simple implementations of the invention. However, for large data sets, n will be small compared to the length of the array or slice, and therefore this unused time is of little consequence.

Similarly, processing a two-dimensional array (or slice of a larger array) using two or more nested loops may involve reading the same one-dimensional slice more than one time (e.g., m times) in successive iterations of the next-to-inner loop. The first time it is read, it may also be written to a small memory component, such as a cache memory, consisting of m one-dimensional vectors whose length L is the length of the original one-dimensional slice (and related to the loop count of the inner loop). Such a cache is best implemented on-chip, but if too large for the implementation technology, off-chip memory may be used with its own memory buses, at an economic cost. By combining these two techniques, a single read from the array may replace m*n read operations. This may be extended to three or more dimensions if desired.

An external memory bank as described above cannot be both read from and written to during the same clock cycle. Therefore, there are further restrictions on interleaving reads and writes to the same memory component (e.g. bus turn-around time). To maximize performance, reads and writes will normally be to separate banks of memory. This may impose additional constraints on the architecture required to implement a given software routine in hardware.

Figure 27:
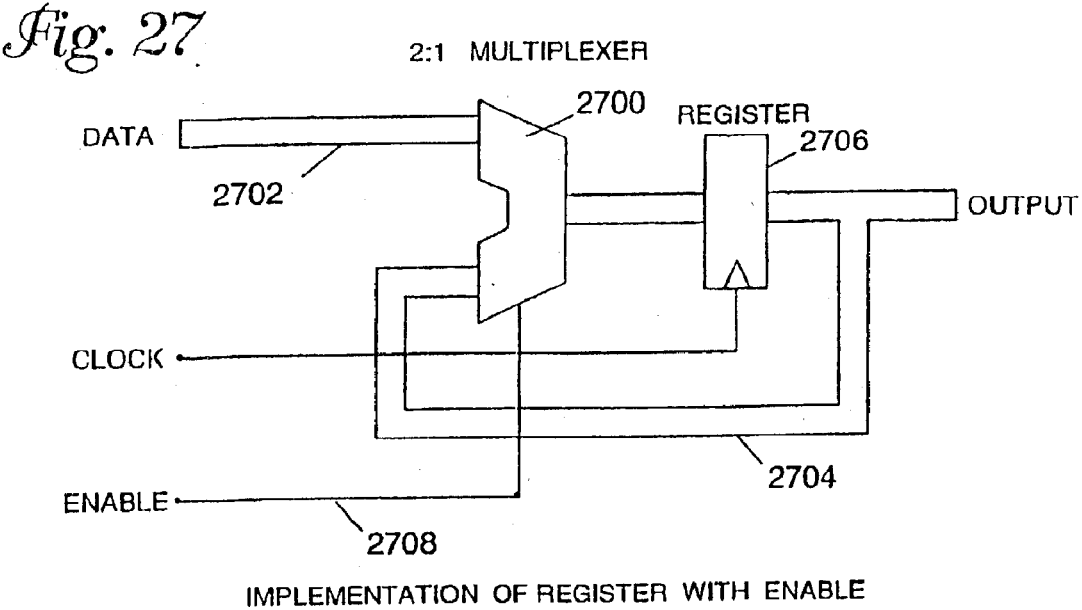
FIG. 27 is a block diagram of a registered selector capable of outputting either a current input or immediately preceding data input according to one embodiment of the invention.

If a register is both read from and written to in a deeply pipelined design, care may be required to ensure that the value read is appropriate to the pipeline stage reading it. If necessary, storing previous values in a pipeline can achieve this. These registers may be selectively updated, according to conditions, while a pipeline register is continuously updated in every clock cycle. This can be accomplished with a multiplexer selecting its own output or a new input, and a continuous clock, as shown in FIG. 27. In this diagram, the multiplexer 2700 selects either the new data on path 2702, or the data's previous state on path 2704 at the output of register 2706. The multiplexer 2700 is controlled by the enable signal on path 2708.

Multiplexers are used to select one of several different possible values or actions according to the computed values of conditional expressions. Multiplexers can replace conditional statements and case statements as described below.

Conditional statements: Conditional statements include statements such as if-then-else constructs. The control expression is evaluated to produce a Boolean result. Both statement arms (i.e., then, else) are executed in parallel, although no results are committed (i.e. no variable register or memory locations are written). Where these three operations can be performed in a single clock cycle, a multiplexer controlled by the Boolean control expression can be used to select between the statement arms. If these three operations take different lengths of time, their results are delayed in pipelines until all three are complete. At this point, the control expression result is used to commit the results in one of the statement arms and discard the others.

Figure 28:
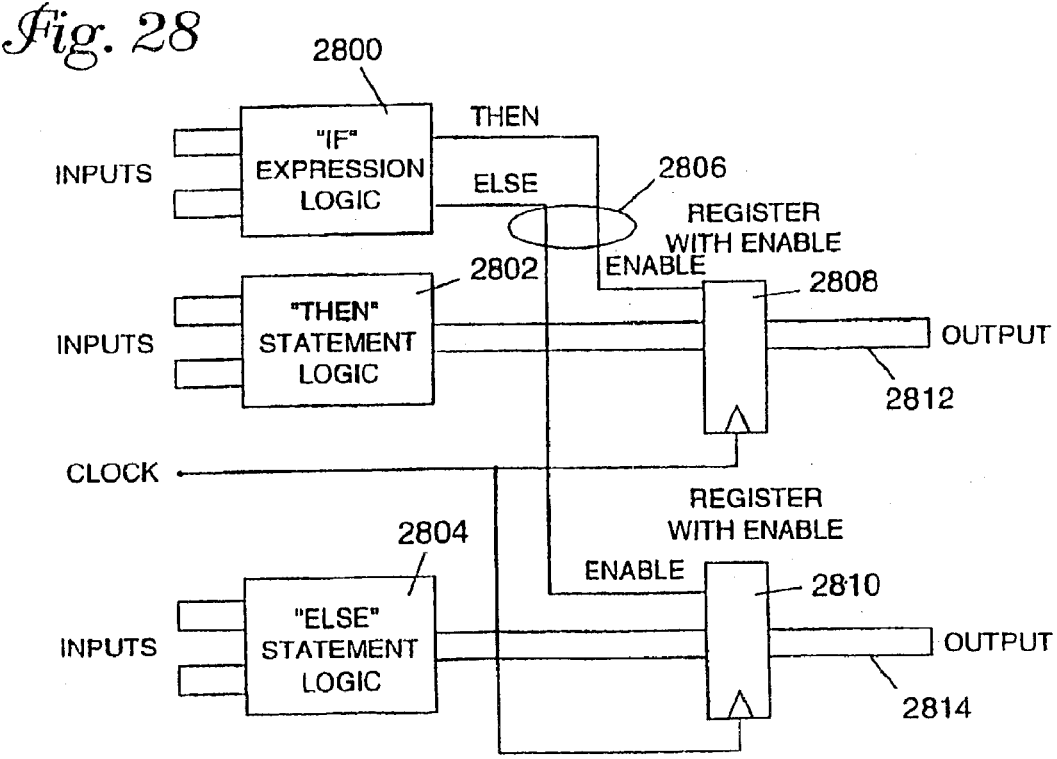
FIG. 28 is a block diagram illustrating an example embodiment of a hardware implementation of a conditional statement using registers and register enables.

FIG. 28 is a block diagram illustrating an example embodiment of a hardware implementation of a conditional statement using registers and register enables. Where the operations of the conditional statement can not be completed in the same clock cycle, registers having register enables can be used. In the example of FIG. 28, inputs are provided to the IF expression logic 2800, the THEN statement logic 2802 and the ELSE statement logic 2804. The IF expression logic 2800 provides control signals 2806 to registers 2808 and 2810. Depending on the state of the control signals 2806, the appropriate register 2808, 2810 is enabled to output the appropriate result at output 2812 or 2814.

Case statements: The control expression is evaluated to produce a constrained type result (e.g. a number from 1 to n). The n statement arms are executed in parallel, without committing any results. Again, pipelines may be required to synchronize all statement arms with the control expression. Finally, the statement arm indicated by the control expression is committed, all other results are discarded.

Counters and control circuitry is used to simulate the effect of algorithm loop constructs. For example, the inner loop is executed until some condition becomes true, which terminates the loop. In the case of a "for" loop, the condition corresponds to a set number of iterations to be performed. The number of iterations performed (the loop variable) is recorded using a counter, which also provides an index for array addressing. The counter value is compared to a known value stored in a register, and when equal, the loop is terminated.

Given these general transformation rules, and the architectural teachings of the sustained-execution processing module provided above, those skilled in the art can construct computing modules capable of providing sustained, peak performance for data-intensive computing applications. The invention provides for the mapping of a core algorithm (not just an instruction) into hardware for single-cycle execution. It is important to note that the invention as described above needs only a clock pulse and a processing start/stop indicator to fully execute the entire algorithm as many times as required by the application. In other words, there is no program, no program memory, no program counter, no memory fetching, no address decode stages, no branch logic, and the like. The invention can merely be coupled to a host computer to receive the raw input data and a start/stop indicator, and the sustained, peak-performance processor does the rest by generating an algorithm output on each clock cycle.

This architecture has significant advantages for imaging. In particular, the migration algorithm for moving an observed event back to its true spatial or temporal position can be transformed into hardware through the transfer rules provided. In the case of migration, one possibility is determining the amount of energy that emanates from a point within a mass. This energy forms a point in an image. The image as a whole represents the internal structure of the mass that has been analyzed. Once the emanated energy for each point is displayed, the structure of the mass becomes determinable and may be inputted into a graphical image if desired.

The oil industry has a direct application for this type of imaging. Depth or time migration can be used to determine the subsurface structure of a region of the earth. With depth migration, the depth the energy emanated from is determined and displayed. Time migration results in a display of when the energy arrives at a detection point. In either case, this architecture may be employed to provide an image of the energy that emanated from each point in the subsurface region.

Figure 30:
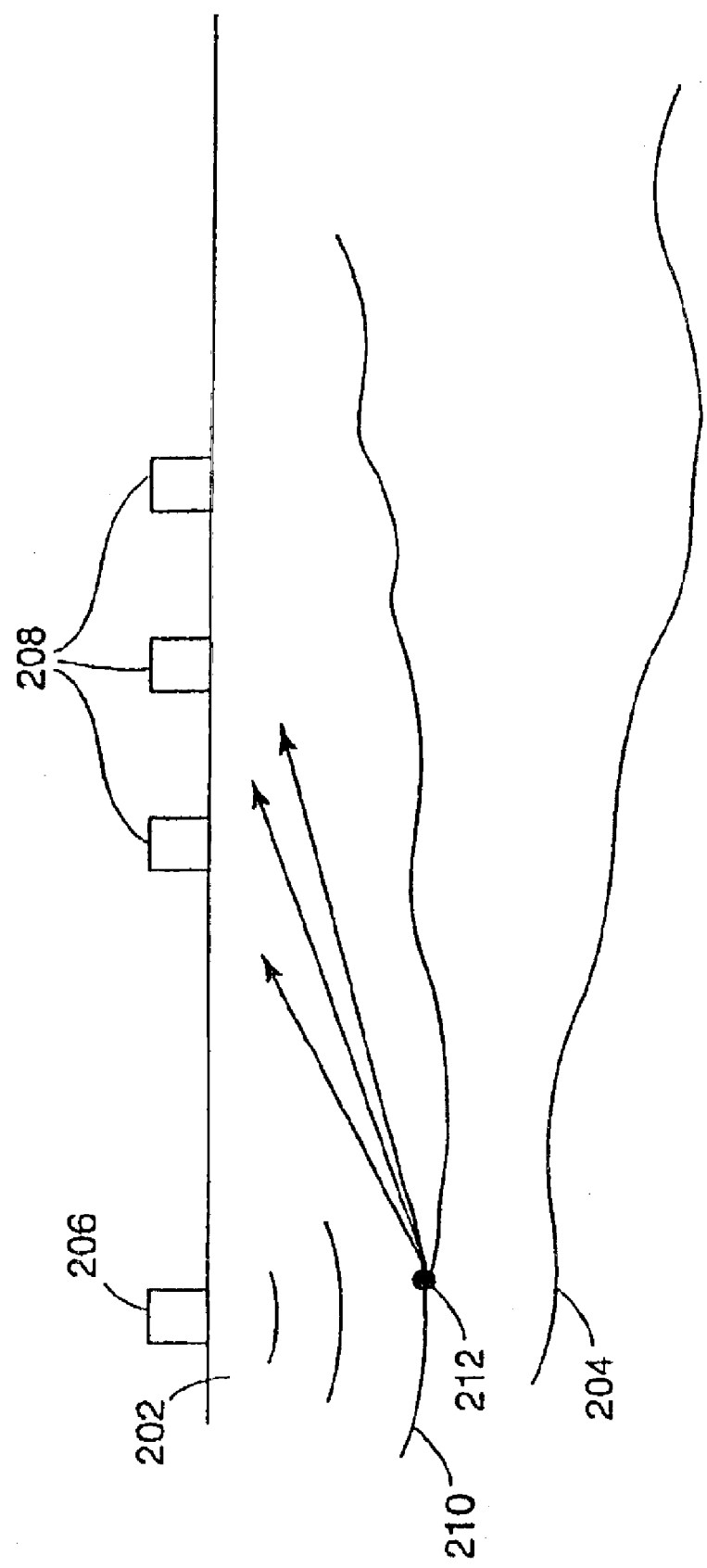
FIG. 30 shows the data gathering process that provides the input traces for the migration processor.

The process for determining the subsurface structure of the earth begins with providing a seismic energy wave source and a grid of receivers on the surface of the region to be analyzed. Referring to FIG. 30, the source 206 is placed some distance from the grid of receivers 208. In this particular application, the source can be any acoustic wave generator such as an explosion or a large disc that is slammed into the surface. The receivers are sensors that detect the energy and record its amplitude over a period to time. This record of the energy amplitude is known as a trace. The migration algorithm determines the amount of energy a subsurface point has contributed to a given trace. The energy wave 210 from the source travels through the anisotropic subsurface 202 and reflects and refracts as it travels and strikes structural characteristics 204. Some of the energy is reflected back to the receivers on the surface. The amplitude of the energy contributed to all traces by a point 212 is summed and stored. The amplitude received at a given time may be positive or negative. To extract an energy component from one of the traces, the migration algorithm requires that the time the wave travels from the source and back to a receiver be known. This amount of time is a travel time. Typically, a travel time must be interpolated with reference to a table of travel times known as a travel time volume. The travel time volume stores travel times to a given receiver for points located throughout the region, but the resolution of the travel time volume is much lower than the resolution used for the points in the subsurface and for the corresponding points in the image volume.

For migration or other imaging algorithms, the energy emanates from the source and is received to create the trace. Emanate can mean that the energy has been generated, reflected, or refracted so that a location, including subsurface points, may be considered a source when processing an algorithm either because it has generated an energy wave or it has reflected or refracted energy waves that it has received.

Figure 31A:
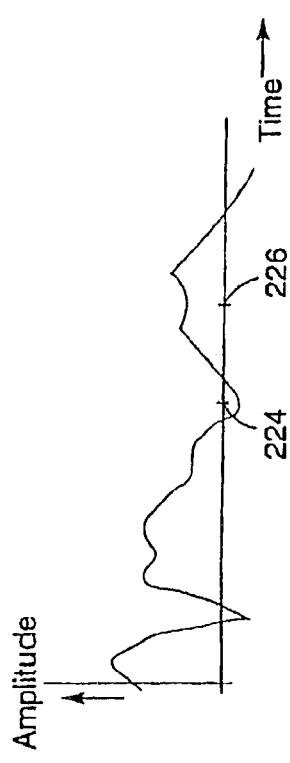
FIG. 31$a$ shows an example of an input trace.

FIG. 31a shows an example of a trace 220. The trace 220 records the amplitude A as it varies with time and fluctuates above and below a zero value 222. At one travel time 224, the value of the amplitude is shown to be negative. At another travel time 226, the value of the amplitude is positive.

Figure 31B:
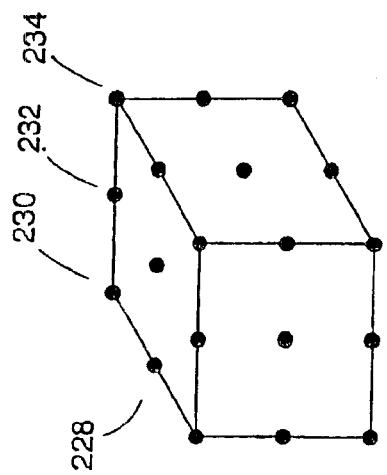

FIG. 31b shows an example of a travel time volume 228. The travel time volume is a 3-D array of time values. In this example, the resolution of the travel time volume 228 is 3×3×3. The travel time volume contains the travel time value required for the point in the subsurface associated with the point in the travel time volume that contains the value. Though the travel time volume contains points that span across the entire mass, the travel time volume contains fewer points than will be used for the image of the mass.

Figure 31C:
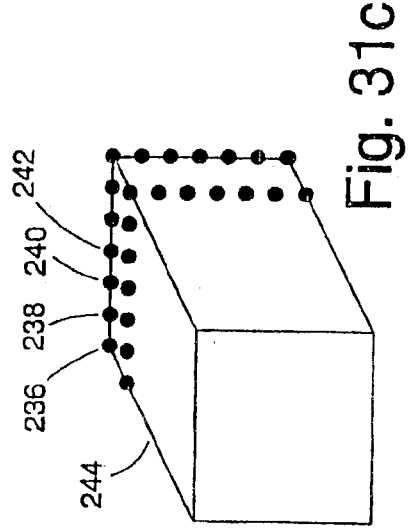

FIG. 31c shows an example of an image volume 244. The image volume contains many more points, such as 236, 238, 240 and 242, than the travel time volume, even though each point in the image volume 244 represents a point in the same mass as the travel time volume. However, whereas the travel time volume contains time values for each point, the image volume stores the energy value for each point as generated by the migration process.

When an amplitude value for a given point within the image volume is to be determined, 3-D interpolation is performed upon points in the travel time volume to determine the travel time for the point in the image volume. The 3-D interpolation minimizes the amount of memory necessary to store the travel time volume. When a new trace is to be analyzed, the travel time volume changes.

Figure 32:
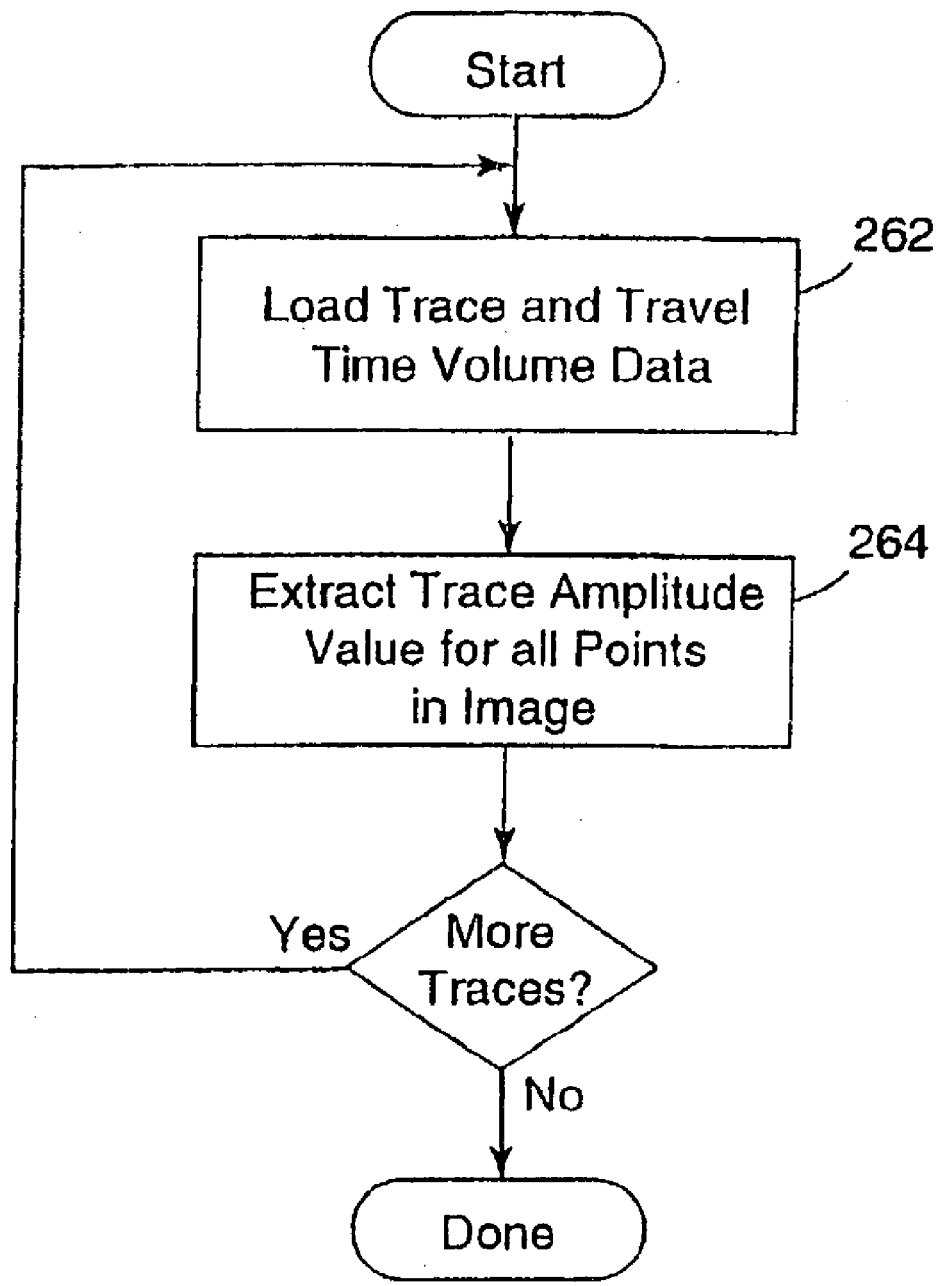
FIG. 32 is a flow chart indicating the set of steps within an outer loop that a conventional processor performs when performing a migration.
Figure 33:
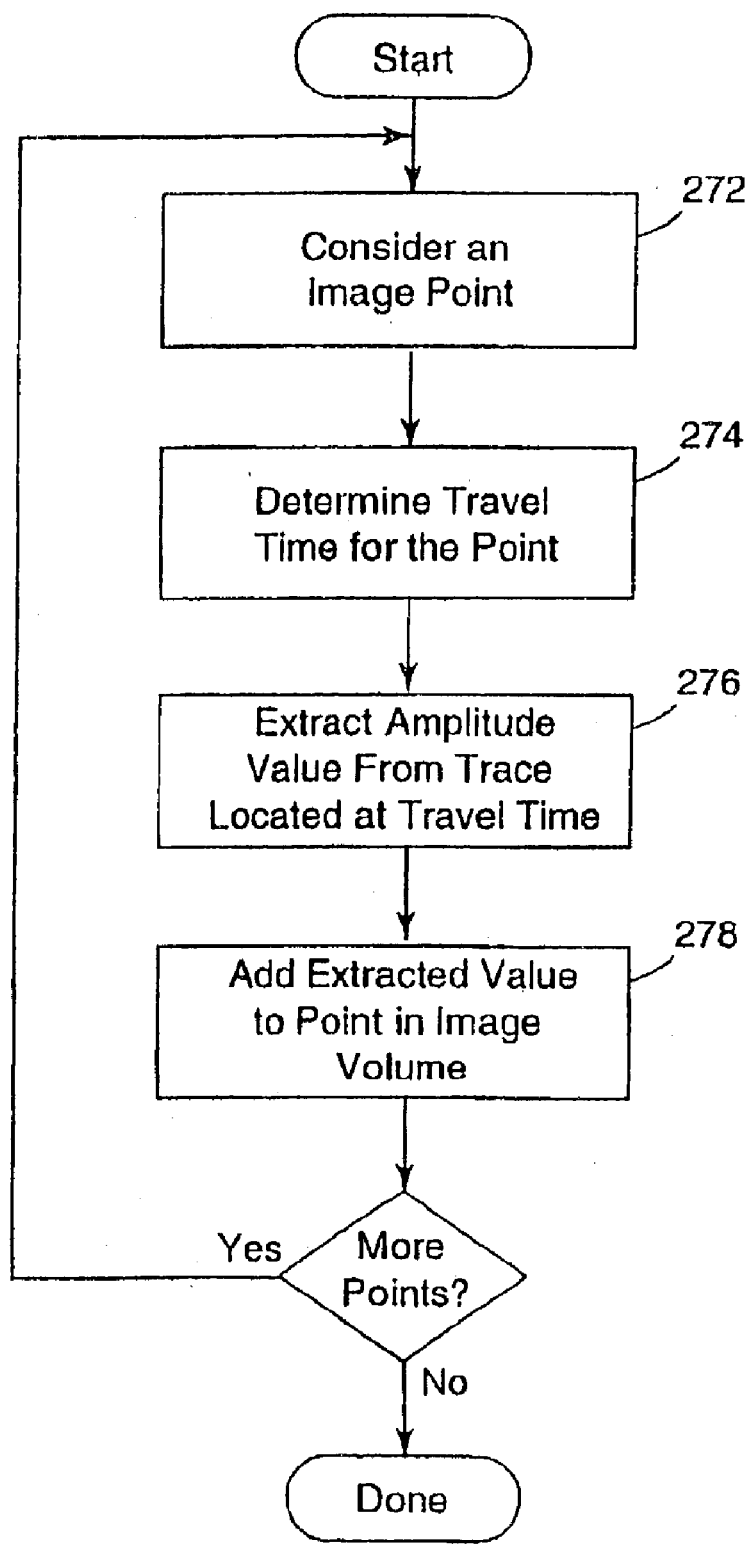
FIG. 33 is a flow chart indicating the set of steps within an inner loop that a conventional processor performs when performing a migration.

FIGS. 32 and 33 demonstrate the steps performed in completing a migration. However, using the pipelined, sustained execution architecture, the present invention should not be considered to perform according to the steps indicated by a flow chart. Flow charts depict the steps that occur when implementing an algorithm on a conventional processor having fixed instruction sets. The conventional architecture provides interpretation of an algorithm in terms of the instruction set contained therein. In such an architecture, data modifications are performed, and decisions are made as to how the data is to be stored and retrieved. The pipelined architecture of the present invention, by way of the functional execution units in conjunction with the data flow unit, does not modify data flow nor make decisions as to how the data should flow. Instead, the pipelined structure provides a pathway for the data to automatically flow without decisions occurring, yet the output generated is exactly the same as if a conventional architecture had been used. Instead of control signals commanding various operators to transfer the data based upon data flow decisions, the architecture of the present invention performs an algorithm while being controlled only by a clock pulse and internally generated control signals that repeat without the need for decisions to be made. Therefore, since the data flow decisions are unnecessary because they are inherent within the pipeline design, this architecture can perform data intensive migrations more quickly. The migration process encounters a bottleneck when implemented using a conventional processor as can be seen with reference to FIGS. 32 and 33.

The general migration process is shown in FIG. 32 as it is conventionally performed. The migration processor loads trace and travel time volume data into memory at step 262. Then all amplitude values for all the points in the mass are extracted from the trace data and stored in the image volume at step 264. During this step an optional amplitude correction factor may be applied to account for multiple points contributing to the amplitude value rather than a single point. However, the migration process will already average out the energy contributions for each point, so the amplitude correction is not necessary. Once the value for each point has been stored, the next set of trace and travel time volume data is loaded into memory back at step 262. The cycle continues until all traces have been processed. The conventional processing architecture cannot process each trace quickly, and thus generates the bottleneck in the migration process.

FIG. 33 shows the individual steps that occur when conventionally processing a trace. A first point is considered by the processor at step 272. An optional aperture is used to determine if the point is one that contains data relevant to the migration. If it does not, a new point is considered. If it does, a travel time is interpolated for it from the travel time volume data at step 274. This aperture is not necessary because the migration process will determine that some points are contributing no energy to a trace through the averaging process. Once the travel time has been determined, the processor finds the amplitude value that occurred at that travel time at step 276. Because of the sampling rate of the amplitude values, an amplitude value for a specific travel time may not be stored. To account for this, the processor interpolates between the value sampled just before the specific time and the value sampled just after it. A more accurate amplitude value is determined in this manner. As discussed herein, amplitude correction can be applied but is unnecessary due to the averaging process. The amplitude value is then added to the corresponding point in the image volume at step 278. A new point is then considered. Once all of the points have been considered and processed, a new set of trace and travel time volume data is loaded into memory and the process is repeated. Conventional control flow processors are not able to quickly run through all points in the image volume for each trace. Therefore, it takes a long time to cycle through all of the traces and a bottleneck develops. When one considers that the migration process may need to be performed several times to produce an accurate image, the bottleneck becomes an even more significant concern.

Figure 34:
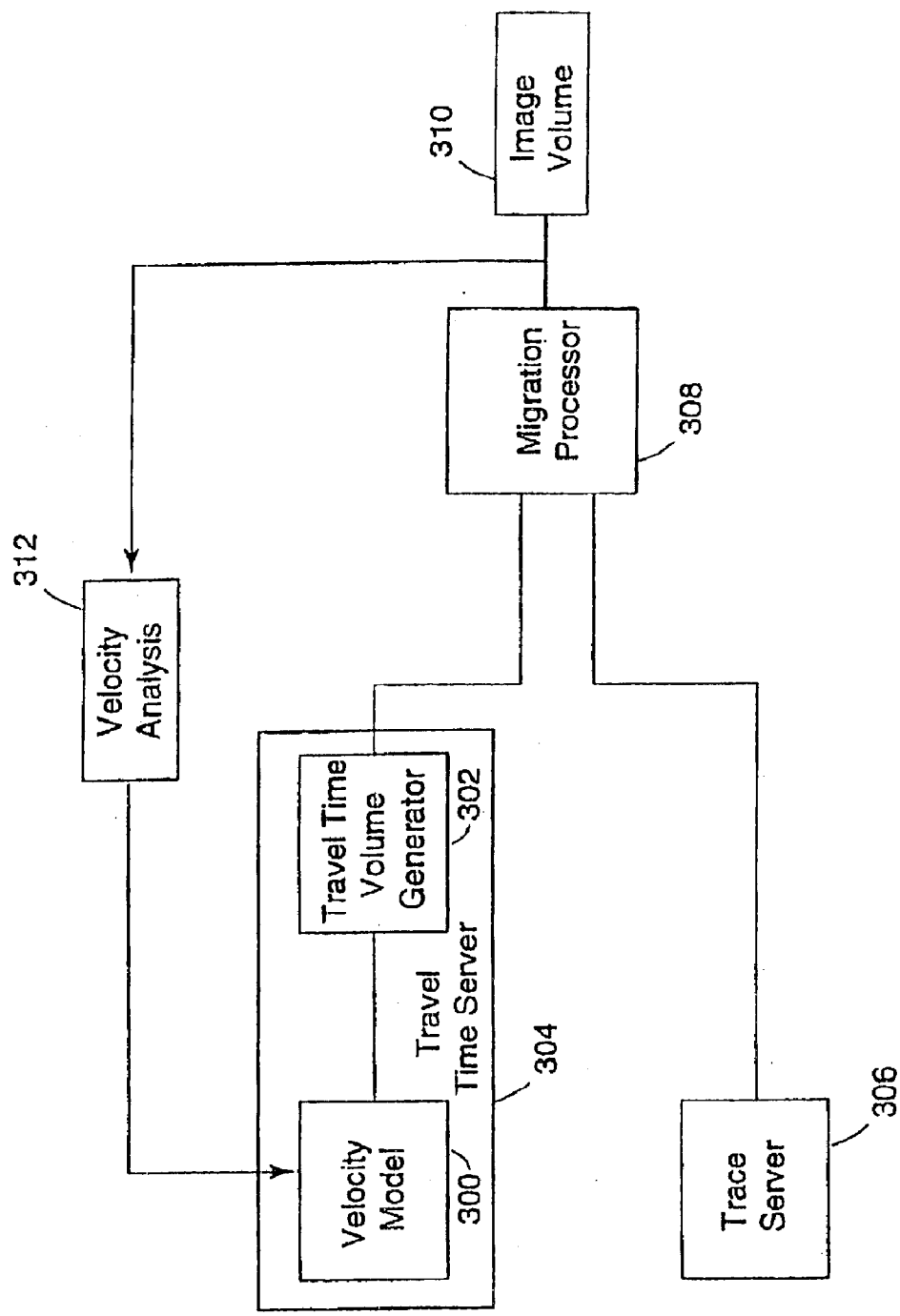
FIG. 34 illustrates the feedback loop and process that is used to fine tune a velocity model and generate an accurate trace.

The accuracy of the migration is dependent upon the accuracy of the travel time volume. The travel time volume is generated by reference to a velocity model which is a numerical model of the distribution of acoustic velocities over a given spatial region. With reference to FIG. 34, the velocity model 300 outputs the distribution to a travel time generator 302, both of which are contained within the travel time server 304. The travel time generator 302 then computes a low resolution travel time volume for a given trace based upon the distribution and the distance each point in the subsurface is located from the receiver.

Once the travel time generator has generated all of the travel time volumes, the migration process can begin. The travel time volume and the trace data are inputted into the migration processor 308 employing the architecture discussed herein. The migration processor 308 then extracts from the trace data the total amount of energy that emanated from each point in the subsurface.

Once the energy contribution for points within a given depth are determined, a geophysicist may analyze the energy contributions and will look for trends that indicate structures within the given depth, which may be the complete migration depth or a partial one. Based upon those structures, the geophysicist may adjust the velocity model to provide a more accurate travel time volume for each trace. This process is reflected in FIG. 34 by the feedback loop containing a velocity analyzer step 312. The velocity analyzer 312 typically involves both computer processing and human judgment. A migration on another or the same given depth is then performed and the velocity model 300 is adjusted again. These complete or partial migrations continue until all depths of the mass have been completed, and the velocity model 300 has been completely adjusted. Then, a final migration can be performed to generate a more accurate image 310 of the energy contributions. A conventional control flow architecture slows the velocity model adjustment process greatly, but the architecture described herein permits each migration to be completed so quickly that the velocity analysis step involving the geophysicist becomes the slowest link of the system.

Figure 35:
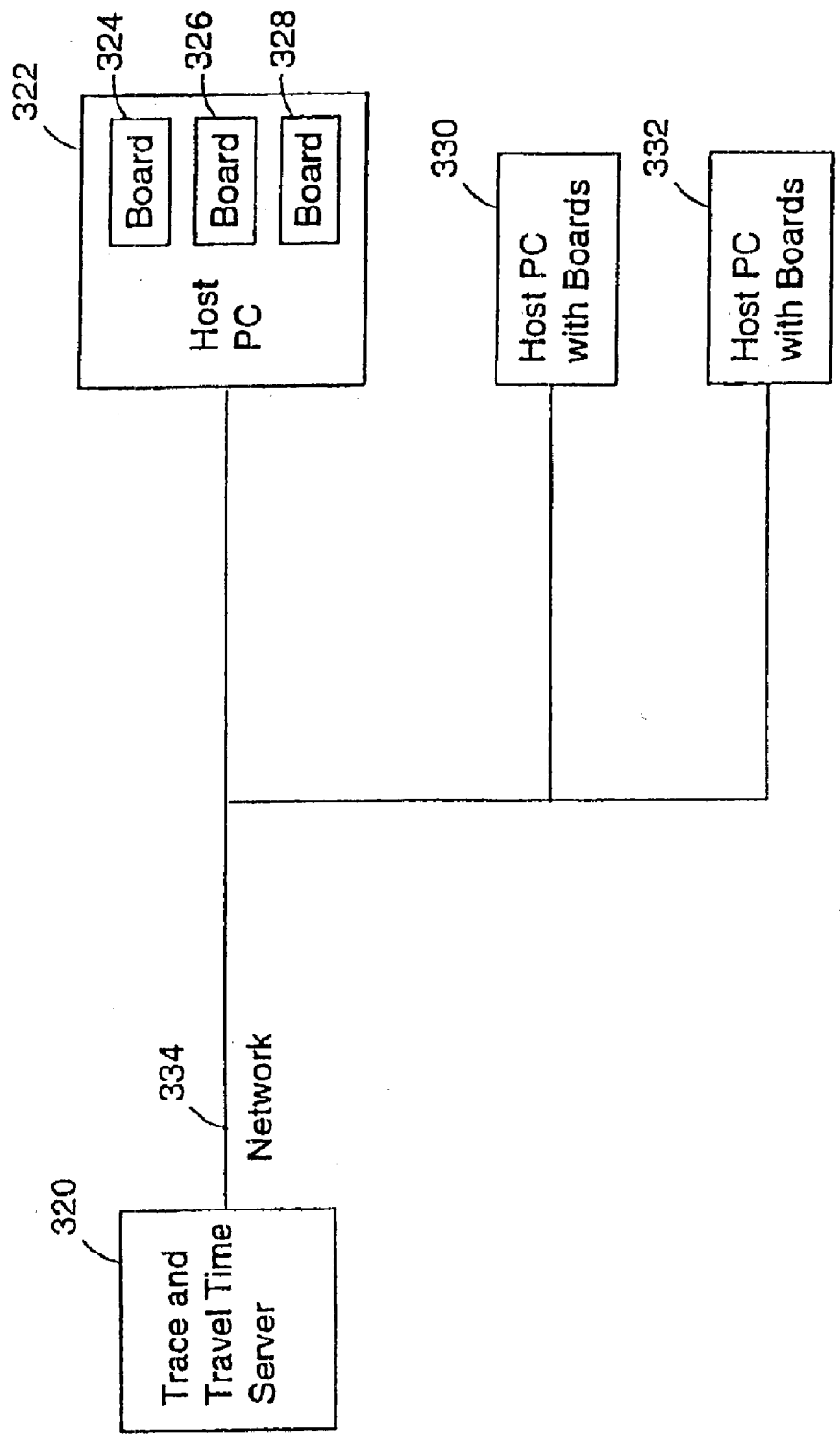
FIG. 35 illustrates a workstation made of a server and several host PCs containing migration processors.

FIG. 35 shows a system of workstations for generating an image by performing migration with a plurality of processor boards operating in parallel. A server 320 contains all of the stored trace data and the travel time volumes. Individual host PCs 322, 330, and 332 which may include other types of computers or circuitry capable of executing algorithms, are linked to the server by a high throughput network 334 such as ethernet, fast ethernet, and even across the internet. It is to be understood that any number of host PCs could be used. Each host PC has a one or more PCI interface slots. One or more of these slots in each PC contains a migration processor board 324, 326, 328. The number of migration processor boards that can be used per host PC is limited by the number of slots available and the PCI bandwidth. These boards are performing parallel processing to increase the speed at which the complete migration can be performed. Each board operates on designated sets of trace and travel time data. Typically, the trace and travel time server 320 contains the data on large tape reels. Some of the data is delivered across the network 334 to the host PCs 322, 330, and 332, or all host PCs that contain migration processor boards and are linked by the network. The host PC loads the processor boards' memories until they are filled with as many sets of trace data as possible. The remaining sets of trace data that have been delivered by the server 320 are stored on hard disks within the PCs, which act as a buffer until the boards can accept new data.

An individual PC in one implementation has from about 20 to about 40 GB of disk storage. Other implementations can use less than about 40 GB of disk storage. The memory on the host PC ranges from about one quarter GB to about two GB in one implementation. Other implementations have less than about two GB. About 30 operations per clock cycle are performed by each individual processor utilizing the architecture described herein for depth imaging. This number of operations per cycle is dependent upon the number of operations required by the algorithm being performed. For example, in one possible embodiment, the number of operations per cycle is the same as the number of operations required by the algorithm.

Many different migration algorithms may be implemented using the architecture and systems described herein. Also, many different interpolators may be implemented. For purposes of example only, a migration processor containing a travel time processor and a trace time processor will be described from the top level structure down one level to the structure of each sub-processor. The travel time processor, which is a sub-component of the migration processor in this example, will be analyzed down a step to show a travel time interpolator which is a sub-component. Similarly, the travel time interpolator will be analyzed down one step to show a linear interpolator. Finally, the linear interpolator will be analyzed down one level to indicate the pipelined architecture. It will become apparent how the pipelined architecture and transform rules can be used to create a sustained execution processor that performs an imaging algorithm from this discussion.

Figure 36:
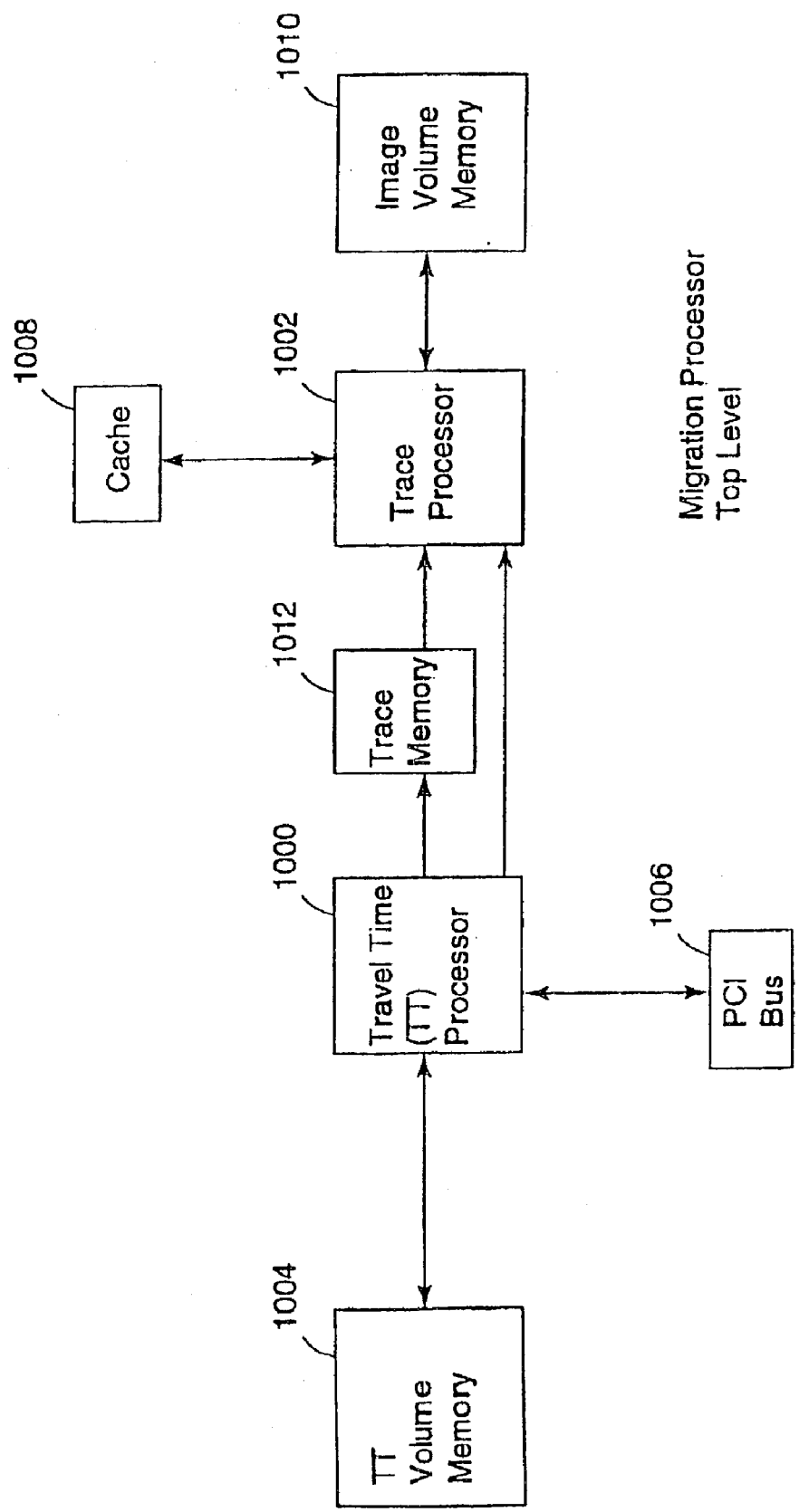
FIG. 36 is a block diagram illustrating an embodiment of a migration processor.

As shown in FIG. 36, the migration processor contains several elements. These include a travel time processor 1000, a trace processor 1002, a travel time volume memory 1004, a PCI interface/bus 1006, a trace memory 1012, a cache 1008, and an image volume memory 1010.

The travel time processor 1000 is used to interpolate a travel time for a point in the image volume. The travel time processor 1000 can be a field programmable gate array (FPGA) or an application specific integrated circuit (ASIC). The clock rate for an FPGA can typically be set at 50–66 MHz. The clock rate can be increased to 100–200 MHz for an ASIC. The algorithm is designed in a design software such as VHDL. This allows one compiler to create executable software of the design which is useful for verification but which and is running under a simulator at approximately one millionth of the speed at which the FPGA or ASIC will operate. The other compiler, called a synthesis tool, produces gate level netlists which are fed into a place and route tool which places and routes the architecture design and then outputs a bitstream that is downloaded into the FPGA. To create the ASIC, the gate level netlist is sent to an ASIC manufacturer who then uses industry standard techniques to place and route the netlist into the chip. Before the netlist is sent to the manufacturer a gate level simulation and/or timing verification is done. The gate level netlist is a description at the lowest level, i.e. individual logic gate level, of a hardware embodiment of the design. The term "to place" means to assign an individual physical gate on the chip to each gate described in the netlist. The term "to route" means to interconnect the gates so placed in accordance with the netlist.

The trace processor 1002 is used to interpolate a trace amplitude value for the travel time interpolated by the travel time processor 1000. The trace processor can also be a FPGA clocked at 50–66 MHz or an ASIC clocked at 100–200 MHz. The trace processor 1002 receives a control command from the travel time processor 1000 through a unidirectional control bus.

The travel time volume memory 1004 is used to hold a coarse travel time volume for each trace. The travel time volume memory 1004 is a bank of RAM, typically SDRAM (synchronous dynamic random access memory).

In the I/O stage before the migration has begun, a server typically sends the data across the network to the host PC which directs it through the PCI bus to the migration processor, as shown in FIG. 35. From that point, the travel time processor 1000 directs the data to the travel time volume memory 1004.

Once in the migration stage, the travel time processor 1000 reads the coarse travel time volume stored in the travel time volume memory 1004 through address, data, and control buses.

The PCI interface/bus 1006 is the migration processor's connection to the outside world. The travel time processor 1000 accesses data through the PCI interface/bus 1006 via its address, data, and control buses during the I/O stage. However, once the migration process has begun, the only communication between the PCI bus 1006 and the travel time processor 1000 that occurs is an inquiry by the host to see if the migration process in done or a stop migration command from the host.

The trace memory 1012 stores the sampled trace amplitudes. The trace amplitudes are loaded from off chip in some manner just as the travel time volumes are loaded. The trace memory 1012 is typically a bank of SRAM. Even and odd samples are stored in separate banks to allow linear interpolation between adjacent points in the input trace. The hardware can hide this from the host computer which only need to access a single memory bank of the trace memory. The trace processor reads the trace amplitude values through bidirectional address, data, and control buses which operate unidirectionally during the I/O phase and unidirectionally but in the reverse during the migration phase.

The travel time processor 1000 selects two trace amplitude values for each travel time corresponding to an image point from the trace memory 1012. The trace processor 1002 then reads the two trace amplitude values through a unidirectional data bus. Several traces may be stored and filtered with different bandwidths, and then a selection can be made between them to avoid spatial aliasing from shallow trajectory rays.

The cache 1008 is utilized solely by the trace processor 1002 through bidirectional address, data, and control buses. The cache 1008 enables one embodiment of a ping-pong symmetry effect that will be discussed in more detail with reference to FIGS. 37 and 43. Other embodiments of the ping-pong symmetry include the use of an extra image volume memory rather than the cache 1008.

The image volume memory 1010 is used to store the amplitude value accumulations for each point in the subsurface which directly corresponds to a point in the image volume. The image volume memory 1010 is typically a bank of SDRAM or other commodity bulk memory such as RAMBUS DRAM. In this embodiment, the SDRAM allows rapid access to sequential addresses within a single region of up to 2048 locations, known as columns, each column being allocated to a single output trace of up to 2048 points in depth. One 128 MB SDRAM has 16K columns and can thus, hold 16$k$ output traces, where in this case an output trace is a column of amplitude values within the image volume. For shorter output traces, the SDRAM will be able to store a greater number of them.

With reference to FIG. 36, the I/O phase and the migration phase of the migration process can be described at the top level. During the I/O phase trace and travel time, volume data is loaded through the PCI bus and into the travel time processor 1000 (some buses used for loading data are not shown). The travel time volume is directed to the travel.

Once all data necessary for the migration of a particular trace is loaded, the migration process begins with the travel time processor 1000 reading the appropriate section of the travel time volume for a given point in the image. The travel time processor 1000 then utilizes the coarse volume of travel times to interpolate a travel time for the point. The interpolated travel time is an index that the travel time processor 1000 then uses to address the proper amplitude data in the trace memory 1012. In the absence of trace interpolation, the trace memory's address extracts a single data value and the trace processor reads the value and sums it into the current point being processed in the image volume. This new sum is stored in the image volume memory 1010 or cache. All appropriate image volume values are adjusted for the current input trace and then the processor stops until the host provides data for the next input trace.

Figure 37:
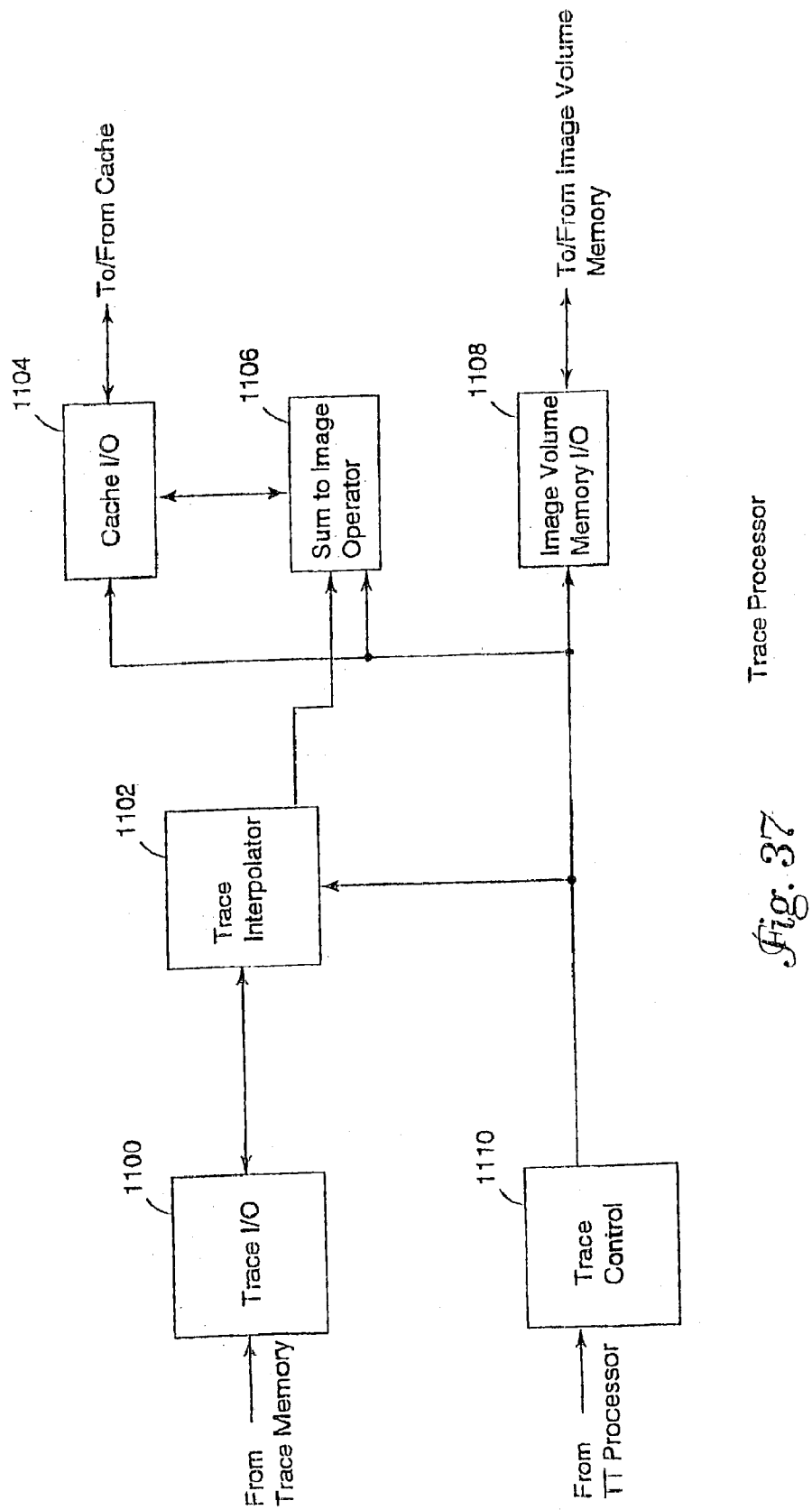
FIG. 37 is a block diagram illustrating an embodiment of a trace processor.

FIG. 37 shows the trace processor 1002 one step down from the top level. The trace processor 1002 includes several elements such as a trace interpolator 1102, a trace I/O 1100, a sum to image operator 1106, an image cache I/O 1104, an image volume I/O 1108, and a trace control 1110.

The trace interpolator 1102 interpolates a trace amplitude value from two amplitude values in adjacent trace memory locations that correspond to the interpolated travel time instead of the single value described above. Many types of interpolation may be used to produce an amplitude value that more accurately corresponds to the interpolated travel time since the amplitude values stored in the trace memory may not correspond exactly with the travel time that has been interpolated due to the sampling rate.

This implementation refers to linear interpolation. The trace I/O 1100 receives two adjacent amplitude values, two words, from the trace memory 1012 through a unidirectional data bus, which is shown as a single line but it should be understood that this bus is capable of carrying multiple words. The trace I/O 1100 also sends the two words through a unidirectional data bus also capable of carrying multiple words to the trace interpolator.

The sum to image operator 1106 receives an interpolated trace amplitude value from the trace interpolator 1102 through a unidirectional data bus. The sum to image operator 11106 adds the interpolated trace amplitude to the value previously stored in the image volume for the point being processed.

In one mode of operation, the image cache I/O 1104 receives amplitude values from the sum to image operator 1106 through a bidirectional data bus, and then directs them to the cache 1008 through bidirectional address, data, and control buses capable of carrying multiple words. In another mode, the image cache I/O receives amplitude values from the cache 1008 and writes them to the sum to image operator 1106 through the same bidirectional buses.

The image volume I/O 1108 is the controller and data path for the image volume memory 1010. In the one mode of operation, the image volume I/O 1108 reads from the image volume memory 1010 through bidirectional address, data, and control buses. The image volume I/O 1108 also writes to the sum to image operator 1106 through a bidirectional data bus in this mode. In the other mode, the image volume I/O 1108 and writes to the image volume memory 1010 through bidirectional address, data, and control buses. The image volume I/O 1108 also reads from to the sum to image operator 1106 through a bidirectional data bus in this mode.

The trace control 1110 synchronizes the trace processor structure. The trace control 1110 receives control signals from the travel time processor 1000 through the unidirectional control bus. The trace control also sends control signals to the trace I/O 11100, trace interpolator 1102, image cache I/O 1104, sum to image operator 1106, and the image volume I/O 1108 through a unidirectional control bus.

With reference to FIG. 37, the trace interpolation process can be described at its top level. The travel time processor 1000 generates the interpolated travel time which provides an address to the trace memory 1012 and provides an interpolated coefficient to the trace interpolator 1102 through the unidirectional control bus. The integer part of the interpolated travel time provides the address in the trace memory 1012, and the fractional part provides the trace interpolation coefficient. Once the trace memory 1012 receives the address signal, the trace amplitude data is sent to the trace I/O 1100. At the same time, the trace control 1110 receives an initiation control signal from the travel time processor 1000 which causes it to then synchronize all the elements of the trace processor. The trace I/O 1100 is instructed to send the amplitude values to the trace interpolator 1102. The trace interpolator 1102 interpolates an amplitude value for the travel time from the amplitude values it receives. The interpolated amplitude value is sent by the trace interpolator 1102 to the sum to image operator 1106. The sum to image operator 1106 then adds the amplitude value to the value from the current location in the image volume.

The image volume memory is updated by a ping pong effect. All implementations of the ping pong effect can be described in terms of two modes. The following describes one implementation. In one mode, two words per clock cycle are read from the image volume memory 1010. One is modified by the sum to image operator 1106 and both words are written to cache 1008. After completing the current output trace, which is typically 2000 points in depth, the next mode begins. In the second mode, the two words come from cache into the sum to image operator 1106 and another new amplitude value is added to the previously unmodified word. The updated words representing accumulated values are then sent back to the image volume I/O 1108 which sends them to the appropriate address in the image volume memory 1010. This occurs for all 2000 points in depth.

This enables the use of double word width memory (64 bit width) which is the lowest cost commodity memory. It also enables utilization of the highest operating speed of the memory which is available for a continuous burst of up to 2000 adjacent words.

The second ping pong implementation replaces the cache 1008 with another large bank of memory identical to image volume 1010. This enables the first mode to pass all output traces, i.e. the entire image volume, through the sum to image operator 1106 to the alternate image volume. The second mode then passes the entire image volume back through the sum to image operator 1106 to the image volume memory 1010. One purpose of this is to perform processing on both words in the same clock cycle and allows one mode to continue until the processing for a single input trace is complete.

Figure 38:
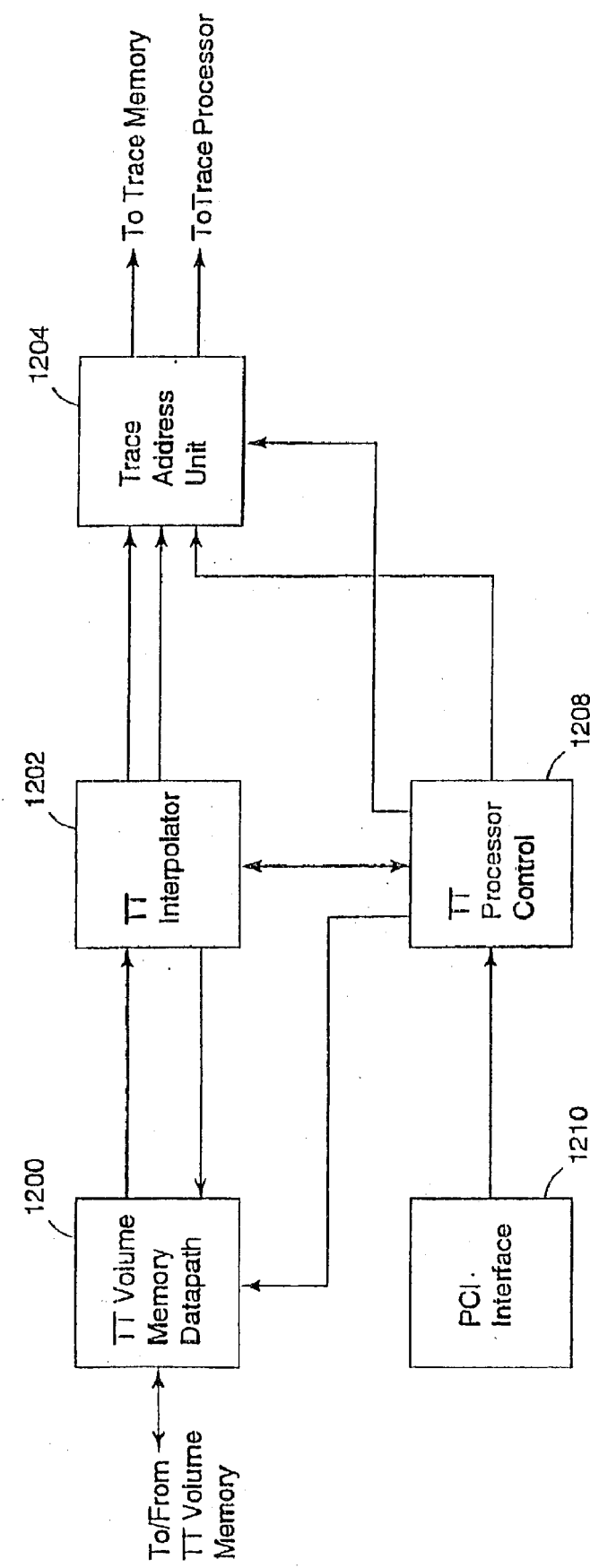
FIG. 38 is a block diagram illustrating an embodiment of a travel time processor.

FIG. 38 shows the travel time processor 1000 one step below the top level. It utilizes a travel time interpolator 1202, a travel time volume memory data path 1200, a trace address unit 1204, a travel time processor control 1208, and a PCI interface 1210.

The travel time interpolator 1202 interpolates a travel time from a coarse volume of travel times. Many different types of interpolation may be used, but for purposes of example a linear interpolator implemented into hardware will be considered.

The travel time volume memory data path 1200 generates address and control signals across address and control buses to fetch two words from the travel time volume memory 1004. The travel time volume memory data path 1200 receives the two words from the travel time volume memory 1004 across a data bus. It then sends the data to the travel time interpolator across a unidirectional data bus. It receives a travel time address signal from the travel time interpolator across a bidirectional address bus.

The trace address unit 1204 receives the address which is the integer part of the travel time from the travel time interpolator 1202 across a unidirectional data bus. It also receives the fractional part of the travel time from the travel time processor through a unidirectional data bus. It outputs a trace address value to the trace memory 1012 through a bidirectional address bus. It also outputs a control signal containing the fractional part to the trace interpolator through the unidirectional control bus.

The travel time processor control 1208 is the master control unit for this part of the logic. It generates a control signal for the travel time volume memory data path 1200 and for the trace address unit 1204 through a unidirectional control bus. It generates a control signal for the travel time interpolator 1202 though a bidirectional control bus. It also generates a trace processor 1002 control signal which is output to the trace address unit 1204 through the control bus.

The PCI interface 1210 is the pathway for all control signals and data to flow from the processor to the host as well as the reverse. The PCI interface 1210 sends a control signal to the travel time processor control 1208 through a unidirectional control bus.

With reference to FIG. 38, the travel time interpolation process can be described at its top level. Initially, the data is input through the PCI interface 1210, and the travel time volume data is distributed through the travel time memory data path 1200 to the travel time memory 1004. The trace data is distributed through the trace address unit 1204 to the trace memory 1012. Note that not all signal paths for loading the data into memory are shown. In operation, the processor control 1208 generates a memory address and instructs the travel time memory data path 1200 to fetch the travel times. The travel times are sent to the travel time interpolator 1202 where a travel time for a point in the image volume is interpolated. The interpolated travel time provides an address index which is sent to the trace address unit 1204.

Figure 39:
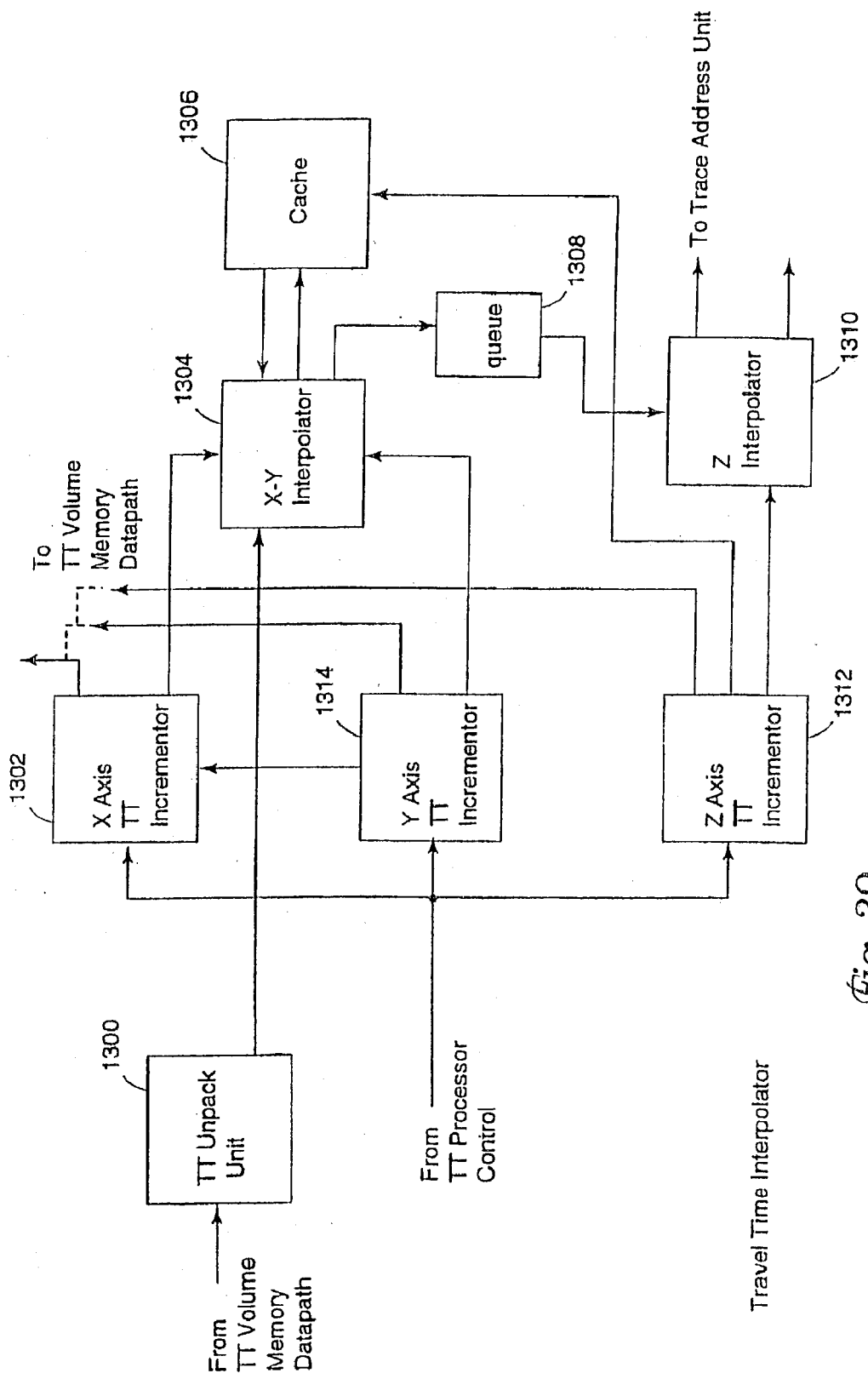
FIG. 39 is a block diagram illustrating an embodiment of a travel time interpolator.

FIG. 39 shows the travel time interpolator 1202 one level down from its top. It consists of a travel time unpack unit; three travel time incrementers where one is for the x component, one is for the y, and one is for the z; a z interpolator, an x-y interpolator, a cache, and a queue.

The travel time unpack unit 1300 accepts single precision floating point travel time values and scales them to 24 bit integers. The travel time unpack 1300 receives the pair travel time values for 2 adjacent points along the y axis that are at the same x and z location as indicated by the x,y,z incrementers. This pair of travel times is received from the travel time volume memory data path 1200 through a unidirectional data bus capable of carrying multiple words.

The three travel time incrementers 1302, 1312, and 1314 each generate either x, y, or z axis values for the interpolation coefficient. Each initially receives data from the host to get the process started through the unidirectional control bus from the control unit 1208. Each also sends the integer part of the axis value for each direction to the travel time memory data path unit 1200 through a bidirectional address bus.

The z interpolator 1310 receives the fractional part of the axis value in the z direction for the interpolation coefficient from the z incrementer 1312 through a unidirectional data bus. It then generates a trace address and a trace fraction that is fed to the trace address unit 1204 through unidirectional data buses.

The x-y interpolator 1304 receives the fractional part of the axis values in the x and y directions for the interpolation coefficients from the x and y incrementers 1302 and 1314. The x-y interpolator 1304 generates the travel time value for the x and y component. It inputs a travel time value for the y component from the travel time unpack unit 1300 through a unidirectional data bus and then stores this value in cache 1306 discussed below, or it inputs the travel time value, which was previously generated and sent to cache 1306, which is now used as the travel time value for the x component. The x-y interpolator 1304 interpolates between the x component and y component on alternate clock cycles. This process will be described in greater detail below.

The cache 1306 as previously discussed, receives the interpolated value for a y interpolation from the x-y interpolator 1304 through a unidirectional data bus. It sends the input values for an x interpolation to the x-y interpolator 1304 through the unidirectional data bus. The cache 1306 receives a z component address from the z incrementer 1312 for reasons that will be discussed below.

The queue 1308 receives the interpolated value from the x-y interpolator through a unidirectional data bus. It sends the interpolated value to the z interpolator 1310 through a unidirectional data bus. Since the staging depth may not be accurately known, the queue is used as a data staging element. This function will be discussed in greater detail below as well.

With reference to FIG. 39, the process of travel time interpolation will be discussed. The process in general is as follows. A three dimensional travel time interpolation is broken down into three one dimensional linear interpolations, along the x, y, and z axes. Two travel time input values from the unpack unit 1300 are interpolated in the x-y interpolator 1304 as a correct travel time in the y plane and is written out to the cache 1306 but does not necessarily overwrite the old travel times stored in the y plane corresponding to a lesser x axis value. The interpolation utilizes the fraction output by the y axis incrementer 1314 as the interpolation coefficient.

At this point, the travel time must be interpolated within the x plane to produce a correct travel time along x and y axes and finally interpolated by the z interpolator 1310 to a travel time correct in x,y,z space. To accomplish the x interpolation, the old y plane travel time is loaded from a table of old y plane travel times corresponding to an x plane stored in cache 1306 into the x-y interpolator 1304 along with the new y plane travel time. From these two travel times that differ in the x axis but belong to the same y plane, the travel time which is correct in the x and y axes is generated by utilizing the fraction output by the x axis incrementer 1302. Only when the next x axis value is beyond the x axis location of these travel time input values is the value in cache overwritten. This travel time is then sent to the queue 1308.

The queue is necessary because once the z interpolator 1310 begins to receive data, it expects data to be available on demand so that an output can be generated each clock cycle. Since the x-y interpolator cannot provide data to it upon demand, the queue 1308 is filled with at least two travel times with others on the way and thus, is able to supply the z interpolator 1310 with data upon demand. The z incrementer 1312 outputs its fraction to the cache 1306 to indicate which y plane to output to the x-y interpreter 1304 when the x axis interpolation is to be performed. The z incrementer 1312 also outputs its fraction to the z interpolator 1310 which it uses as the interpolation coefficient.

The z interpolator 1310 interpolates the travel time correct in the x,y,z space using the z axis fraction from incrementer 1312. When the integer output from incrementer 1312 increments, the z interpolator pulls another travel time value from the queue 1308. In every clock cycle the z interpolator outputs a new fully interpolated travel time composed of an integer and fractional part. The integer part is sent to the trace address unit 1204 as an address, and the fractional part is sent to the trace address unit 1204 as a trace interpolation coefficient. As stated herein, the trace address unit 1204 sends the trace interpolation coefficient across a unidirectional control bus to the trace processor 1002.

Figure 40:
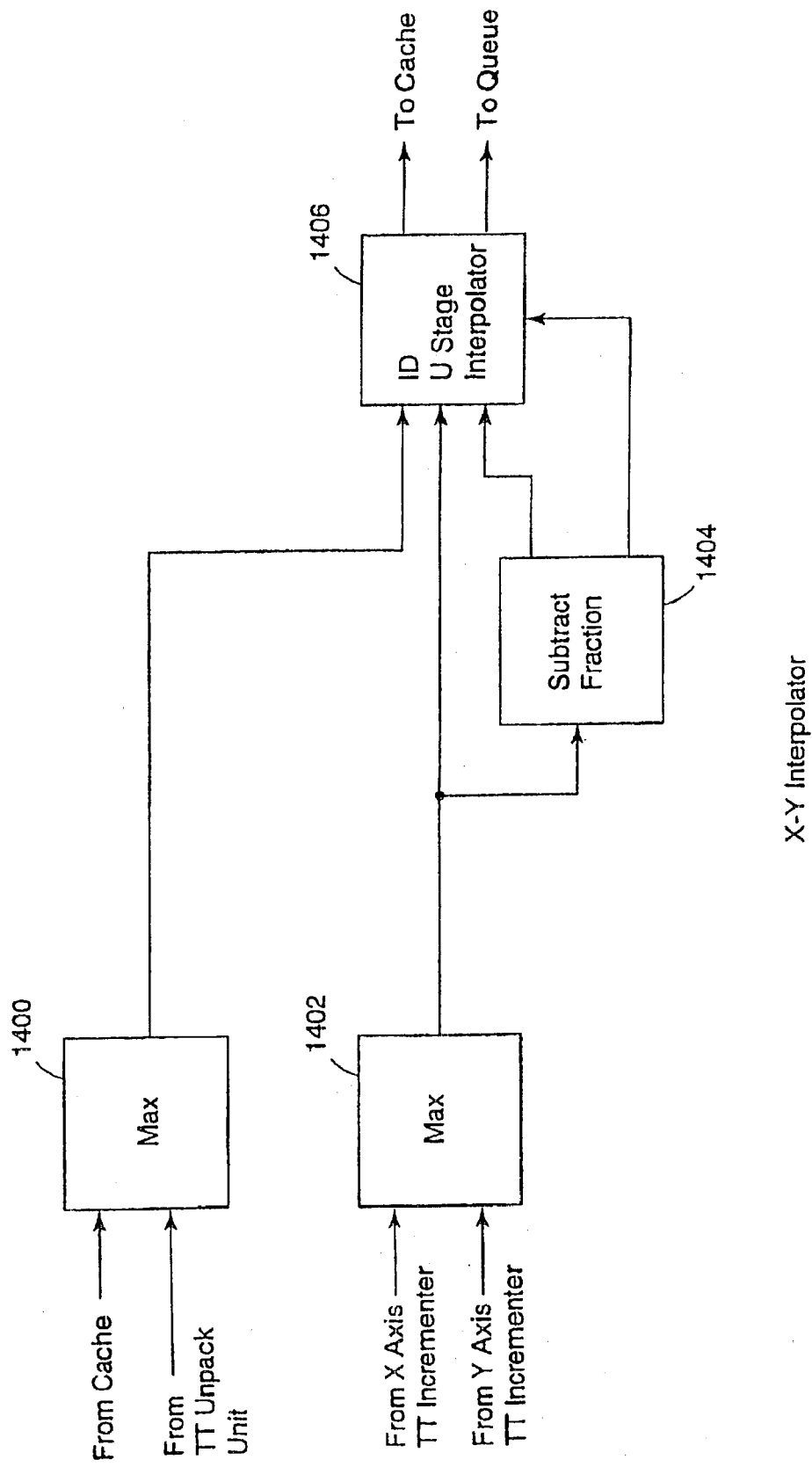
FIG. 40 is a block diagram illustrating an embodiment of an X-Y interpolator.

The x-y interpolator is shown in FIG. 40. It contains several units including 2 multiplexers, a subtract fraction operator, and a 1D four stage interpolator.

The first mux 1400 selects between travel time pairs. It receives a travel time pair's values which are within a correct y plane through a unidirectional data bus from the cache 1306. The first mux 1400 also receives another travel time pair from the unpack unit 1300 which is not correct within any plane, also through a unidirectional data bus capable of carrying multiple words. The first mux 1400 selects either the travel time pair in the correct y plane or the pair not correct in any plane in alternate clock cycles.

The second mux 1402 selects between fractional interpolation coefficients. It receives a fraction from the x axis incrementer 1302 through a unidirectional data bus. It also receives a fraction from the y axis incrementer 1314 through another unidirectional data bus. The mux 1402 selects either fraction in alternate clock cycles just as the first mux 1400 operated so that when the first mux 1400 selects the pair that is not correct in any plane, the second mux 1402 selects the fraction from the y axis incrementer 1314. When the first mux 1400 selects the pair from cache 1306 which lies within the correct y plane, the second mux 1402 selects the fraction from the x axis incrementer 1302.

The subtract fraction operator 1404 performs a subtraction of one word from another. The fraction output by the second mux 1402 is received through a unidirectional data bus. The subtract fraction operator 1404 then subtracts the fraction from numerical one (1.0) and signals when the fraction equals zero.

The 1D 4 stage interpolator 1406 performs the linear interpolation. It receives both x axis travel time components or both y travel time components from the first mux 1400 through a unidirectional data bus capable of carrying multiple words It also receives the fractional component selected by the second mux 1402 through a unidirectional data bus. The output of the subtract fraction operator 1404 is also received through another unidirectional data bus, including both the value generated by the subtraction and the signal for indicating whether the fraction equals numerical zero. The 1D 4 stage interpolator 1406 then performs the actual interpolation by multiplying the travel time with the least index value in the appropriate axis, x or y depending on the cycle, that is received from the first mux 1400 by the value of the subtraction output by the subtract fraction operator 1404. It also multiplies the second travel time received from the first mux 1400 by the fraction received from the second mux 1402. The interpolation is completed by adding the two products and outputting the result through a unidirectional data bus to the cache 1306 and the queue 1308.

The process of the 1D interpolation is described with reference to FIG. 40 and FIG. 41. The first mux 1400 sends the travel time pair to the 1D 4 stage interpolator 1406. The second mux 1402 sends a fraction to the subtract fraction operator 1404 and the 1D 4 stage interpolator 1406. The subtract fraction operator 1404 subtracts the fraction from numerical one and sends the result and a signal indicating whether the fraction is zero to the 1D 4 stage interpolator 1406. The 1D 4 stage interpolator multiplies the first travel time by the subtracted result and the second travel time by the fraction. Then it adds the two products to get the interpolated value which is output to the cache 1306 if it is the travel time that is in the correct y plane and to the queue 1308 if it is the travel time that is that is in the intersection of the correct x and y planes.

Figure 41:
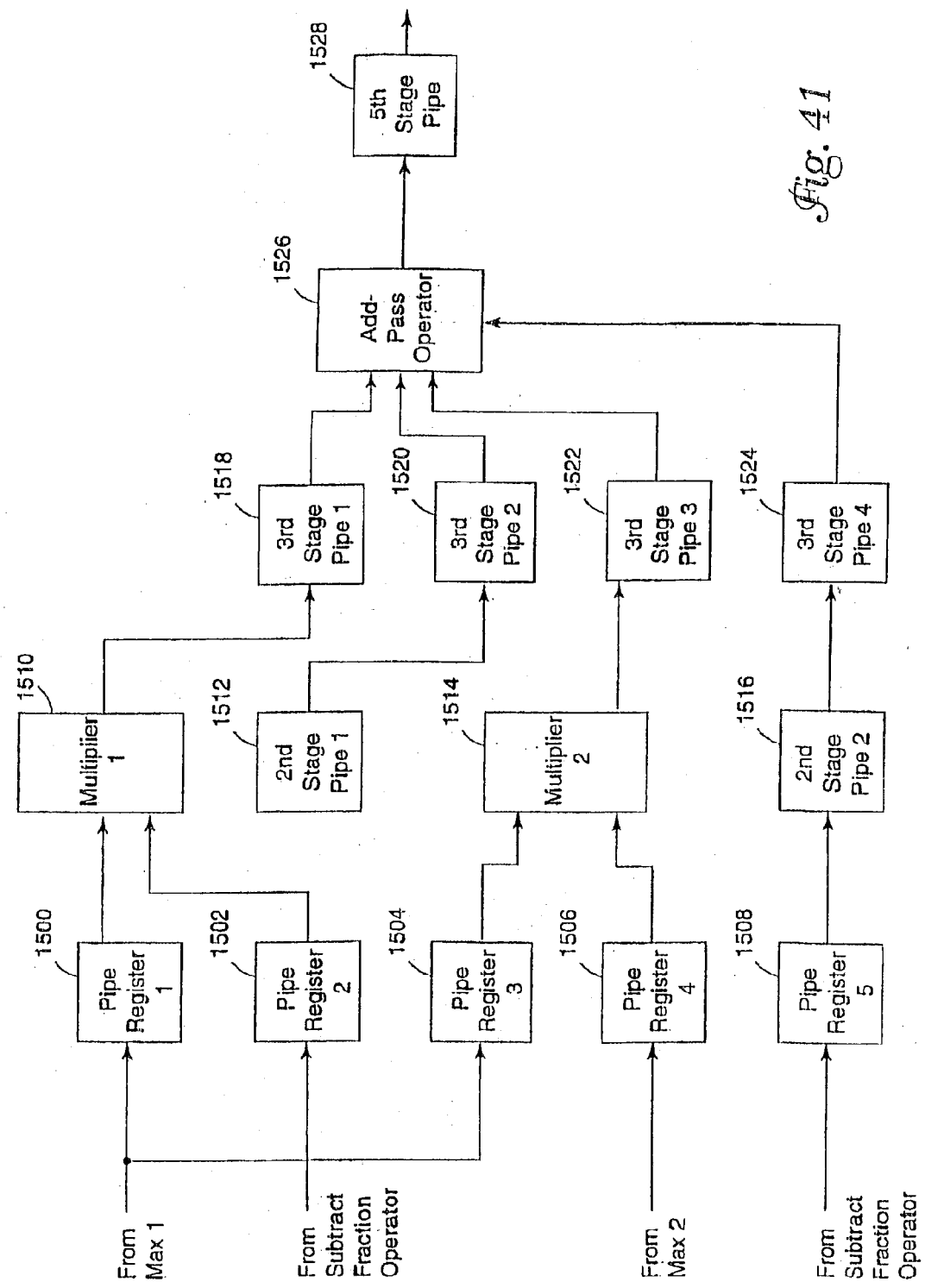
FIG. 41 is a block diagram illustrating a 1D 4 stage interpolator and the pipelines that are routed through it.

FIG. 41 shows the 1D 4 stage interpolator 1406 which does the linear interpolation. It contains 4 stages each operating on each clock cycle so that data flows from the first stage to the last in 4 clock cycles and each cycle generates an output from that time until the migration processor stops. The first stage contains five pipeline registers, 1500, 1502, 1504, 1506, and 1508, respectively. The second stage contains two multipliers, 1510 and 1514, respectively, and two pipeline registers 1512 and 1516, respectively. The third stage contains four pipeline registers, 1518, 1520, 1522, and 1524, respectively. The fourth stage contains an add-pass operator 1526, and the fifth stage is an output register 1528.

The first stage receives all of the necessary data for a 1D interpolation in one clock cycle. The first register 1500 receives a travel time from the first mux 1400 through a unidirectional data bus capable of carrying multiple words. The second register 1502 receives the subtraction result from the subtract fraction operator 1404 through a unidirectional data bus. The third register 1504 receives a travel time from the first mux 1400 through the unidirectional data bus that supplied the other travel time to the first register 1500. The fourth register 1506 receives the fraction from the second mux 1402 through a unidirectional data bus. The fifth register 1508 receives the signal from the subtract fraction operator 1404 through a unidirectional data bus.

The second stage receives all of the necessary data to complete the multiplication and to also preserve unmodified data, including a signal that indicates whether the travel times are valid, in the next clock cycle. Invalid signals are encoded into the words representing travel times supplied from the unpack unit 1300. All travel time interpolator units except the 1D 4 stage interpolators pass the signal through unchanged. The first multiplier 1510 receives the first travel time from the first register in stage 1 1500 through a unidirectional data bus and receives the subtraction result from the second register in stage 1 1502. The second multiplier 1514 receives the second travel time from the third register in stage 1 1504 and receives the fraction from the fourth register in stage 1 1506. The first multiplier 1510 multiplies its two input values, and the second multiplier 1514 multiplies its two input values. The multipliers themselves contain one pipeline register which creates the need for register 1512 and 1516 to keep the pipeline synchronized. The first register in stage 2 1512 stores a flag generated from the invalid signals encoded within the input travel times. The second register in stage 2 1516 stores the signal received through a unidirectional data bus from the fifth register in stage one 1508.

The third stage receives all of the necessary data to complete the linear interpolation by adding the products of the two multipliers in the next clock cycle. The first register of the fourth stage 1518 receives the product from the first multiplier 1510 through a unidirectional data bus. The second register in the fourth stage 1520 receives the flag indicating whether the travel times are valid through a unidirectional data bus from the first register in the second stage 1512. The third register in the third stage 1522 receives the product from the second multiplier 1514 through a unidirectional data bus. The fourth register in the third stage 1524 receives the flag that indicates whether the fraction is zero from the second register in the second stage 1516.

The next clock cycle provides the add-pass operator 1526 with all of the data it needs to generate the interpolated output. It receives the product contained in the first register of the third stage 1518 through a unidirectional data bus. It receives the flag indicating whether the travel times are of value from the second register in the third stage 1520 through a unidirectional data bus. It also receives the product contained in the third register of the third stage 1522 and the signal indicating whether the fraction is zero contained in the fourth register of the third stage 1524 through unidirectional data buses. If the flag indicates that the fraction is not zero, then the add-pass operator 1526 adds the two products. If the flags indicates that the fraction is zero, then the add-pass operator 1526 has received the travel time originally stored in register 1500 via multiplier 1510 and register 1518 since the multiplier merely multiplied this travel time by one.

On the next clock pulse, the add-pass block 1526 outputs the travel time combined with the flag from register 1520 indicating whether the output travel time is valid. The fifth stage register 1528 receives the interpolated travel time through a unidirectional data bus. At this time, the output of the interpolator is available, so that it is sent to the cache 1306 and the queue 1308.

The cycle by cycle process of the 1D 4 stage interpolator is described with reference to FIG. 41. The first stage of registers receive the data on the first cycle. The registers and the multipliers receive their corresponding inputs on the second clock cycle. The registers in the third stage receive their corresponding inputs on the third clock cycle. The add-pass operator 1526 receives its inputs on the fourth clock cycle. The fifth stage output register receives its input on the fifth cycle. Finally, the cache 1306 and queue 1308 receive their input on the sixth cycle. It should be understood that this 1D 4 stage interpolator demonstrates the single cycle, sustained execution. As each stage dumps its output on a cycle, it also receives a new input on that same cycle. Once the first data set has passed through to the output, the pipeline has filled and an output follows on every clock cycle.

The various embodiments described above are provided by way of illustration only and should not be construed to limit the invention. Those skilled in the art will readily recognize various modifications and changes that may be The claimed invention is:

1. A processing module for generating an image using an algorithm for determining a level of energy emanating from a source located within a mass, by executing a plurality of expressions, where data is collected by a plurality of sensors, the processing module comprising:

a bulk memory bank for receiving and storing data; and a parallel execution module having a plurality of functional execution units coupled together, each functional execution unit performing a predetermined expression from the algorithm, and in electrical communication with a data flow unit, the data flow unit (DFU) coupled to the bulk memory bank and the parallel execution module, wherein the data flow unit retrieves and supplies data to the functional execution units on each clock cycle, wherein the functional execution units receive data from the data flow unit and return data results at least once every clock cycle.

2. The processing module of claim 1, wherein the parallel execution module further comprises:

a travel time processor, the travel time processor having a plurality of execution units arranged to calculate a travel time for the energy between the source in the mass and a sensor; and a trace processor, in electrical communication with the travel time processor, the trace processor having a plurality of execution units arranged to determine the level of energy emanating from at least one source and recorded by at least one sensor.

3. The processing module of claim 2, wherein the travel time includes a combined travel time of energy from a shot position to the source and from the source to a sensor.

4. The processing module of claim 2, wherein the travel time includes only the travel time of energy from the source to the sensor.

5. The processing module of claim 2, wherein the travel time processor includes an interpolator formed from a plurality of execution units arranged to process first and second travel times corresponding to first and second sources, respectively, and interpolate an intermediate travel time from a third source positioned intermediate to the first and second sources.

6. The processing module of claim 2, wherein the travel time processor includes cache, memory, and an interpolator, the travel time, processor memory is configured to store a plurality of predetermined travel times forming a coarse grid of travel times, the plurality of travel times including a first, second, third, and fourth travel times corresponding to first, second, third, fourth sources, respectively, the interpolator being formed from a plurality of execution units arranged to:

receive the first and second predetermined travel times from the travel time processor memory, interpolate a first intermediate travel time for a first intermediate source positioned between the first and second sources, and cache the first intermediate travel time;

receive the third and fourth predetermined travel times from the travel time processor memory, interpolate a second intermediate travel time for a second intermediate source positioned between the third and fourth sources, and cache the second intermediate travel time; and receive the first and second intermediate travel times from the cache, interpolate a third intermediate travel time for a third intermediate source positioned between the first and second intermediate sources.

7. The processing module of claim 2, wherein the parallel execution module is further configured to generate an image from the level of energy emanating from each source and recorded at the sensor.

8. The processing module of claim 1, wherein the plurality of functional execution units are utilized concurrently during the clock cycle.

9. The processing module of claim 1, wherein the plurality of execution units are arranged into one or more pipelines and are arranged to receive data from the bulk memory bank into the one or more pipelines and all expressions forming the algorithm are executed on a single clock cycle when a pipeline is fully loaded with data.

10. The processing module of claim 1, wherein the functional execution units are implemented in application-specific integrated circuits (ASICs), gate arrays, or field programmable gate arrays (FPGAs).

11. A processing module (200) for generating an image using an algorithm for determining a level of energy emanating from a source located within a mass, by executing a plurality of expressions, where data is collected by a plurality of sensors, the processing module comprising:

a bulk memory bank (204) for receiving and storing data;

a parallel execution module (202) having a plurality of functional execution units (206) coupled together, each functional execution unit (206) performing a predetermined expression from the algorithm, and in electrical communication with a data flow unit (208), the data flow unit (DFU) (208) coupled to the bulk memory bank (204) and the parallel execution module (202), wherein the data flow unit (208) retrieves and supplies data to the functional execution units (206) on each clock cycle, wherein the functional execution units (206) receive data from the data flow unit (208) and return data results at least once every clock cycle; and wherein the plurality of execution units are arranged into one or more pipelines and are arranged to receive data from the bulk memory bank into the one or more pipelines and all expressions forming the algorithm are executed on a single clock cycle when the pipeline is fully loaded with data.

12. An apparatus for interpolating travel times for energy between a source in a mass and a sensor, the apparatus comprising:

cache;

memory configured to store a plurality of travel times forming a coarse grid of travel times, the plurality of travel times including first, second, third, and fourth travel times corresponding to first, second, third, and fourth sources, respectively; and an interpolator formed from a plurality of execution units arranged to receive the first and second travel times from the memory, interpolate a first intermediate travel time for a first intermediate source positioned between the first and second sources, and cache the first intermediate travel time; receive the third and fourth travel times from the memory, interpolate a second intermediate travel time for a second intermediate source positioned between the third and fourth sources, and cache the second intermediate travel time; and receive the first and second intermediate travel times from the cache, interpolate a third intermediate travel time for a third intermediate source positioned between the first and second intermediate sources.

13. A method of generating an image using an algorithm for determining a level of energy emanating from a source located in a mass using a processing module comprising a bulk memory bank, a parallel execution module, and a data flow unit, characterized by the steps in combination of:

a) providing data from a plurality of sensors of the source located in the mass;

b) sending the data from the plurality of sensors to the bulk memory for storing the data;

c) providing the data stored in the bulk memory to the data flow unit;

d) sending the data received by the data flow unit to the parallel execution module having a plurality of functional execution units coupled together, each functional execution unit performing a predetermined expression from the algorithm each clock cycle when a pipeline of the functional execution units is fully loaded with data; and e) outputting results of the functional execution units to the data flow unit.

* * * * *